US011958211B2

(12) United States Patent
MacDonald et al.

(10) Patent No.: US 11,958,211 B2
(45) Date of Patent: Apr. 16, 2024

(54) BLOCK, BLOCK SYSTEM AND METHOD OF MAKING A BLOCK

(71) Applicant: Keystone Retaining Wall Systems LLC, West Chester, OH (US)

(72) Inventors: Robert A. MacDonald, Plymouth, MN (US); Thomas S. Riccobene, Albuquerque, NM (US)

(73) Assignee: Keystone Retaining Wall Systems LLC, West Chester, OH (US)

(*) Notice: Subject to any disclaimer, the term of this patent is extended or adjusted under 35 U.S.C. 154(b) by 0 days.

(21) Appl. No.: 18/055,102

(22) Filed: Nov. 14, 2022

(65) Prior Publication Data

US 2023/0219253 A1 Jul. 13, 2023

Related U.S. Application Data

(63) Continuation of application No. 16/048,881, filed on Jul. 30, 2018, now Pat. No. 11,498,241, which is a (Continued)

(51) Int. Cl.

| | |
|---|---|
| ***B28B 7/00*** | (2006.01) |
| ***B28B 3/00*** | (2006.01) |
| ***B28B 3/02*** | (2006.01) |
| ***B28B 15/00*** | (2006.01) |
| ***E04B 2/16*** | (2006.01) |

(Continued)

(52) U.S. Cl.

CPC .............. *B28B 7/0097* (2013.01); *B28B 3/00* (2013.01); *B28B 3/021* (2013.01); *B28B 7/0041* (2013.01); *B28B 7/007* (2013.01); *B28B 15/005* (2013.01); *E04B 2/16* (2013.01); *E04C 1/395* (2013.01); *E04B 2002/0217* (2013.01); *E04B 2002/0245* (2013.01); *E04B 2002/0265* (2013.01); *E04B 2002/0269* (2013.01)

(58) Field of Classification Search

CPC ......... B28B 7/0097; B28B 3/00; B28B 3/021; B28B 7/0041; B28B 7/007; B28B 15/005; E04B 2/16; E04B 2002/0265; E04B 2002/0269

See application file for complete search history.

(56) References Cited

U.S. PATENT DOCUMENTS 4,869,660 A 9/1989 Ruckstuhl
D378,702 S 4/1997 Blomquist et al.

(Continued)

FOREIGN PATENT DOCUMENTS

DE 19634499 A1 3/1998
JP 2008114497 A 5/2008

*Primary Examiner* — Mohammad M Ameen

(74) *Attorney, Agent, or Firm* — Dorsey & Whitney LLP

(57) ABSTRACT

A block, block system and method of making a wall block. A block with multiple embodiments of a visually exposed surface having three dimensional shaped areas and three dimensional angular valleys or joints that can be used to construct a patio, wall, fence or the like; the multiple embodiments creating a more random and natural appearance. A mold box having a moveable liner and a stripper shoe that impart three dimensional shaped areas and three dimensional angular valleys or joints onto an exposed surface of a block. The moveable liner and stripper shoe also impart a parting line onto the exposed surface of the block.

10 Claims, 46 Drawing Sheets

Related U.S. Application Data continuation of application No. 14/497,689, filed on Sep. 26, 2014, now abandoned.

(60) Provisional application No. 61/927,714, filed on Jan. 15, 2014, provisional application No. 61/882,976, filed on Sep. 26, 2013.

(51) Int. Cl.

| | |
|---|---|
| ***E04C 1/39*** | (2006.01) |
| *E04B 2/02* | (2006.01) |

(56) References Cited

U.S. PATENT DOCUMENTS

| | | | |
|---|---|---|---|
| D466,619 S | 12/2002 | Britton | |
| D500,864 S | 1/2005 | Klettenberg et al. | |
| 6,871,468 B2 | 3/2005 | Whitson | |
| D506,837 S | 6/2005 | Scherer et al. | |
| D511,578 S | 11/2005 | Mugge et al. | |
| D529,628 S | 10/2006 | Mugge et al. | |
| 7,140,867 B2 | 11/2006 | Scherer et al. | |
| 7,156,645 B2 | 1/2007 | Ness | |
| 7,172,404 B2 | 2/2007 | Braungardt et al. | |
| 7,175,414 B2 | 2/2007 | Ness et al. | |
| 7,208,112 B2 | 4/2007 | Scherer | |
| 7,261,548 B2 | 8/2007 | Ness | |
| 7,267,321 B1 | 9/2007 | Morrell | |
| D552,258 S | 10/2007 | Strand et al. | |
| D555,810 S | 11/2007 | Strand | |
| D579,576 S | 10/2008 | Lacas | |
| D584,423 S | 1/2009 | Mugge | |
| D584,834 S | 1/2009 | Lacas | |
| D598,136 S | 8/2009 | Mugge | |
| 7,618,578 B2 | 11/2009 | Manthei et al. | |
| D611,164 S | 3/2010 | Mugge | |
| 7,674,420 B2 | 3/2010 | Johnson et al. | |
| 7,687,006 B2 | 3/2010 | Manthei et al. | |
| 7,695,268 B2 | 4/2010 | Klettenberg | |
| 7,740,471 B2 | 6/2010 | Hoogland | |
| D620,614 S | 7/2010 | Mugge et al. | |
| D621,960 S | 8/2010 | Mugge et al. | |
| D625,840 S | 10/2010 | Mugge | |
| 7,849,656 B2 | 12/2010 | Mugge et al. | |
| D632,809 S | 2/2011 | Mugge et al. | |
| D632,810 S | 2/2011 | Mugge et al. | |
| 7,908,799 B2 | 3/2011 | Mugge et al. | |
| D636,093 S | 4/2011 | Mugge et al. | |
| D636,094 S | 4/2011 | Mugge | |
| D638,553 S | 5/2011 | Mugge et al. | |
| D639,455 S | 6/2011 | Mugge et al. | |
| 7,972,128 B2 | 7/2011 | Mugge et al. | |
| D644,747 S | 9/2011 | Meadows | |
| 8,101,113 B2 | 1/2012 | Castonguay et al. | |
| D653,772 S | 2/2012 | Mugge et al. | |
| 8,113,815 B2 | 2/2012 | Ness et al. | |
| 8,268,223 B2 | 9/2012 | Manthei | |
| D678,552 S | 3/2013 | Mugge et al. | |
| D679,833 S | 4/2013 | Burnquist et al. | |
| D685,923 S | 7/2013 | Mugge et al. | |
| 8,540,915 B2 | 9/2013 | Scherer | |
| D690,837 S | 10/2013 | Mugge et al. | |
| D698,041 S | 1/2014 | Burnquist et al. | |
| 8,632,718 B2 | 1/2014 | Ott | |
| D699,866 S | 2/2014 | Mugge et al. | |
| 8,677,711 B2 | 3/2014 | Wolter et al. | |
| 8,715,557 B2 | 5/2014 | Johnson et al. | |
| 8,807,985 B2 | 8/2014 | Ott | |
| 9,021,761 B2 | 5/2015 | Riccobene et al. | |
| D731,675 S | 6/2015 | Karau | |
| 2003/0007834 A1 | 1/2003 | Bolduc et al. | |
| 2003/0126821 A1 | 7/2003 | Scherer et al. | |
| 2003/0164574 A1 | 9/2003 | Hammer et al. | |
| 2003/0182011 A1 | 9/2003 | Scherer | |
| 2005/0211871 A1 | 9/2005 | Ness et al. | |
| 2006/0110223 A1 | 5/2006 | Dawson et al. | |
| 2006/0249881 A1 | 11/2006 | Castonguay et al. | |
| 2007/0193181 A1 | 8/2007 | Klettenberg et al. | |
| 2008/0092870 A1 | 4/2008 | Karau et al. | |
| 2008/0258340 A1* | 10/2008 | Klettenberg | B28B 7/0041<br>264/293 |
| 2009/0000233 A1 | 1/2009 | Hammer | |
| 2009/0103987 A1 | 4/2009 | MacDonald | |
| 2011/0078978 A1 | 4/2011 | Wauhop | |
| 2011/0316194 A1* | 12/2011 | Manthei | B28B 7/366<br>425/436 R |
| 2014/0270988 A1 | 9/2014 | Riccobene et al. | |

* cited by examiner

BLOCK, BLOCK SYSTEM AND METHOD OF MAKING A BLOCK

CROSS REFERENCE TO RELATED APPLICATIONS

This application is a continuation of U.S. Ser. No. 16/048,881 filed Jul. 30, 2018, issued as U.S. Pat. No. 11,498,241 on Nov. 15, 2022 which in turn is a continuation of U.S. Ser. No. 14/497,689, filed Sep. 26, 2014, which claims the benefit of U.S. Provisional Application Nos. 61/927,714, filed Jan. 15, 2014 and 61/882,976, filed Sep. 26, 2013, the contents of each of which are hereby incorporated by reference herein.

FIELD OF THE INVENTION

This invention relates generally to blocks and patios, fences, walls and retaining walls constructed from the blocks. This invention also relates to the method of manufacturing the block and the methods of constructing structures with the blocks. This invention also relates to mold boxes, mold liners and stripper shoes in the manufacture of the blocks.

BACKGROUND OF THE INVENTION

Patios, fences, walls, and retaining walls are used in various landscaping projects and are available in a wide variety of styles. Numerous methods and materials exist for the construction of patios, fences, walls and retaining walls. Such methods include the use of natural stone, poured concrete, precast panels, masonry, and landscape timbers or railroad ties.

In recent years, segmental concrete wall, patio and landscaping units, which may be laid, positioned or dry stacked without the use of mortar or other complex securing means, have become widely accepted in the construction of patios, fences, walls and retaining walls. Such patio, wall and landscaping units have gained popularity because they are mass produced and, consequently, relatively inexpensive. The units are structurally sound, easy and relatively inexpensive to install, and couple the durability of concrete with the attractiveness of various architectural finishes.

In the manufacture of patio, wall and landscaping blocks and other kinds of blocks made from concrete, it is common to use a mold that forms a block module which is then split to form two or more blocks. In another method, blocks are individually formed in a mold and the surfaces are textured by removal of the mold. Another known method of creating a block having an irregular or textured surface is to form the block in a mold box that has been provided with a sidewall liner or stripper shoe shaped to impart the irregular or textured surface on the block during the block molding process.

In the construction of a patio, wall or fence the aesthetic design of the individual block units and the overall visually pleasing aesthetic appearance of the patio, wall or fence is very desirable. Blocks that have a desirable texture or pattern create an exposed surface of a patio, wall or fence that is visually appealing. Such blocks are commonly made in a block machine which includes a mold assembly comprising one or more mold cavities. A texture or pattern may be imparted to a surface of the block by a stripper shoe or side liner of the mold assembly. For example, if the exposed surface of the block is formed at the top of the mold cavity a texture or pattern may be imparted to the block surface by a stripper shoe and if the exposed surface of the block is formed at a side of the mold cavity the texture or pattern may be imparted to the block surface by a side liner of the mold. Typically, the blocks are formed of a moldable material comprising dry cast concrete. The use of dry cast concrete presents some issues for prior art mold assemblies when making blocks having a textured or patterned surface. If the pattern is to be impressed on a block surface by a side liner of the mold assembly the patterned surface may sag when the dry cast concrete is discharged from the mold if the pattern includes contours which leave part of the surface unsupported. If the pattern is to be formed on a block surface by the stripper shoe the patterned surface may not properly release from the stripper shoe if the pattern does not have a sufficient release taper or draft. Therefore, it would be desirable to provide a block having a desired texture or pattern on an exposed surface and a mold assembly capable of making the block while overcoming the problems of prior art mold assemblies.

SUMMARY OF THE INVENTION

A block including a block body having opposed front and rear faces, opposed first and second side walls, and opposed and substantially parallel top and bottom planar surfaces. The front face of the block having a first portion adjacent the top surface and a second portion adjacent the bottom surface, the first and second portions being separated by a front parting line having an irregular contour which is non-planar horizontally and vertically.

The block may include that the front parting line is positioned below the top planar surface and above the bottom planar surface. The block may include that the first portion extends outwardly from the top surface and that the first portion has an average downward angular slope between the top surface and the parting line. The block may include that the average downward angular slope is in the range of 2° to 40° or that the average downward angular slope is 20°.

The block may include that the second portion is irregularly contoured along the bottom surface of the block and that the irregular contour has first sections extending outward away from the rear face of the block and second sections extending inwardly towards the rear face of the block. The block may further include that the ratio of the length of first sections of the irregular contour along the bottom surface of the block to the total length of the irregular contour along the bottom surface of the block is 30 to 70 percent.

The block may include that the second portion of the front face has at least one protruding area, the at least one protruding area having a surface that extends outwardly from the front parting line of the block. The block may further include that the at least one protruding area has undercut areas and support areas. The block may include that the front parting line extends from the first side wall to the second side wall and/or that the front parting line intersects the plane of the top planar surface at least once.

The block may include that the rear face has a first portion adjacent the top surface and a second portion adjacent the bottom surface and that the first and second portions are separated by a rear parting line having an irregular contour which is non-planar horizontally and vertically. The block may further include that the rear parting line is positioned below the top planar surface and above the bottom planar surface. The block may further include that the first portion of the rear face extends outwardly from the top surface and that the first portion has an average downward angular slope between the top surface and the parting line and may include that the average downward angular slope is in the range of 2° to 40° or that the average downward angular slope is 20°.

The block may also include that the second portion of the rear face is irregularly contoured along the bottom surface of the block and that the irregular contour has first sections extending outward away from the rear face of the block and second sections extending inwardly towards the rear face of the block. The block may also include that the ratio of the length of first sections of the irregular contour of the second portion of the rear face along the bottom surface of the block to the total length of the irregular contour along the bottom surface of the block is 30 to 70 percent. The block may include that the second portion of the rear face has at least one protruding area, the at least one protruding area having a surface that extends outwardly from the parting line of the block. The block may include that the at least one protruding area has undercut areas and support areas.

The block may include that the rear parting line extends from the first side wall to the second side wall and/or that the rear parting line intersects the plane of the top planar surface at least once. The block may further include that the first side wall includes a first portion adjacent the top surface and a second portion adjacent the bottom surface, the first and second portions being separated by a first side parting line having an irregular contour which is non-planar horizontally and vertically and wherein the second side wall includes a first portion adjacent the top surface and a second portion adjacent the bottom surface, the first and second portions being separated by a second side parting line having an irregular contour which is non-planar horizontally and vertically.

A block including a block body having opposed front and rear faces, opposed first and second non-planar side walls, and opposed and substantially parallel top and bottom planar surfaces. The first side wall of the block joining the front face along a first front side edge, the second side wall joining the front face along a second front side edge, the top and bottom planar surfaces joining the front face along irregular front top and front bottom edges, respectively. The front top and front bottom edges of the block being horizontally parallel, the first and second front side edges being non-linear, such that in a front view of the block the front face has a shape defined by the first and second front side edges and top and bottom front edges that is not rectangular.

The block may include that the front face includes a first portion adjacent the top surface and a second portion adjacent the bottom surface and that the first portion intersects the top surface along the irregular top front edge, the irregular top front edge lying within the plane of the top surface and that the second portion intersects the bottom surface along the irregular bottom front edge, the irregular bottom front edge lying within the plane of the bottom surface. The block may further include that the first and second portions of the front face are separated by a parting line having an irregular contour which is non-planar horizontally and vertically and that the parting line extends from the first side wall to the second side wall. The block may further include that the parting line intersects the plane of the top planar surface at least once.

A block including a block body having opposed front and rear faces, opposed first and second side walls, and opposed and substantially parallel top and bottom planar surfaces. The front face of the block has a first portion adjacent the top surface and a second portion adjacent the bottom surface, the first and second portions defining a regular or irregular surface pattern. The first portion of the front face intersects the top surface along an irregular top front edge, the irregular top front edge lying within the plane of the top surface and the second portion intersects the bottom surface along an irregular bottom front edge, the irregular bottom front edge lying within the plane of the bottom surface. The first and second portions of the front face are separated by a parting line having an irregular contour which is non-planar horizontally and vertically. The surface pattern of the front face is configured such that a first area is formed on the plane of the bottom surface between a line representing a vertical projection of the front face on the plane of the bottom surface and, either the irregular bottom front edge or a line representing a vertical projection of the parting line on the plane of the bottom surface, whichever is closest to the back face at locations between the side walls, and a second area is formed between the line representing the vertical projection of the parting line and those portions of the bottom front edge extending outwardly beyond the line representing the vertical projection of the parting line, where the second area is 30% to 70% of the first area.

The block may include that the first and second portions of the front face are separated by a parting line having an irregular contour which is non-planar horizontally and vertically. The block may further include that the parting line extends from the first side wall to the second side wall and that the parting line intersects the plane of the top planar surface at least once.

A block system including a plurality of blocks having a block body including opposed front and rear faces, opposed first and second side walls, and opposed and substantially parallel top and bottom planar surfaces. The front face of the block having a first portion adjacent the top surface and a second portion adjacent the bottom surface, the first and second portions being separated by a parting line having an irregular contour which is non-planar horizontally and vertically. The blocks being configured such that when the blocks are stacked in at least first and second courses to form a wall having a vertical setback in the range of ¼ inch to 1 inch from course to course, in a top view of the wall the top planar surface of blocks in the first course is not exposed.

The block system may include that the parting line extends from the first side wall to the second side wall and/or that the parting line intersects the plane of the top planar surface at least once and/or that the parting line extends from the first side wall to the second side wall.

A block system including multiple blocks, at least a plurality of the multiple blocks having a block body including opposed front and rear faces, opposed first and second side walls, and opposed and substantially parallel top and bottom planar surfaces. The front face of at least the plurality of multiple blocks having a first portion adjacent the top surface and a second portion adjacent the bottom surface. The first portion of the front face intersecting the top surface along an irregular top front edge, the irregular top front edge lying within the plane of the top surface, the second portion intersecting the bottom surface along an irregular bottom front edge, the irregular bottom front edge lying within the plane of the bottom surface. The front face being configured such that when the blocks are stacked in at least a first lower and second upper course of blocks to form a wall having a vertical setback of ¼ inch to 1 inch from the first course to the second course, in a top view of the wall only the front face of blocks in the first course is visible.

The block system may include that the parting line extends from the first side wall to the second side wall and/or that the parting line intersects the plane of the top planar surface at least once.

A block comprising including a block body having opposed front and rear faces, opposed first and second side walls, and opposed and substantially parallel top and bottom surfaces. The top surface of the block extending from the rear face to a first portion of the front face and the bottom surface extending from the rear face to a second portion of the front face. The first portion and second portion of the block are separated by an edge having an irregular contour along a horizontal plane and along a vertical plane.

The block may include that the first portion of the front face has an averaged planar decline from the top surface to the second portion of the front face and that the averaged planar decline may have a slope in the range of 2° to 40°. The block may include that the edge extends from the first side wall to the second side wall and/or that the edge intersects the plane of the top planar surface at least once. The block may also include that the second portion of the front face has an averaged plane and that the averaged plane may be substantially vertical. The block may also include that at least a portion of the bottom surface extends farther from the rear face than at least a portion of the top surface.

A mold assembly for producing wall blocks having a block body with opposed front and rear faces, opposed first and second side surfaces, and opposed and substantially parallel top and bottom planar surfaces, the front face having a first portion adjacent the top surface and a second portion adjacent the bottom surface, the first and second portions being separated by a parting line having an irregular contour which is non-planar horizontally and vertically. The mold assembly including a production pallet; a stripper shoe; and a mold box including first and second opposed side walls and opposed front and rear walls which together form a perimeter of at least one mold cavity shaped to form a block during a block forming process. The mold box having an open top and an open bottom, the production pallet enclosing the open bottom of the mold box during a block forming process. The stripper shoe of the mold assembly enclosing at least a portion of the open top of the mold box during a block forming process, the stripper shoe having a planar surface shaped for forming the top planar surface of a block and a first contoured molding surface shaped for forming the first portion of the front face of the block during a block forming process. The front wall of the mold box having a contoured molding surface shaped to form the second portion of the front face of the block during a block forming process. At least a portion of the first contoured molding surface of the stripper shoe extending further into the mold cavity than the planar surface of the stripper shoe during a block forming process to thereby provide an area of increased compression within the mold cavity adjacent the contoured molding surface of the front wall.

The mold assembly may include that the front wall is moveable during a block forming process from a molding position when the block is formed in the mold cavity to a retracted position when the block is released from the mold cavity.

The mold assembly may include that the molding surface of the stripper shoe has a first edge and the molding surface of the front wall has a second edge, the first and second edges being aligned during a block forming process, the parting line of the block being formed adjacent the aligned first and second edges. The mold assembly may further include that the first and second edges are shaped such that the parting line formed adjacent the first and second edges extends from the first side wall to the second side wall of the blocks. The mold assembly may further include that at least a portion of the second edge extends into the mold cavity further than at least a portion of the molding surface of the front wall. The mold assembly may include that the first side surface of the blocks has a first portion adjacent the top surface and a second portion adjacent the bottom surface, the first and second portions being separated by a first side parting line, and that the second side surface of the blocks has a first portion adjacent the top surface and a second portion adjacent the bottom surface, the first and second portions being separated by a second side parting line, and that the stripper shoe includes a third contoured molding surface shaped for forming the first portion of the first side surface of the block during a block forming process and a fourth contoured molding surface shaped for forming the first portion of the second side surface of the block during a block forming process, the first side wall of the mold box having a contoured molding surface shaped to form the second portion of the first side surface of the block during a block forming process and the second side wall of the mold box having a contoured molding surface shaped to form the second portion of the second side surface of the block during a block forming process.

The mold assembly may include that the rear face of the blocks has a first portion adjacent the top surface and a second portion adjacent the bottom surface and that the first and second portions are separated by a rear parting line, and that the stripper shoe has a second contoured molding surface shaped for forming the first portion of the rear face of the block during a block forming process and the rear wall has a contoured molding surface shaped to form the second portion of the rear face of the block during a block forming process. The mold assembly may include that the contoured molding surface of the front wall is shaped such that the second portion of the front face of a block formed in the mold cavity intersects the bottom surface of the block along an irregular bottom front edge, the irregular bottom front edge lying within the plane of the bottom surface of the block. The mold assembly may include that the first contoured molding surface of the stripper shoe is shaped such that the first portion of the front face of a block formed in the mold cavity intersects the top surface of the block along an irregular top front edge, the irregular top front edge lying within the plane of the top surface of the block.

A method of producing blocks in a mold assembly having a production pallet, a mold box with an open top and an open bottom and opposed side walls and opposed front and rear walls which together form a perimeter of at least one mold cavity shaped to form a block during a block forming process with the front wall being moveable from a molding position to a retracted position, and a stripper shoe. The method including positioning the production pallet beneath the mold box to enclose the bottom of the mold box; depositing block forming material into the mold cavity with the front wall in the molding position; and lowering the stripper shoe to enclose the open top of the mold box and to compress the block forming material within the mold cavity to form a block. The stripper shoe having a planar molding surface shaped for forming a top planar surface of the block and a first contoured molding surface shaped for forming a first portion of the front face of the block, the front wall having a contoured molding surface shaped to form a second portion of the front face of the block, the first and second portions of the front face of the block being separated by a parting line having an irregular contour which is non-planar horizontally and vertically. The method further including moving the front wall of the mold box from the molding position to the retracted position; and removing the block forming material from the mold box after moving the front wall to the retracted position.

The method may include that the first portion of the front face intersects the top surface of the block along an irregular top front edge, the irregular top front edge lying within the plane of the top surface of the block and that the second portion of the front face intersects the bottom surface of the block along an irregular bottom front edge, the irregular bottom front edge lying within the plane of the bottom surface of the block. The method may include that the parting line extends from a first side surface to a second side surface of the block and/or that the parting line intersects the plane of the top planar surface of the block at least once.

The method may include that at least one of the rear wall and opposed side walls are movable from a molding position to a retracted position, the method further include positioning the at least one of the rear wall and opposed side walls in the molding position during the step of depositing block forming material into the mold cavity; moving the at least one of the rear wall and opposed side walls of the mold box from the molding position to the retracted position; and removing the block forming material from the mold box after moving the at least one of the rear wall and opposed side walls to the retracted position.

A mold assembly for use in a block machine to form multiple blocks on each cycle of the block machine, each block having front and rear faces, opposed side faces and top and bottom faces. The mold assembly including a plurality of mold cavities, each mold cavity having an open top and an open bottom and being defined by a plurality of side walls; and a stripper shoe including a first stage having a first molding surface with a first non-planar pattern and a second stage having a second molding surface with a second non-planar pattern. The stripper shoe being configured for introduction into the top of at least one of the mold cavities to press the first and second patterns on moldable material contained in the at least one mold cavity to impart the first and second patterns on first and second portions, respectively, of the front face of a block formed in the at least one mold cavity, the first stage being moveable independently of the second stage.

The mold assembly may include that the second molding surface includes an elongate protruding ridge configured to form a false joint in the first portion of the front face of the block, the false joint extending between the top and bottom faces of the block at an angle in the range of 20° to 40° from vertical. The mold assembly may include that the first and second molding surfaces are positioned such that the second portion substantially surrounds a perimeter of the first portion of the front face.

A mold assembly for use in a block machine to form multiple blocks on each cycle of the block machine, each block having front and rear faces, opposed side faces and top and bottom faces. The mold assembly including a plurality of mold cavities, each mold cavity having an open top and an open bottom and being defined by a plurality of side walls, at least one of the side walls having an upper section inclined in a direction of a center of the mold cavity, the upper section having an upper section molding surface with a non-planar pattern. The mold assembly further including a stripper shoe having a first molding surface with a first non-planar pattern, the stripper shoe being configured for introduction into the top of at least one of the mold cavities to press the first non-planar pattern on moldable material contained in the at least one mold cavity to impart the first pattern on a first portion of the front face of a block formed in the at least one mold cavity with a second portion of the front face of the block formed in the at least one mold cavity being imparted with the non-planar pattern of the upper section molding surface of the at least one side wall.

The mold assembly may include that the at least one side wall is movable during a block forming process from a molding position to a retracted position.

A mold assembly for producing wall blocks having a block body having opposed front and rear faces, opposed first and second side surfaces, and opposed and substantially parallel top and bottom planar surfaces with the front face having a first portion adjacent the top surface and a second portion adjacent the bottom surface and with the first and second portions being separated by a parting line having an irregular non-planar contour. The mold assembly including a production pallet; a stripper shoe; and a mold box including first and second opposed side walls and opposed front and rear walls which together form a perimeter of at least one mold cavity shaped to form a block during a block forming process. The mold box having an open top and an open bottom with the production pallet enclosing the open bottom of the mold box during a block forming process and the stripper shoe enclosing at least a portion of the open top of the mold box during a block forming process. The stripper shoe having a contoured non-planar molding surface shaped for forming one of the first and second portions of the front face of the block during a block forming process. The front wall of the mold box having a contoured non-planar molding surface shaped to form the other of the first and second portions of the front face of the block during a block forming process. The molding surface of the stripper shoe has a first edge and the molding surface of the front wall has a second edge, the first and second edges being aligned during a block forming process with the parting line of the block being formed adjacent the aligned first and second edges and with the aligned first and second edges being non-planar.

The mold system may include that the mold box is configured such that the contoured molding surface of the stripper shoe forms the first portion of the front face of the block and the contoured molding surface of the front wall forms the second portion of the front face of the block during a block molding process. The mold assembly may include that the front wall of the mold cavity is moveable during a block forming process from a molding position when the block is formed in the mold cavity to a retracted position when the block is discharged from the mold cavity.

A mold assembly for producing wall blocks having a block body with opposed front and rear faces, opposed first and second side surfaces, and opposed and substantially parallel top and bottom planar surfaces with the front face having a first portion adjacent the top surface and a second portion adjacent the bottom surface, and with a third portion positioned between the first and second portions, the first and third portions being separated by a first parting line having an irregular non-planar contour, the second and third portions being separated by a second parting line having an irregular non-planar contour. The mold assembly including a production pallet; a stripper shoe; and a mold box including first and second opposed side walls and opposed front and rear walls which together form a perimeter of at least one mold cavity shaped to form a block during a block forming process. The mold box having an open top and an open bottom with the production pallet enclosing the open bottom of the mold box during a block forming process and with the stripper shoe enclosing at least a portion of the open top of the mold box during a block forming process. The stripper shoe having a contoured non-planar molding surface shaped for forming the third portion of the front face of the block during a block forming process. The front wall of the mold box having a contoured non-planar molding surface shaped to form the second portion of the front face of the block during a block forming process, the rear wall having a contoured non-planar molding surface shaped to form the first portion of the front face of the block during a block forming process. The mold assembly further including that the molding surface of the stripper shoe has a first edge and the molding surface of the front wall has a second edge, the first and second edges being aligned during a block forming process, the first parting line of the block being formed adjacent the aligned first and second edges, the aligned first and second edges being non-planar.

A block including a block body having opposed front and rear faces, opposed first and second side walls, and opposed and substantially parallel top and bottom planar surfaces. The front face of the block having a first portion adjacent the top surface and a second portion adjacent the bottom surface, the first portion intersecting the top surface along an irregular top front edge, the irregular top front edge lying within the plane of the top surface, and the second portion intersecting the bottom surface along an irregular bottom front edge, the irregular bottom front edge lying within the plane of the bottom surface. The rear face of the block having a first portion adjacent the top surface and a second portion adjacent the bottom surface, the first portion intersecting the top surface along an irregular top rear edge, the irregular top rear edge lying within the plane of the top surface, and the second portion intersecting the bottom surface along an irregular bottom rear edge, the irregular bottom rear edge lying within the plane of the bottom surface.

The block may include that the first and second portions of the front face are separated by a front parting line having an irregular contour which is non-planar horizontally and vertically and that the first and second portions of the rear face are separated by a rear parting line having an irregular contour which is non-planar horizontally and vertically. The block may further include that the front parting line extends from the first side surface to the second side surface and/or that the rear parting line extends from the first side surface to the second side surface. The block may further include that the front parting line intersects the plane of the top planar surface at least once and/or that the rear parting line intersects the plane of the top planar surface at least once.

A method of producing blocks in a mold assembly which includes a production pallet, the method including providing a mold box including opposed side walls and opposed front and rear walls which together form a perimeter of at least one mold cavity shaped to form a block during a block forming process, the front wall being moveable from a molding position to a retracted position, the at least one mold cavity having an open top and an open bottom, and a stripper shoe. The method includes positioning the production pallet beneath the mold box to enclose the bottom of the at least one mold cavity and depositing block forming material into the at least one mold cavity with the front wall in the molding position. The method further including lowering the stripper shoe to enclose the open top of the at least one mold cavity and to compress the block forming material within the at least one mold cavity to form a block. The stripper shoe has a planar molding surface shaped for forming a top planar surface of the block and a first contoured molding surface shaped for forming a first portion of the front face of the block. The first contoured molding surface of the stripper shoe has an irregular front edge which is non-linear horizontally and vertically. The front wall has a contoured molding surface shaped to form a second portion of the front face of the block with the first and second portions of the front face of the block being separated by a parting line formed along the irregular front edge of the first contoured molding surface of the stripper shoe with at least a portion of the first contoured molding surface of the stripper shoe extending further into the at least one mold cavity than the planar surface of the stripper shoe to thereby provide an area of increased compression within the at least one mold cavity adjacent the contoured molding surface of the front wall. The contoured molding surface of the front wall has an irregular bottom edge with at least a portion of the irregular bottom edge being closer to the rear wall of the mold box than a vertically adjacent portion of the irregular front edge of the first contoured molding surface of the stripper shoe. The method further including moving the front wall of the mold box from the molding position to the retracted position; and removing the block forming material from the at least one mold cavity after moving the front wall to the retracted position.

The method may include that when in the molding position the front wall is adjacent the opposed side walls along first and second non-linear side edges, such that in a front view of a block formed in the at least one mold cavity a front face of the block has a shape that is not rectangular. The method may include that the planar molding surface and first contoured molding surface of the stripper shoe meet along an irregular top edge, at least a portion of the irregular bottom edge being closer to the rear wall of the mold box than a vertically adjacent portion of the irregular top edge.

The method may include that the first contoured molding surface of the stripper shoe includes a projecting ridge shaped to extend into the at least one mold cavity during a block forming process to impart a first section of a false joint into the first portion of the front face of the block and the contoured molding surface of the front wall includes a projecting ridge shaped to extend into the at least one mold cavity during a block forming process to impart a second section of the false joint into the second portion of the front face of the block. The method may include that the parting line extends from a first side surface of the block to a second side surface of the block and/or that the parting line intersects the plane of the top planar surface of the block at least once.

A mold assembly for producing one or more blocks having a block body including opposed front and rear faces, opposed first and second side surfaces, and opposed and substantially parallel top and bottom planar surfaces with the front face having a first portion adjacent the top surface and a second portion adjacent the bottom surface. The mold assembly including a production pallet; a stripper shoe; and a mold box including first and second opposed side walls and opposed front and rear walls which together form a perimeter of at least one mold cavity shaped to form a block during a block forming process. The at least one mold cavity has an open top and an open bottom with the production pallet enclosing the open bottom of the at least one mold cavity during a block forming process and the stripper shoe enclosing at least a portion of the open top of the at least one mold cavity during a block forming process. The stripper shoe has a planar surface shaped for forming the top planar surface of a block and a patterned non-planar molding surface shaped for forming the first portion of the front face of the block during a block forming process, at least a portion of the patterned non-planar molding surface of the stripper shoe extending further into the at least one mold cavity than the planar surface of the stripper shoe during a block forming process to thereby provide an area of increased compression within the at least one mold cavity adjacent the patterned non-planar molding surface of the front wall. The front wall has a patterned non-planar molding surface shaped to form the second portion of the front face of the block during a block forming process. The patterned non-planar molding surface of the stripper shoe includes a projecting ridge shaped to extend into the at least one mold cavity during a block forming process to impart a first section of a false joint into the first portion of the front face of the block. The patterned non-planar molding surface of the front wall includes a projecting ridge shaped to extend into the at least one mold cavity during a block forming process to impart a second section of the false joint into the second portion of the front face of the block.

The mold assembly may further include that the first and second portions of the front face of the block are separated by a parting line having an irregular contour which is non-planar horizontally and vertically and that the patterned non-planar molding surface of the stripper shoe has a first edge and the patterned non-planar molding surface of the front wall has a second edge, the first and second edges being aligned during a block forming process such that the parting line of the block is formed adjacent the aligned first and second edges. The mold assembly may further include that the parting line extends from the first side surface of the block to the second side surface of the block.

The mold assembly may include that at least a portion of the projecting ridge of the front wall is positioned at a non-perpendicular angle with respect to the production pallet such that during a block forming process block forming material is deposited within the at least one mold cavity vertically between the at least a portion of the projecting ridge and the patterned non-planar molding surface of the stripper shoe. The mold assembly may include that the parting line intersects the plane of the top planar surface of the block at least once.

The mold assembly may include that when in the molding position the front wall is adjacent the opposed side walls along first and second non-linear side edges, such that in a front view of a block formed in the at least one mold cavity a front face of the block has a shape that is not rectangular. The mold assembly may include that the planar surface and patterned non-planar molding surface of the stripper shoe meet along an irregular top edge and the patterned non-planar molding surface of the front wall has an irregular bottom edge, at least a portion of the irregular bottom edge being closer to the rear wall of the mold box than a vertically adjacent portion of the irregular top edge.

A mold assembly for producing wall blocks having a block body with opposed front and rear faces, opposed first and second side surfaces, and opposed and substantially parallel top and bottom planar surfaces with the front face having a first portion adjacent the top surface and a second portion adjacent the bottom surface and with the first and second portions being separated by a parting line having an irregular non-planar contour. The mold assembly including a production pallet; a stripper shoe; and a mold box including first and second opposed side walls and opposed front and rear walls which together form a perimeter of at least one mold cavity shaped to form a block during a block forming process. The at least one mold cavity having an open top and an open bottom with the production pallet enclosing the open bottom of the at least one mold cavity during a block forming process and the stripper shoe enclosing at least a portion of the open top of the at least one mold cavity during a block forming process. The stripper shoe having a contoured molding surface shaped for forming the first portion of the front face of the block during a block forming process. The front wall having a contoured molding surface shaped to form the second portion of the front face of the block during a block forming process, the front wall being moveable during a block forming process from a molding position to a retracted position. The molding surface of the front wall being configured such that in a cross-sectional view of the front wall along a vertical plane substantially perpendicular to the front wall, the intersection of the vertical plane with the molding surface of the front wall defines a convex path having a first end at a top of the front wall and a second end at a bottom of the front wall, a first vertical line passing through the first end being positioned farther from the rear wall than a second vertical line passing through the second end, a majority of the convex path being positioned farther from the rear wall than the first vertical line.

The mold assembly may include that the contoured molding surface of the stripper shoe has a first edge and the contoured molding surface of the front wall has a second edge, the first and second edges being aligned during a block forming process such that the parting line of the block is formed adjacent the aligned first and second edges. The mold assembly may further include that the first and second edges are shaped such that the parting line extends from the first side surface of the block to the second side surface of the block.

The mold assembly may include that the stripper shoe includes a planar molding surface and that at least a portion of the contoured molding surface of the stripper shoe extends further into the at least one mold cavity than the planar surface of the stripper shoe during a block forming process to thereby provide an area of increased compression within the at least one mold cavity adjacent the contoured molding surface of the front wall. The mold assembly may further include that the first and second edges are shaped such that parting line intersects the plane of the top planar surface of the block at least once.

The mold assembly may include that the contoured molding surface of the stripper shoe includes a projecting ridge configured to extend into the at least one mold cavity during a block forming process to impart a first section of a false joint into the first portion of the front face of the block and the contoured molding surface of the front wall includes a projecting ridge configured to extend into the at least one mold cavity during a block forming process to impart a second section of the false joint into the second portion of the front face of the block, the second section of the false joint being non-perpendicular to a bottom planar surface of the block. The mold assembly may include that the stripper shoe includes a planar molding surface, the planar molding surface and first contoured molding surface of the stripper shoe meeting along an irregular top edge, a third vertical line passing through the intersection of the irregular top edge and the vertical plane being positioned farther from the rear wall than the second vertical line.

BRIEF DESCRIPTION OF THE DRAWINGS

The various embodiments of the present invention will now be described by way of example with reference to the accompanying drawings, wherein.

DETAILED DESCRIPTION OF THE PREFERRED EMBODIMENTS

Figure 1:
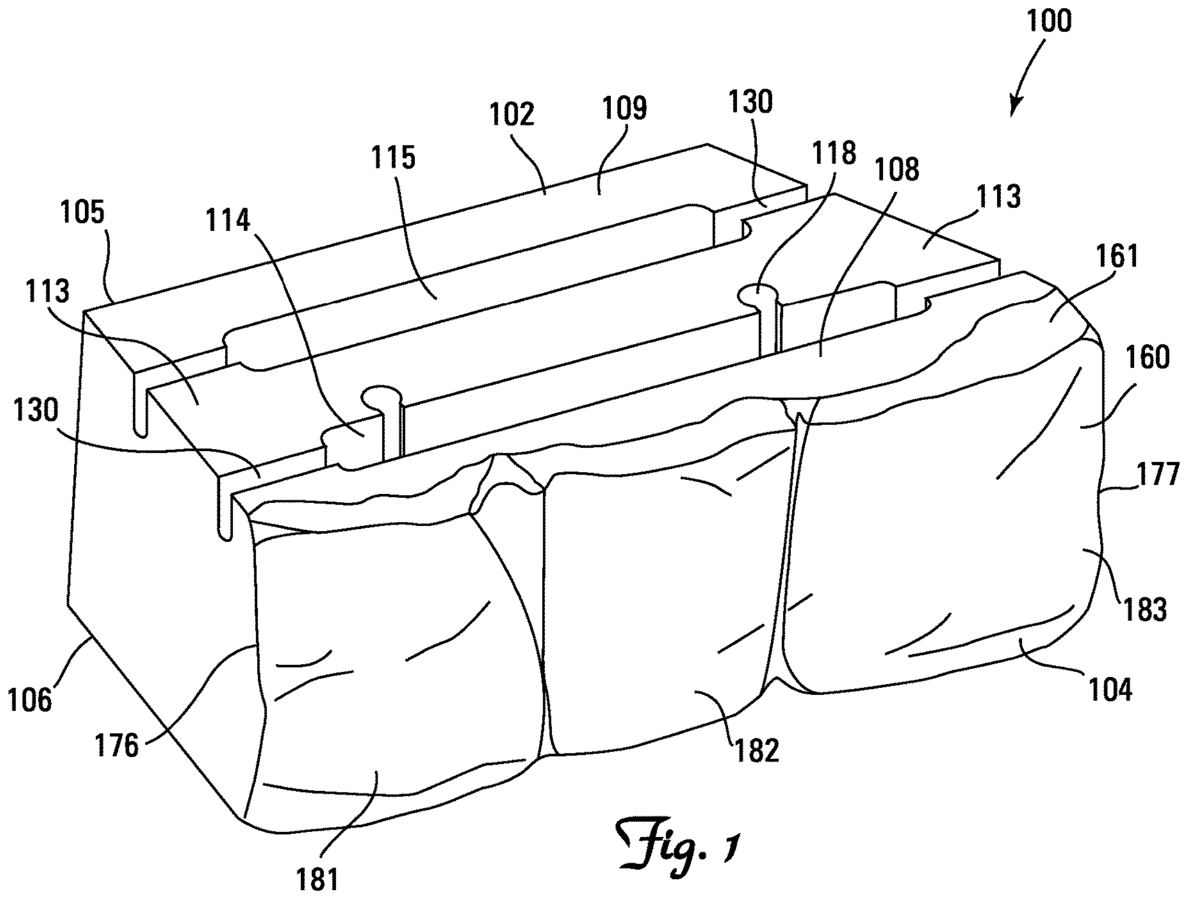
FIGS. 1 to 6 are left and right top perspective, front, top, bottom, and side views, respectively, of an embodiment of a block.

In this application, the term "block" refers to bricks, blocks, stones, tiles or other three dimensional objects that can be used in the construction of floors, walls, retaining walls, columns or other structures, including interior and exterior structures, and including load bearing and non-load bearing structures. Therefore, although all of the block embodiments described herein are directed to wall blocks it should be understood that the inventive concepts included herein apply to all types of blocks and are not limited to wall blocks.

In forming a wall, one row of blocks is laid down, forming a course. A second course is laid on top of this by positioning the lower surface of one block on the upper surface of another block. It should be understood that lower surface and upper surface may refer to either the top surface or bottom surface of the block such that whichever surface is facing downward becomes the lower surface and whichever surface is facing upward becomes the upper surface. The blocks may be provided with pin holes and at least one core which may serve as a pin receiving cavity. The blocks may also be provided with a pin receiving channel. The location, shape, and size of the optional pin holes, receiving channels and core are selected to maximize the strength of the block, as described by reference to the drawings. It is also to be understood that the pin holes, receiving channels and cores in addition to pins described below could also be used on different block types and block shapes to form different walls and that the block shown with these features does not limit the scope of the invention. It should be understood, however, that use of a pin connection system for the blocks is not limiting and other types of connection methods are within the scope of the present invention.

An embodiment of the wall block is shown in FIGS. 1 to 6. Block 100 is made of a rugged, weather resistant material; preferably (and typically) zero-slump molded concrete. Other suitable materials include plastic, concrete with fiberglass reinforcing, composite polymers, and any other moldable material. Block 100 has a block body having parallel top surface 102 and bottom surface 103, front face 104, rear face 105 and first and second side wall surfaces 106 and 107. Rear face 105 extends from top surface 102 to bottom surface 103 and side walls 106 and 107 extend from top surface 102 to bottom surface 103, converging from front face 104 toward rear face 105. Top surface 102, bottom surface 103, front face 104, rear face 105 and side walls 106 and 107 form block body 120. Front face 104 has a compound shape and may protrude outward from top and bottom surfaces 102 and 103, respectively, in a direction generally away from block body 120, and/or extend into the block body 120 towards the rear surface 105 of the block. Front face 104 extends from top surface 102 to bottom surface 103 and from side wall 106 to side wall 107. It should be understood that block 100 is not limiting and that block 100 could have any desired shape and could be any desired dimension. It should be further understood that front face 104 could have any shape, pattern or texture as desired.

Figure 4:
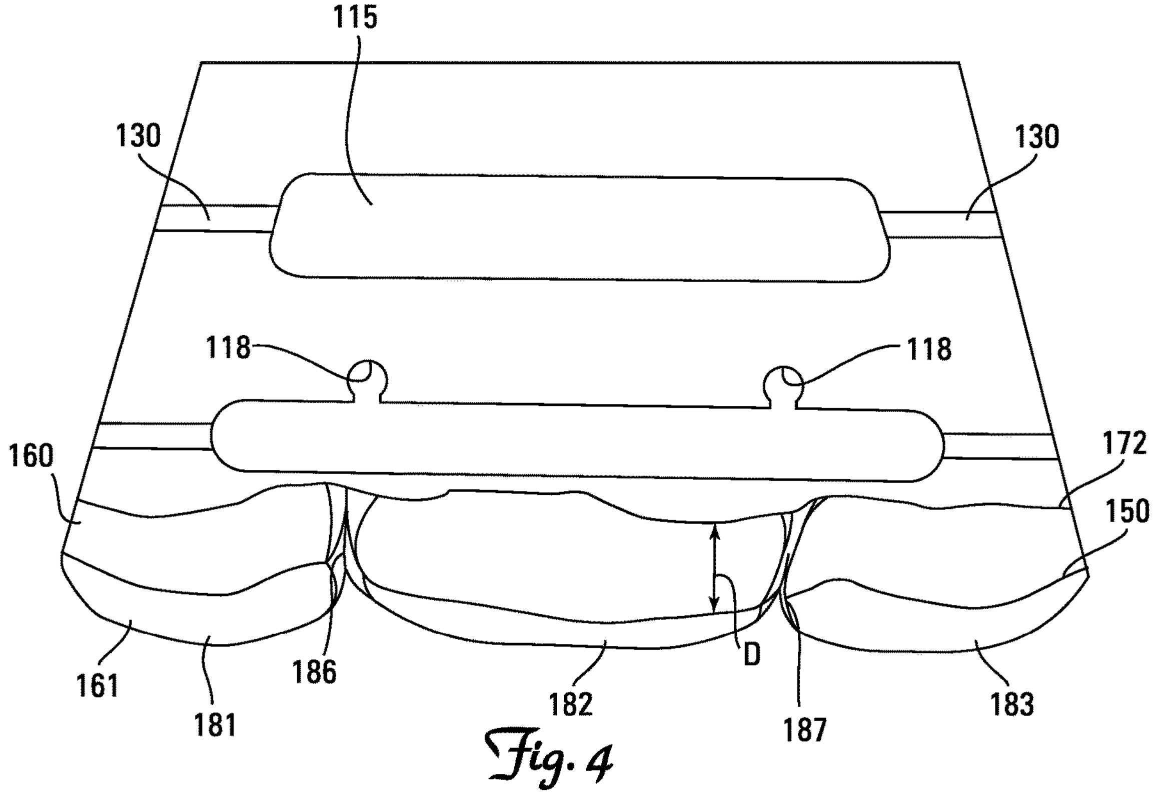
Figure 5:
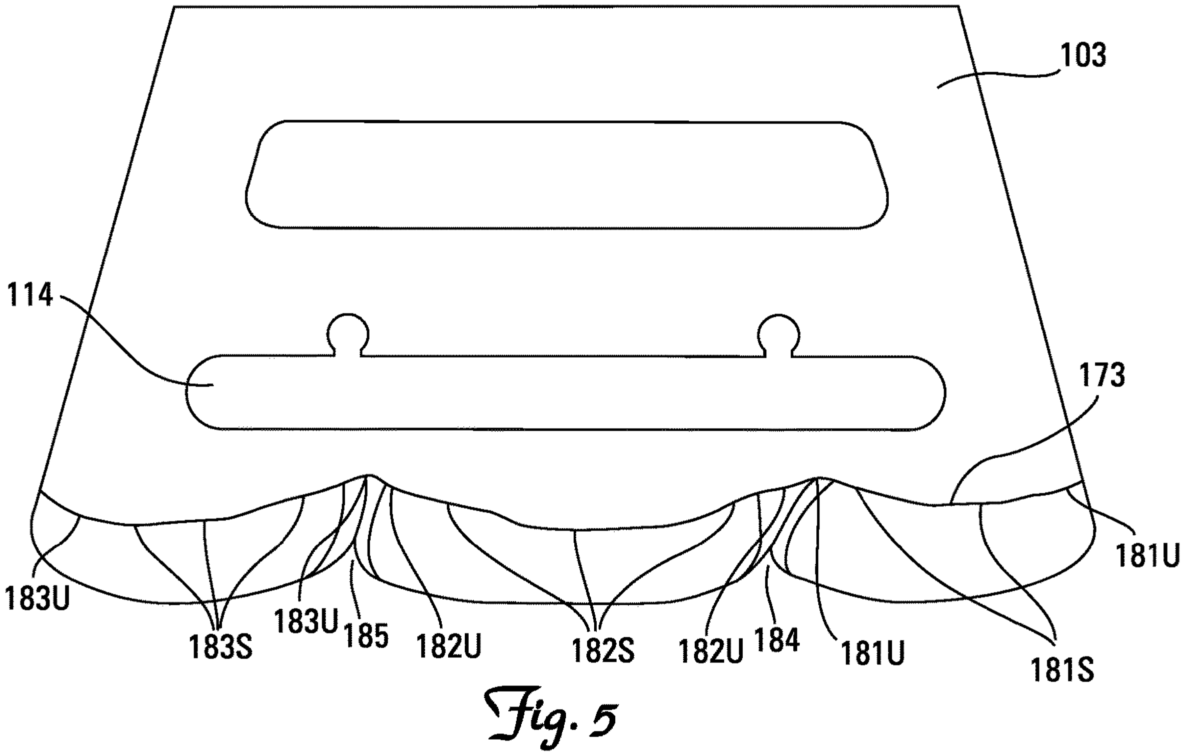
Figure 6:
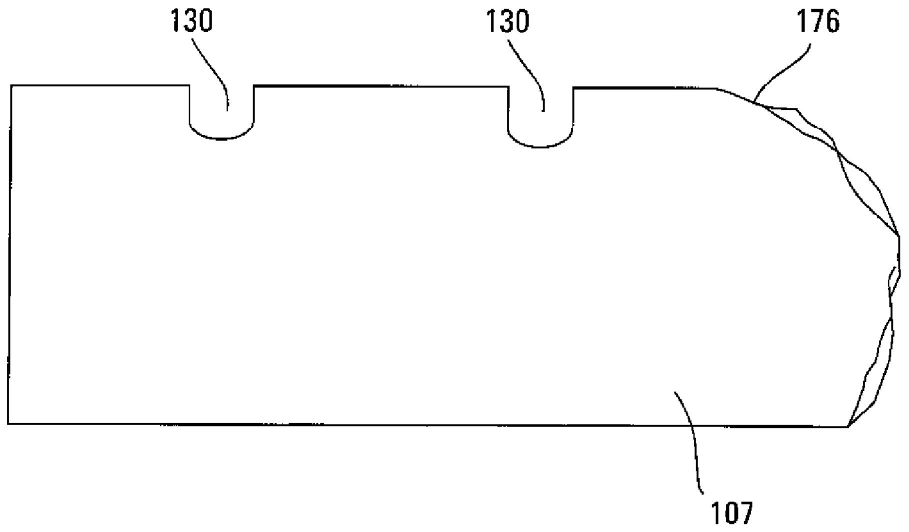

As shown in FIGS. 4 and 5, which are top and bottom views of block 100, respectively, block 100 may include optional openings or cores 114 and 115 that may extend from top surface 102 to bottom surface 103, or may only extend partially through block 100, i.e., open to top surface 102 but closed at bottom surface 103. Cores 114 and 115 divide block 100 into front portion 108, back portion 109 and center portion 110. Cores 114 and 115 reduce the weight of block 100. Lower block weight is both a manufacturing advantage and a constructional advantage when building a wall from the wall blocks as it reduces cost due to less material and makes lifting of the blocks easier. In other embodiments not shown cores 114 and 115 may be of equal depth (front to back) and the depth of the center and back portions may be unequal. Cores 114 and/or 115 may also be utilized as pin receiving cavities, accepting a top portion or head of a pin in a lower course of blocks in the construction of a wall and is discussed further below. Block 100 also includes neck portions 113 adjacent side walls 106 and 107, extending from front portion 108 to center portion 110 and to back portion 109. Front face 104 may form part of front portion 108, while rear face 105 may form part of back portion 109.

Block 100 may include first and second pin holes 118 located in center portion 110 and extending through block 100. Pin holes 118 open to top surface 102 and bottom surface 103. First and second pin holes 118 also open into the rear surface of core 114, which is located in closer proximity to front face 104 than is core 115. The openings of pin holes 118 into the rear surface of core 114 extend from the top surface 102 towards the bottom surface 103 and form elongate slots 119 having a lateral width as measured in a direction between side walls 106 and 107 which is less than the maximum lateral width of the pin holes 118. The pins used with this block are dimensioned to fit within the pin holes but are larger than slots 119. It should be understood that this is not limiting and that block 100 can be manufactured with the pin holes extending from top surfaces 102 through any desired distance toward bottom surface 103, i.e., open to the top surface but not open to the bottom surface. Further pin holes 118 may be manufactured to open into any surface of core 115 and/or any surface of core 114 or may be manufactured to be closed to both cores and located anywhere in the block body as desired. The pin hole interior surfaces may be tapered from wider to narrower from the top surface to the bottom surface or its interior surfaces may be non-tapered or plumb. This taper of the surfaces of the pin holes is used in the manufacturing phase to help ease the removal of the block unit from the mold. The taper creates a draft angle which helps strip the pin hole forming core with greater ease from the block in the mold while helping to maintain the integrity of the shape of the pin hole. The pin holes 118 may be positioned such that they are closer to side walls 106 and 107. It should be noted that additional pin holes can be provided, if desired, so as to provide for further choices of predetermined setback when building a wall. Additionally, the location of the pin holes in the body of the block may be varied as desired and could, for example, be located in front portion 108, back portion 109 or neck portions 113.

Pin holes 118 are sized to receive a pin (not shown). The pin may have a shaft which is placed into a pin hole of the top surface of block 100 in a lower course of blocks when constructing a wall. The pin may also have a head, which may have a larger diameter than the shaft and may also be tapered, square, round or any other desired shape. Additionally the shaft of the pin may be circular, square or any other desired shape as well. In this manner, the pin inserted into a pin hole on a lower course of blocks in a wall engages a core of a block in an upper course. This results in an interlocking of the blocks with a predetermined setback or no setback depending upon the location of the pinholes and location of cores/pin receiving cavities in the block body. It is to be understood that the shape of the pin is not limiting and could be, for example, uniformly shaped with no head or could have any other number of features.

As best seen in FIG. 4, top surface 102 has channels 130 located in neck portions 113. Channels 130 extend from side wall 106 to a first core side wall of cores 114 and 115. Channels 130 also extend from side wall 107 to a second core side wall of cores 114 and 115. Thus, block 100 includes two channels extending through the entire length of the block body, from sidewall 106 through cores 114 and 115 and to side wall 107. Channels 130 are located on the top surface 102 and are formed from a bridge styled core support or forming member that is mounted to a side wall or liner of a mold cavity or from the shoe. The forming member may form both the cores, pin holes and elongate slots. A forming member in accordance with the present invention is disclosed in U.S. Patent Publication No. 2013/0276401 A1. During the manufacturing of block 100, concrete or other desired material settles and is vibratory compacted around the forming member. The block is then stripped from the mold cavity, forming channels 130, along with cores 114 and 115. Depending upon the application, channels 130 may be of sufficient width and depth as to accommodate a channel bar or other connection means for securing geogrid to the courses of blocks during construction of a retaining wall. Channels 130 may also receive horizontal reinforcing materials such as rebar during the construction of a wall. It should be understood that in some applications where the pin hole extends from the top surface through to the bottom surface, the top and bottom surfaces of block 100 may be reversible.

Figure 39:
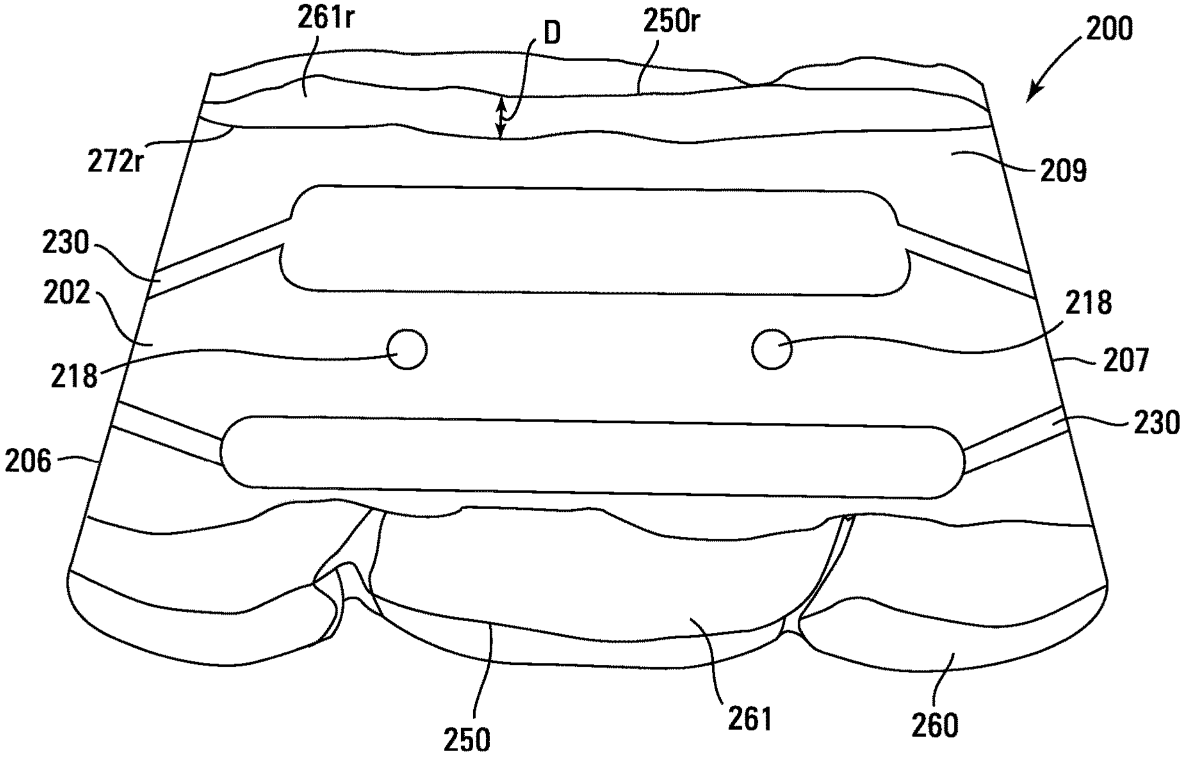
Figure 40:
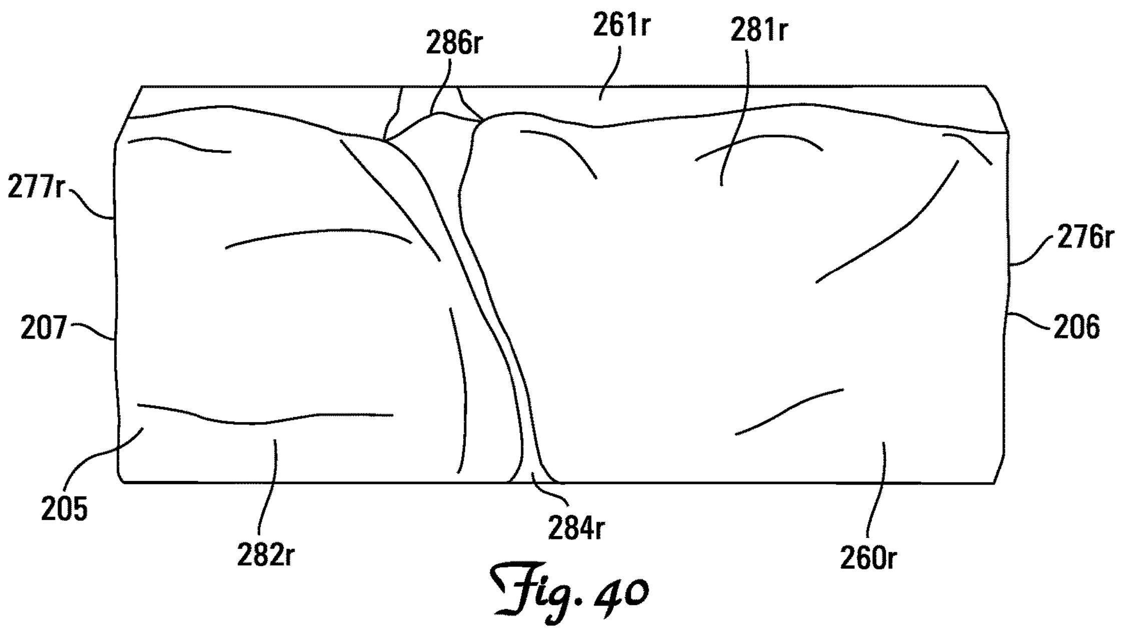
Figure 41:
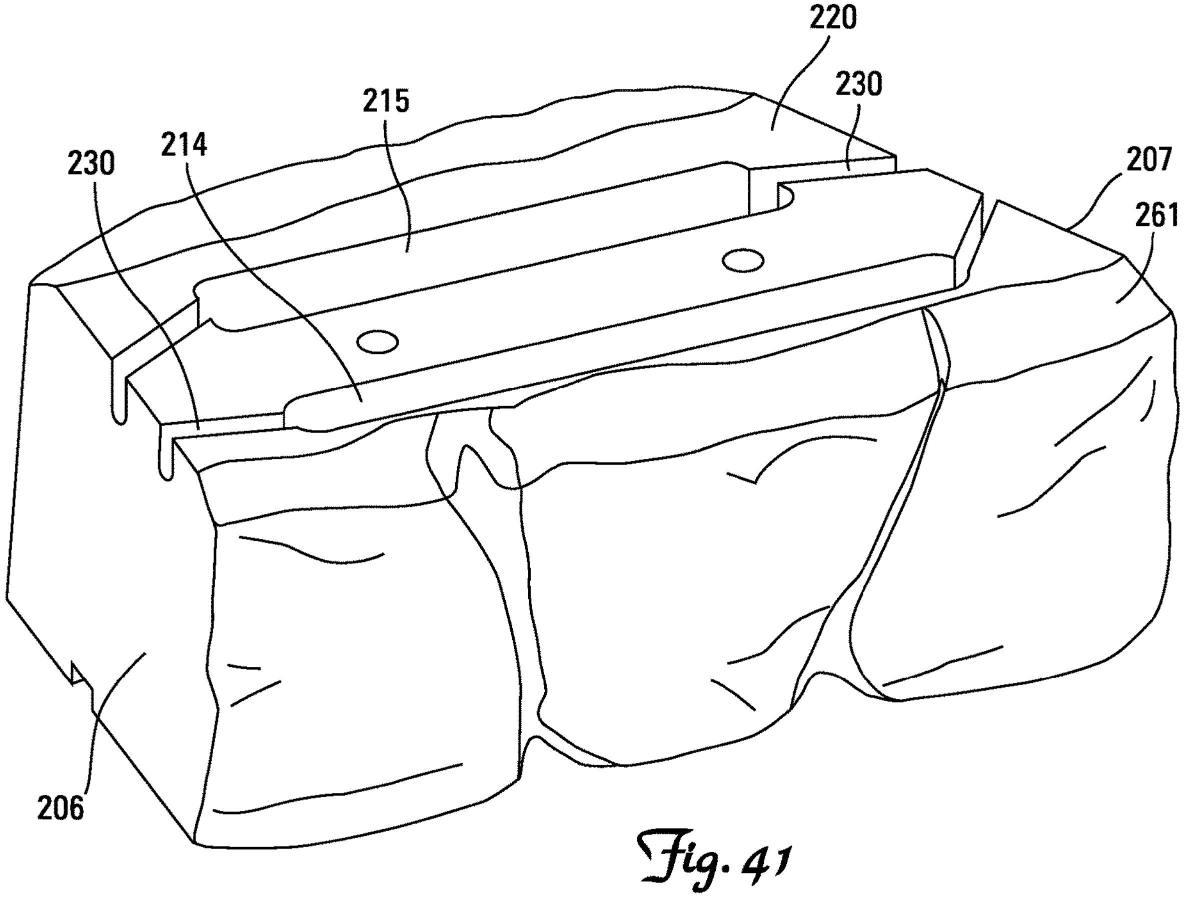

In other words, when block 100 is used in the construction of a wall either top surface 102 or bottom surface 103 may face downward. Thus, the head of the pin may then also be received in some applications in a channel. It should be noted that the shape, width and length of the channel can vary depending upon the application and could for example only extend a portion of the length of neck portion 113 or may open onto only one of side walls 106 or 107 or may open onto neither side wall. It should further be understood that the receiving channel may be angled from the side wall to the core as shown in FIGS. 39 and 41.

Figure 2:
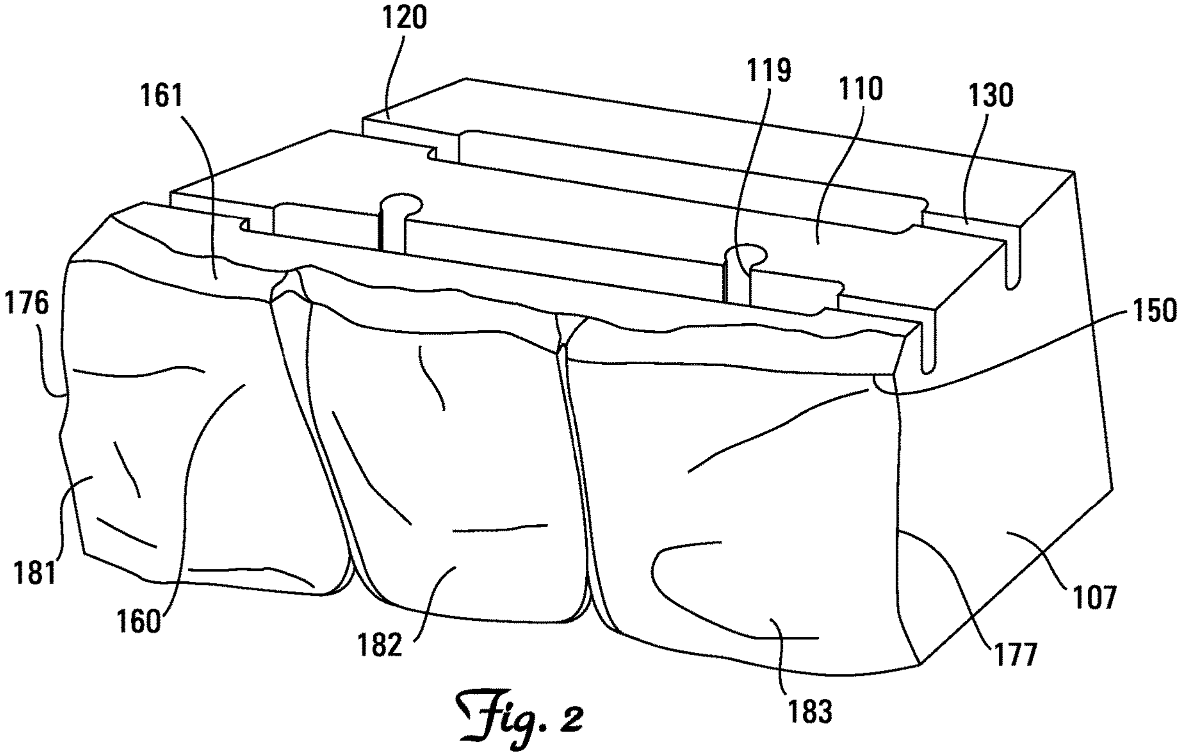
Figure 3:
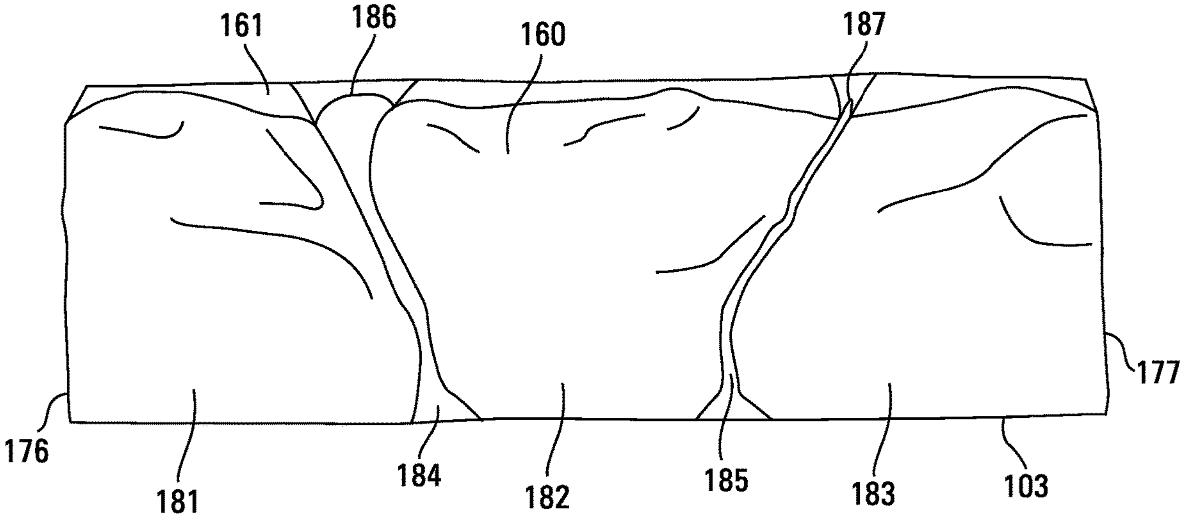

As best seen in FIGS. 1 to 3, front face 104 has multiple shaped areas that are three dimensional and are molded to have the appearance of natural stone. Front face 104 has an irregular compound shape having surfaces that may extend outwardly from top and bottom surfaces 102 and 103, respectively, and surfaces that may extend inwardly into block body 120 toward rear face 105. The multiple shaped areas with natural stone-like appearance are molded onto the block by a movable face liner and a forming stripper shoe during the molding process and is discussed further below. The moveable face liner molds front portion 160 of front face 104 and the forming stripper shoe molds front portion 161 of front face 104. The area where the moveable face liner and stripper shoe align or abut along the front face of the block during the molding process imprints a parting line 150 into the front face of block 100. In some block embodiments parting line 150 comprises a visually distinct edge. In other block embodiments the transition between the stripper shoe and the face liner is gradual and the parting line or edge may not visually distinct, due in part to the texture or pattern of the front face which may obscure the parting line or edge.

Parting line 150 is the separation boundary of front portion 160 and front portion 161. Parting line 150 extends across front face 104 from side wall 106 to side wall 107. In some embodiments parting line 150 extends the entire distance between side walls 106 and 107. In some embodiments parting line 150 extends less than the entire distance between side walls 106 and 107. Parting line 150 is irregularly contoured when viewed as a projection on a vertical plane parallel to rear face 105 and on a horizontal plane parallel to bottom surface 103. The irregular horizontal and vertical contour of parting line 150 creates a more random natural stone-like appearance to the front face 104 of the block. Parting line 150 is generally located below top surface 102 of the block when top surface 102 is facing upward, although in some embodiments parting line 150 may intersect the plane of the top surface 102 one or more times. Locations along the contour of parting line 150 may be positioned level with the top surface of the block or may be positioned up to 2 inches or more below the top surface of block 100. It should be understood that the location and contour of parting line 150 is not limiting and that parting line 150 could be located at any desired location along front face 104 and that parting line 150 could be molded to have a constant vertical value or a constant horizontal value.

Front portion 161 has an irregularly contoured surface along front face 104 of block 100 and extends from top surface 102 to parting line 150 and from side wall 106 to side wall 107. The irregular contoured surface of front portion 161 generally has a downward slope from top surface 102 to parting line 150. Degrees of downward slope from top surface 102 to parting line 150 at locations along front face 104 may be in the range of 0° to 90°. Front portion 161 may have an averaged downward sloping value or arithmetic downward sloping mean along front face 104 from side wall 106 to side wall 107 which in some embodiments is in the range of 1° to 75°, and in other embodiments is in the range of 15° to 25°. In one embodiment the downward sloping value is 20°.

The slope of front portion 161 creates a visually pleasing aesthetic appearance and when blocks 100 are stacked in a wall with the top surface facing upward the upper course of blocks creates a shadowing effect over the front portions 161 of blocks in the adjacent lower course, thus enhancing the three dimensional effect of the shaped areas of the front faces of the blocks in the wall. As shown in FIG. 4, the forming stripper shoe that molds front portion 161 of front face 104 may also create an irregular contoured front edge 172 along top surface 102. Edge 172 separates top surface 102 from front portion 161 and thus top surface 102 from front face 104. Edge 172 lies in the same horizontal plane as top surface 102 but its distance from rear face 105 varies. It should be understood that edge 172 is not limiting and could have any desired contour and could, for example, be in the same horizontal plane and same vertical plane. Edge 172 is located on front portion 108 of block 100. Edge 172 may be positioned as close in proximity to core 114 as desired. As shown in FIG. 4, front portion 161 has a depth D which is the distance from edge 172 to parting line 150 and may vary at different locations along the front face of the block. Depth D may have any desired dimension depending on block size and may be in the range from 0 inches to 4 inches and may further be in the range of ⅛ inch to 1.5 inches depending upon the application. Front portion 161 has an area that comprises, in some embodiments, between 3% to 40% of the total area of front face 104, and in other embodiments between 15% to 20% of the total area of front face 104. It should be understood, however, that the size or shape of front portion 161 is not limiting and that the block 100 could have any sized or shaped front portion 161 as desired.

Front portion 160 extends from parting line 150 to bottom surface 103. As best seen in FIGS. 3 and 5, the front and bottom views of the block, front portion 160 of block 100 has shaped areas 181, 182 and 183 that each have a three dimensional irregular stone-like shape and may be positioned lower than/beneath upward facing top surface 102 of block 100. Shaped areas 181, 182 and 183 may extend outwardly from top surface 102 and bottom surface 103 and may have irregular sloping surfaces. Each shaped area may have an irregularly contoured surface that gives a more pleasing visual aesthetic as well as more accurately imitates the irregular contoured surfaces of natural stone. Any of the shaped areas could also be molded to have inward extending fissure surfaces to mimic natural stone. Other three dimensional surface detail may be molded into any of the shaped areas, including chips, notches, grooves, and false joints to further add contour and additional dimension and to also create further shadowing across the front surface of the block. These inward extending surfaces may extend into the block body past a vertical projection of the parting line 150. It should be understood that front face 104 could have any desired number of shaped areas and that the shaped areas could be any desired size or shape. Additionally, the shaped areas may have surfaces that extend outward (or project inward) from the top and bottom surfaces at any desired dimension or angle.

As best seen in FIG. 5, the bottom view of block 100, the moveable front liner that molds front portion 160 of front face 104 may also create an irregular contoured edge 173 along bottom surface 103. Edge 173 is the boundary separating bottom surface 103 from front portion 160 and thus bottom surface 103 from front face 104. Edge 173 lies in the same horizontal plane as bottom surface 103 but its distance from the rear face 105 varies between side walls 106 and 107. It should be understood that the shape of edge 173 is not limiting and could have any desired contour. Edge 173 is located on front portion 108 of block 100. Edge 173 may be positioned as close in proximity to core 114 as desired and may be located further from core 114 than edge 172 of top surface 102. Areas of front portion 160 may slope outwardly from edge 173 and thus bottom surface 103 and other areas may be vertical or slope inwardly toward rear face 105 further adding to the three dimensionality of front face 104 and creating the randomness and irregularity associated with that of natural stone or other desired surface contour.

As best seen in FIGS. 1 and 2, the movable face liner also creates irregularly contoured ends or edges 176 and 177 of side walls 106 and 107, respectively. Edges 176 and 177 extend from top surface 102 to bottom surface 103. Edges 176 and 177 may have various irregular contours or shapes. For example, edges 176 and 177 will generally follow the contour of side walls 106 and 107 between the top and bottom surfaces of the block. If the side walls are planar, vertical edges 176 and 177 will lie in the same vertical plane as side walls 106 and 107. If the side walls are non-planar, edges 176 and 177 will follow the non-planar contour of the side walls. The distance of edges 176 and 177 to the rear face will vary between the top and bottom surfaces. It should be understood that edges 176 and 177 are not limiting and could have any desired contour.

Shaped area 181 is located adjacent to side wall 106 and shaped area 183 is located adjacent to side wall 107. Shaped area 182 is located between shaped areas 181 and 183. Front portion 161 forms the upper surface of shaped areas 181, 182 and 183.

As best seen in FIGS. 3 and 4, the shaped areas are separated by false joints formed into the front face 104. The false joints extend substantially between the top and bottom faces and are formed into both front portion 160 and 161. Thus, the false joints are formed partially by projecting portions of the molding surface of the stripper shoe that forms portion 161 and partially by projecting portions of the molding surface of the face liner that forms portion 160. Shaped areas 181 and 182 are separated by valley or joint 184 located on front portion 160. Shaped areas 181, 182 and 183 may extend outwardly from top and/or bottom surface 102 and 103 at any desired dimension. Valley or joint 186 located on front portion 161 follows the contour of valley or joint 184 and separates the upper surface of shaped area 181 from the upper surface of shaped area 182. Thus, joints 184 and 186 together simulate the appearance of a false joint which in this embodiment has a more horizontally oriented portion (joint 186) and a more vertically oriented portion (joint 184). Shaped areas 182 and 183 are separated by valley or joint 185 and are located on front portion 160. Valley or joint 187 located on front portion 161 follows the contour of valley 185 and separates the top surface of shaped area 182 from the shaped area of 183. Thus, joints 185 and 187 together simulate the appearance of a second false joint which in this embodiment has a more horizontally oriented portion (joint 187) and a more vertically oriented portion (joint 185).

Valleys 184 and 185 may extend into the block body any dimension desired. For example, valleys 184 and 185 may extend into the block body 1/16 of an inch to 4 inches depending upon the block body and may more preferably be in the range of ½ of an inch to 1.5 inches depending upon the application. Valley or joint 184 has an angular slope from the bottom surface of the block towards the top surface and could have any degree of slope as desired. The slope of valley or joint 184 creates further shadowing effects towards the bottom surface of the block that enhances the visual aesthetic of the block and gives the block a more natural stone-like appearance. Valley or joint 185 has a slope that angles away from the angular slope of valley 184 from the top surface to the bottom surface. Valleys 184 and 185 each have a width that can widen and narrow along its irregular angular contour.

As can be seen in FIG. 3, the lower portion of valley 184 flares out or widens towards the bottom surface of block 100. Additionally, the upper portion of valley also widens or flares towards the parting line of the front face. This type of contour projects a shadowing effect on the front surface of the block that enhances the three dimensional aesthetic of the block; giving block a more natural stone-like appearance. The sides of shaped areas may form the side surfaces of the valley or joints and may have contours that arc or slope into the valleys or joints. The amount of arc or slope is not limiting and thus sides of the shaped areas may arc or slope into the valleys or joints at any desired dimension.

It should be understood that the number, location and dimensions of valleys or joints are not limiting and front face 104 could, therefore, have any number, location or dimension of valley or joints as desired. Further, the valley or joints could have any desired degree of slope. It should further be understood that shaped areas 181, 182 and 183 could contain false joints that may be much shallower than valley or joints 184 and 185 and may be entirely contained within an individual shaped area.

Figure 7:
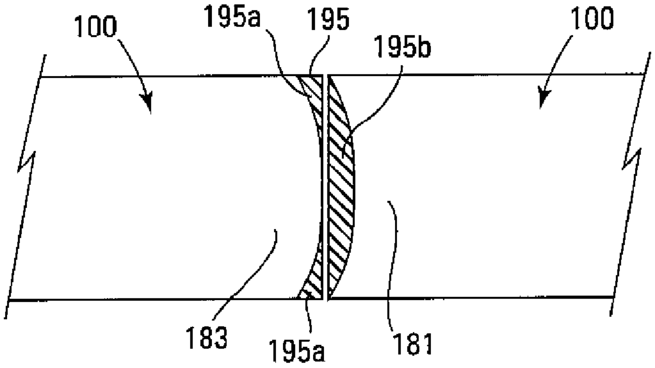
FIGS. 7, 8, and 9 are partial front views of adjacent blocks 100 in a course of blocks forming a wall.
Figure 8:
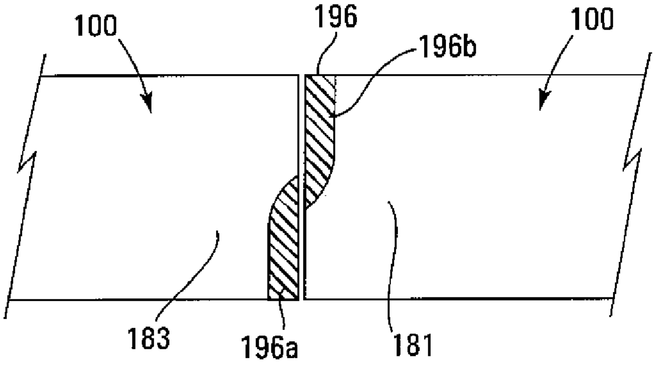
Figure 9:
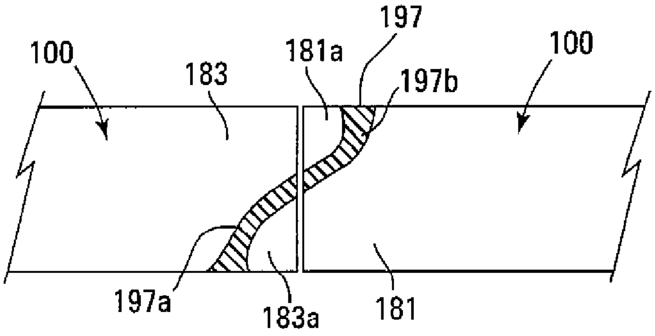

FIGS. 7, 8, and 9 are partial front views of adjacent blocks 100 in a course of blocks forming a wall and show further variations in placement and configuration of false joints molded into the front surface of block 100. In FIG. 7, a joint 195 is formed at the intersection of adjacent blocks 100 positioned in a course of a wall by joint portions **195*a* molded into shaped area 183 of a first block and joint portion 195*b* molded into shaped area 181 of a second block. In FIG. 8, a joint 196 is formed at the intersection of adjacent blocks 100 positioned in a course of a wall by joint portion 196*a* molded into shaped area 183 of a first block and joint portion 196*b* molded into shaped area 181 of a second block. In FIG. 9, a joint 197 extends from a first block 100 to a second block 100 and is defined by joint portions 197*a* and 197*b*. Joint portion 197*a* extends through shaped area 183 and divides out a small portion 183*a* which might, for example, have the shape of a small rock or stone or might be shaped as an extension of the shape of shaped area 181 of the adjacent block. Joint portion 197*b* extends through shaped area 181 and divides out a small portion 181*a* which might, for example, have the shape of a small rock or stone or might be shaped as an extension of the shape of shaped area 183 of the adjacent block. These joint configurations help hide or obscure the vertically oriented seams or spaces between blocks and provide the wall with a more unitary appearance. The features of joints 195, 196 and 197, all of which are positioned to crossover the intersection between two adjacent blocks in a wall, are similar to the features described previously in connection with other joints in the block face. For example, joints 195, 196 and 197** can be of any desired shape or configuration, can result in a deep undercut region, and may have a first portion formed from a projection in the stripper shoe and a second portion formed from a projection in the face liner.

As seen in FIG. 5, shaped areas 181, 182 and 183 have support regions 181S, 182S, and 183S, respectively, and are the most outwardly extending portions of each shaped area located along edge 173 of bottom surface 103. Support areas 181S, 182S, and 183S may have gradual degrees of sloping, if any, from an outermost extending point of each respective shaped area angling towards the bottom surface. Support areas 181S, 182S and 183S may be continuous or segmented for each respective shaped area 181, 182 and 183. Shaped areas 181, 182, and 183 also have undercut regions 181U, 182U and 183U, respectively, and are the most inwardly extending portions of each shaped area. The undercut regions, along with valleys 184 and 185, are the most inwardly extending portions located along edge 173. Undercut regions 181U, 182U, and 183U may have more pronounced degrees of sloping than the support regions, from various outward extending points of each respective stone shaped area angling towards the bottom surface. For example, the support regions will generally extend upwardly from the bottom surface of the block at an angle less than or equal to 20° from vertical whereas the undercut regions generally extend upwardly from the bottom surface of the block at an angle greater than 20° from vertical. Undercut regions 181U, 182U and 183U may be continuous or segmented for each respective stone shaped area 181, 182 and 183. Undercut regions 181U, 182U, 183U enhance the three dimensionality of each respective shaped area to produce a more natural stone-like appearance. It should be understood that undercut regions and support regions could be imparted to the side walls and rear face or any combination thereof, with the use of movable sideliners and movable front and rear face liners.

Support regions 181S, 182S, and 183S provide contact points along the bottom surface of the block that provide sufficient stabilization during the molding process so that when block 100 is stripped from the mold, the support regions stabilize the front face as the mold material sets and hardens, preventing the front portion 160 (and front portion 161) from sagging, dislodging, collapsing, and deforming. Without proper support regions the undercut regions and the valleys of front face 104 would cause the mold material of front portion 160 (and front portion 161) to deform, sag or dislodge from the block after the molded material is stripped from the mold cavity. For example, dry cast concrete material is heavy with some moisture added to facilitate molding capability. Due to these features overhanging or cantilevered portions of the block which are not properly supported over the production pallet will sag when the block is removed from the mold. Thus, the support regions are specifically shaped and configured to properly support the shaped areas 181, 182 and 183. If the front face of the block includes undercut regions then the proportion of all support regions 181S, 182S and 183S measured linearly across the front face of the block at the intersection of front portion 160 and bottom surface 103 should be at least 30 percent of the total distance across the front face between the side walls of the block in order to adequately support the shaped areas. Conversely, the proportion of all undercut regions 181U, 182U and 183U should be no more than 70 percent of all surface measured linearly across the front face of the block at the intersection of front portion 160 and bottom surface 103.

Generally, support regions 181S, 182S and 182S will adequately support those portions of shaped areas 181, 182 and 183 which overhang the production pallet when the block is discharged from the mold if the block material forming the support regions extending above the production pallet rise at a slope or angle of 20° or less as measured from vertical. Further, if the shaped areas include undercut regions, the support regions should comprise at least 30% of the distance between the side walls of the block and the undercut regions should comprise no more than 70% of the distance between the side walls of the block. The adequacy of the support is further enhanced if the block material of front portion 160 extending downwardly from the parting line 150 towards the production pallet descends at a slope or angle of 20° or less as measured from vertical.

Four examples showing how the support regions may be configured to adequately support shaped areas extending from a block face are shown in FIGS. 10 to 27. In each example the front face of the blocks have a depth, as measured from front to back, of about 1.5 inches. Each example also has one or more shallow undercuts extending back from the front face a distance of about 0.5 inches.

Figure 10:
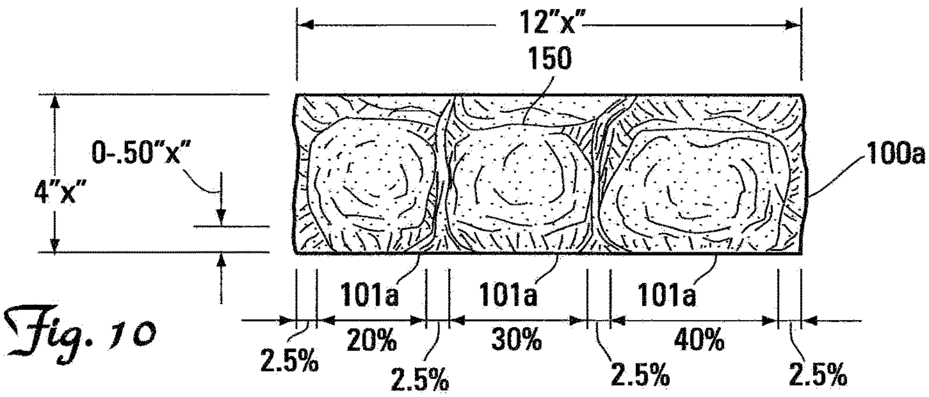
FIGS. 10, 11 and 12 are front, top perspective and bottom perspective views, respectively, of a first block 100*a* and FIG. 13 is a cross-sectional view of block 100*a* taken along a vertical plane passing through line A-A of FIGS. 11 and 12.
Figure 11:
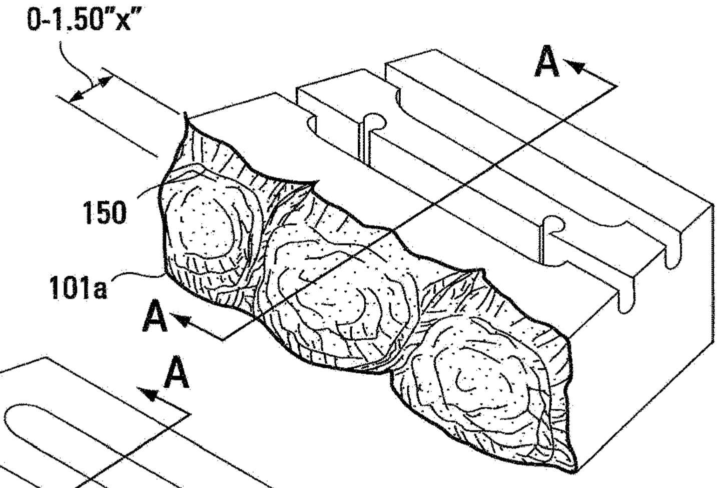
Figure 12:
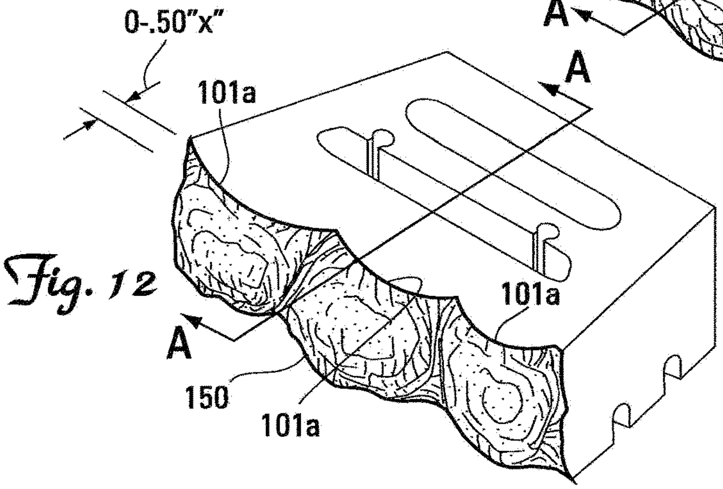
Figure 13:
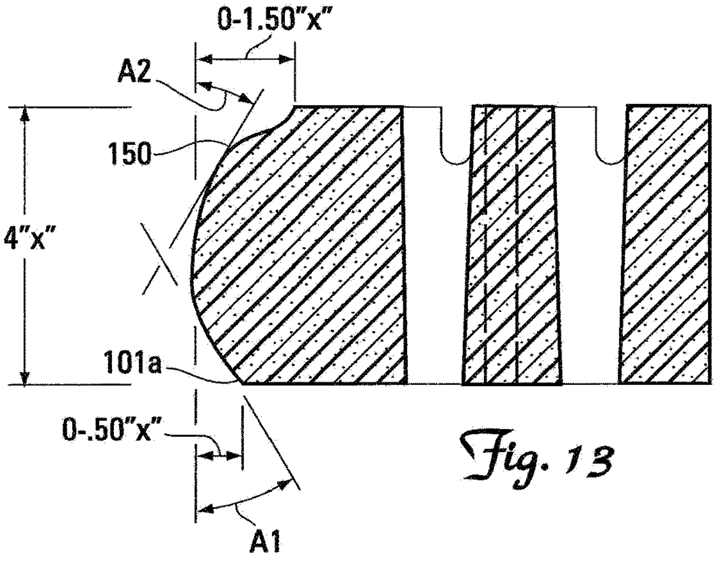

FIGS. 10, 11 and 12 are front, top perspective and bottom perspective views, respectively, of a first block 100*a* and FIG. 13 is a cross-sectional view of block 100*a* taken along a vertical plane passing through line A-A of FIGS. 11 and 12. As best seen in FIGS. 10 and 13 support regions 101*a* comprise three shallow undercuts under shaped areas of the front face of block 100*a*. Support regions 101*a* extend across about 90% of the entire distance of the front face of block 100*a* from the first side wall to the second side wall. As shown in FIG. 13 support regions 101*a* rise from the bottom of the block at an angle A1 which is 20° or less. Further, the front face descends from parting line 150 at an angle A2 which is less than or equal to 20°. In this example support regions 101*a* adequately support the material forming the face of the block.

Figure 14:
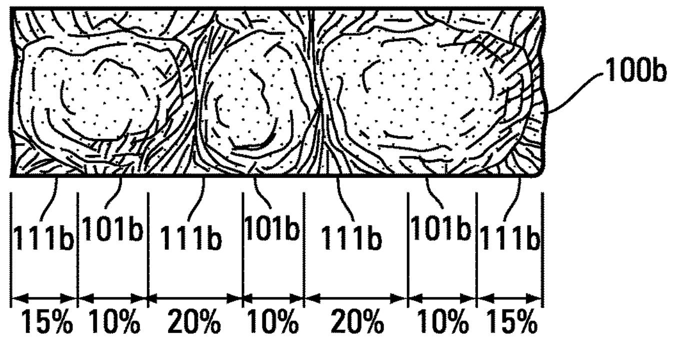
FIGS. 14, 15 and 16 are front, top perspective and bottom perspective views, respectively, of a second block 100*b
Figure 15:
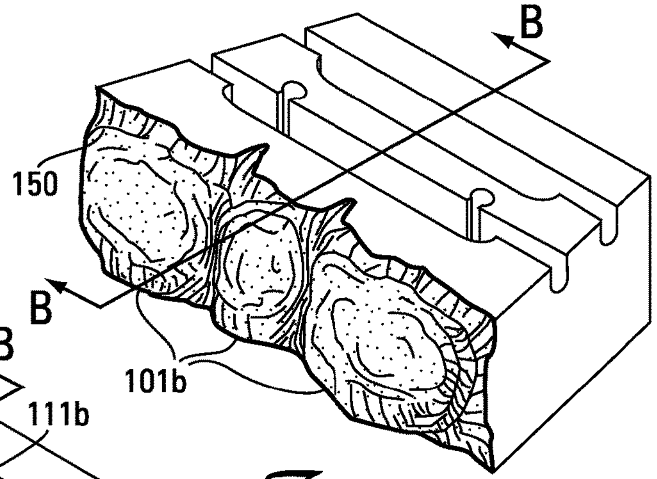
Figure 16:
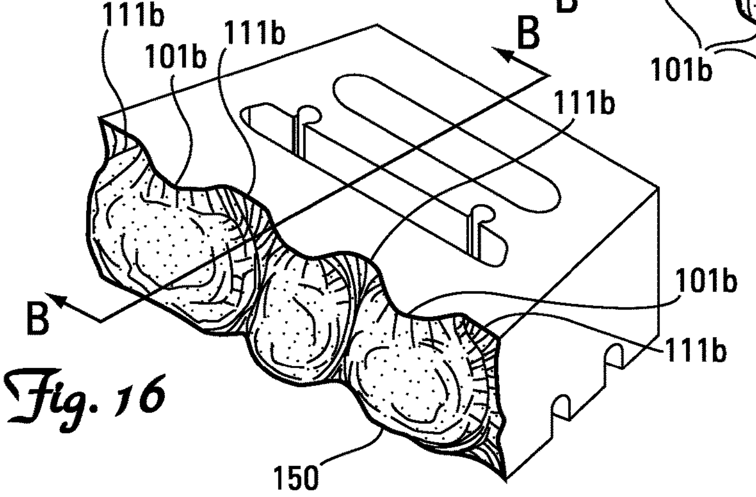
Figure 17:
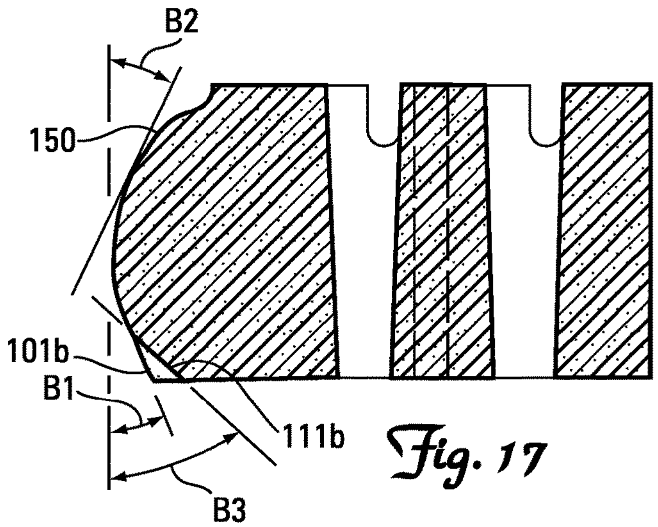
* and FIG. 17 is a cross-sectional view of block 100*b* taken along a vertical plane passing through line B-B of FIGS. 15 and 16.

FIGS. 14, 15 and 16 are front, top perspective and bottom perspective views, respectively, of a second block 100*b* and FIG. 17 is a cross-sectional view of block 100*b* taken along a vertical plane passing through line B-B of FIGS. 15 and 16. As best seen in FIG. 14 support regions 101*b* comprise three shallow undercuts under shaped areas of the front face of block 100*b*, each extending about 10% of the distance between the side walls of block 100*b*. Four deep undercuts 111*b* extend about 70% of the distance between the side walls of the block and, as shown in FIG. 17, into the block a depth of about 1 inch. As shown in FIG. 17 support regions 101*b* rise from the bottom of the block at an angle B1 which is 20° or less. Further, the front face descends from parting line 150 at an angle B2 which is less than or equal to 20°. Although block 100*b* has deep undercuts extending 70% of the distance between the side walls which rise at a steep angle B3 of about 45° from vertical, support regions 101*b* adequately support the material forming the face of the block.

Figure 18:
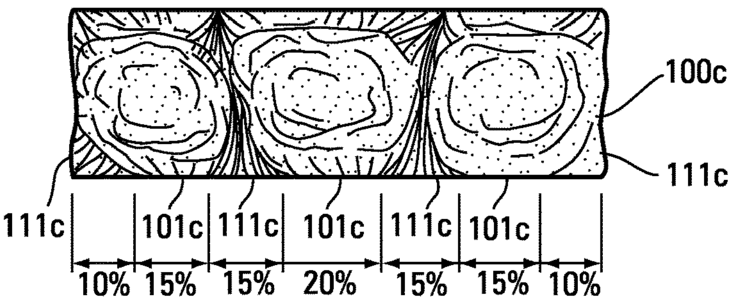
FIGS. 18, 19 and 20 are front, top perspective and bottom perspective views, respectively, of a third block 100*c
Figure 19:
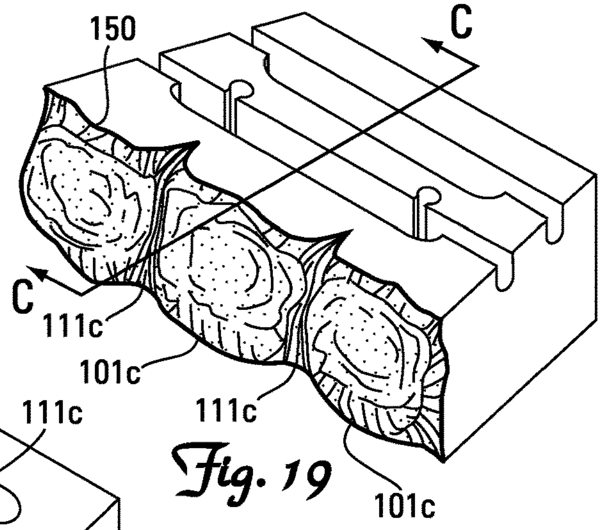
Figure 20:
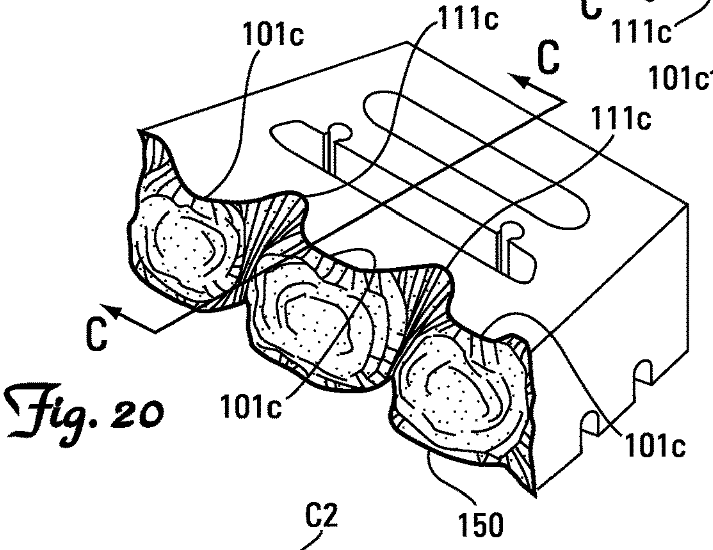
Figure 21:
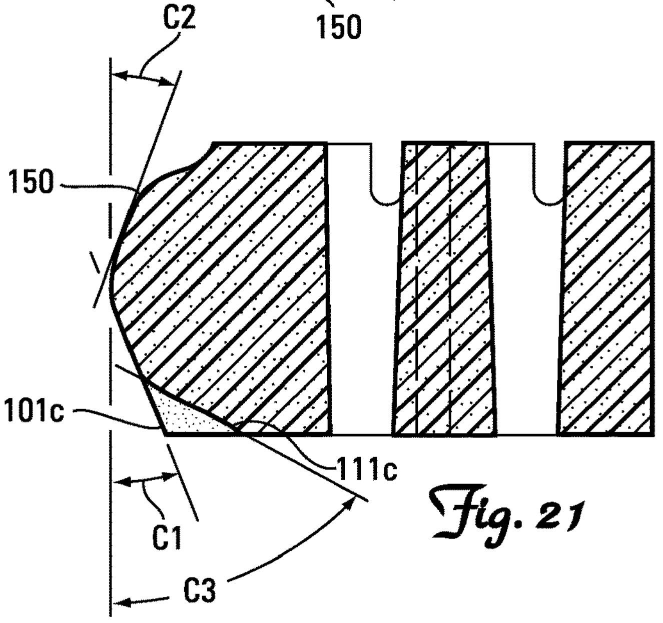
* and FIG. 21 is a cross-sectional view of block 100*c* taken along a vertical plane passing through line C-C of FIGS. 19 and 20.

FIGS. 18, 19 and 20 are front, top perspective and bottom perspective views, respectively, of a third block 100*c* and FIG. 21 is a cross-sectional view of block 100*c* taken along a vertical plane passing through line C-C of FIGS. 19 and 20. As best seen in FIG. 18 support regions 101*c* comprise three shallow undercuts under shaped areas of the front face of block 100*c*, two extending 15% of the distance between the side walls of block 100*c* and the third extending 20% of the distance between the side walls of block 100*c*. As best seen in FIG. 20, four deep undercuts 111*c* extend 10%, 15% 15% and 10% of the distance between the side walls of the block and, as shown in FIG. 21, into the block a depth of about 1.5 inches. As shown in FIG. 21 support regions 101*c* rise from the bottom of the block at an angle C1 which is 20° or less. Further, the front face descends from parting line 150 at an angle C2 which is less than or equal to 20°. Although block 100*c* has a deep undercuts extending a total of 50% of the distance between the side walls which rise at a steep angle C3 of about 40° from vertical support regions 101*c* adequately support the material forming the face of the block.

Figure 22:
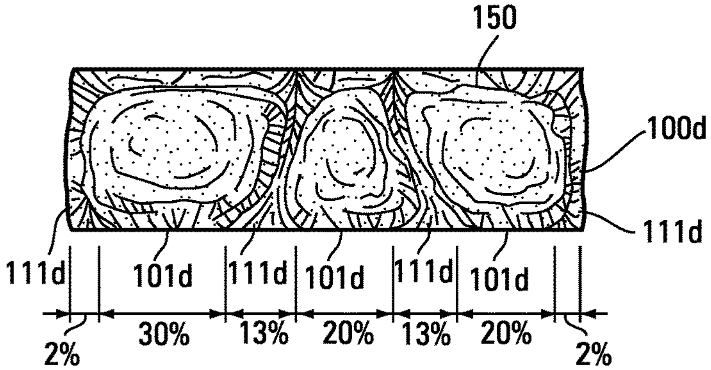
FIGS. 22, 23 and 24 are front, top perspective and bottom perspective views, respectively, of a third block 100*d
Figure 23:
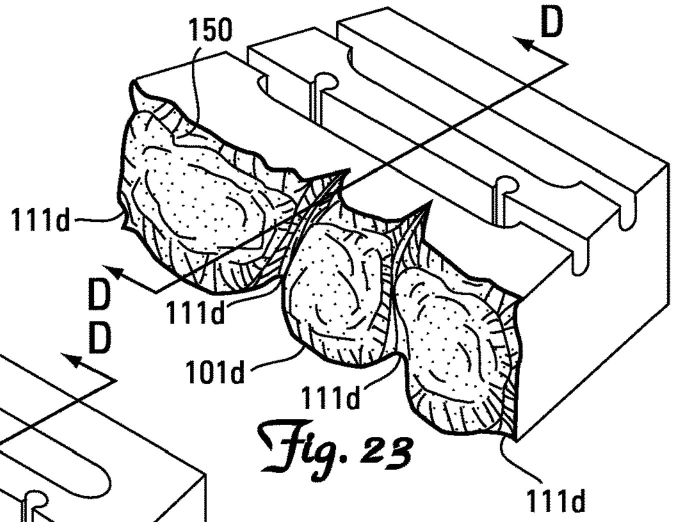
Figure 24:
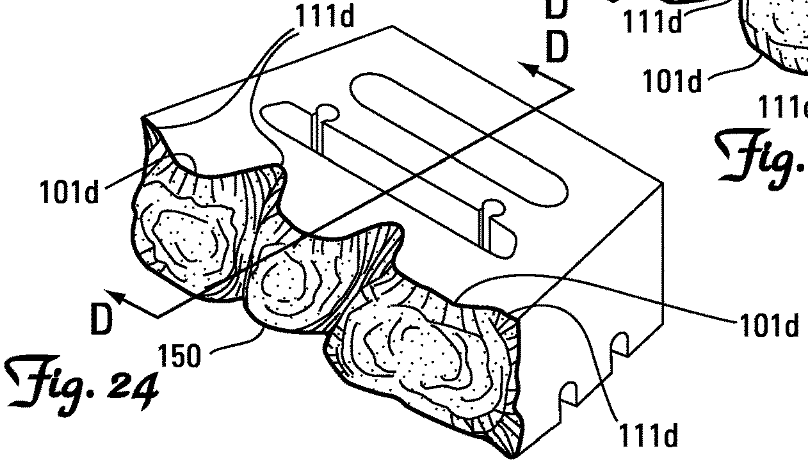
Figure 25:
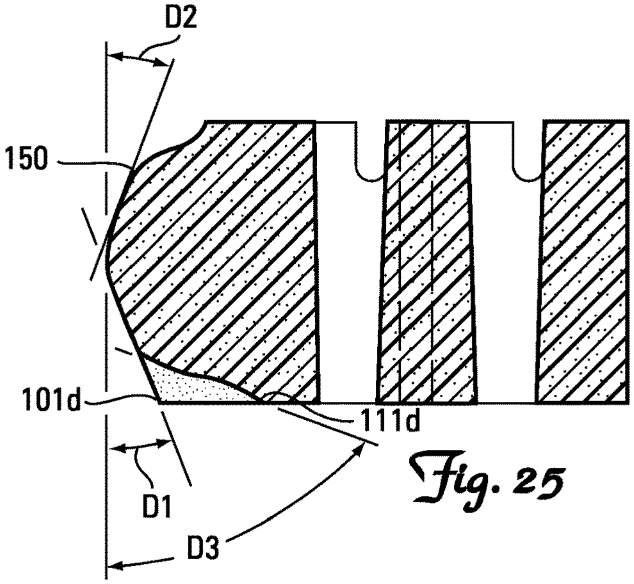
* and FIG. 25 is a cross-sectional view of block 100*d* taken along a vertical plane passing through line D-D of FIGS. 23 and 24.

FIGS. 22, 23 and 24 are front, top perspective and bottom perspective views, respectively, of a third block 100*d* and FIG. 25 is a cross-sectional view of block 100*d* taken along a vertical plane passing through line D-D of FIGS. 23 and 24. As best seen in FIGS. 22 and 24, support regions 101*d* comprise three shallow undercuts under shaped areas of the front face of block 100*d* extending 30%, 20% and 20% of the distance between the side walls of block 100*d*. Four deep undercuts 111*d* extend 2%, 13%, 13% and 2% of the distance between the side walls of the block and into the block a depth of about 2 inches. As shown in FIG. 25 support regions 101*d* rise from the bottom of the block at an angle D1 which is 20° or less. Further, the front face descends from parting line 150 at an angle D2 which is less than or equal to 20°. Although block 100*d* has a deep undercuts extending a total of 30% of the distance between the side walls which rise at a steep angle D3 of about 70° from vertical, support regions 101*d* adequately support the material forming the face of the block.

Figure 26:
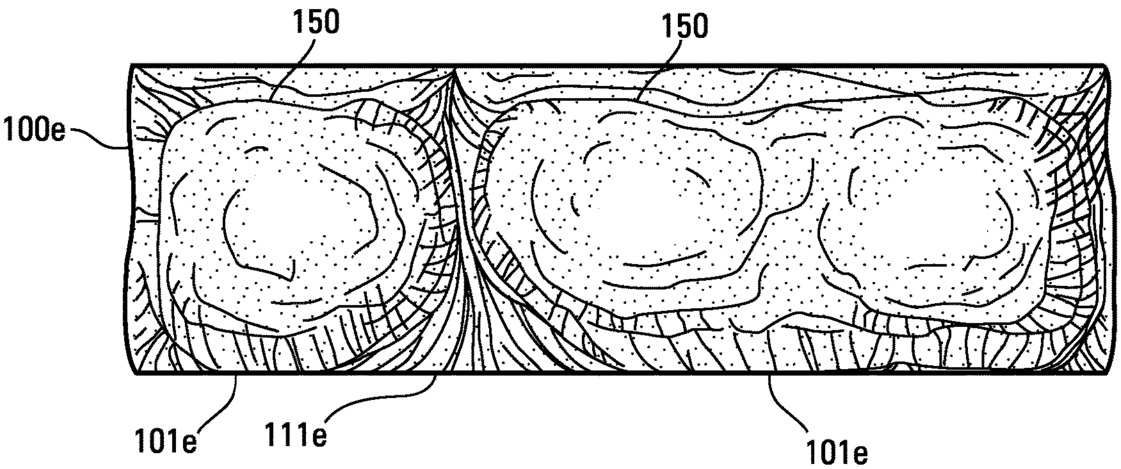
FIG. 26 is a front view of block 100*e* which includes a deep undercut and FIG. 27 is a partial perspective view of block 100*e* showing the shape and configuration of the undercut in more detail.
Figure 27:
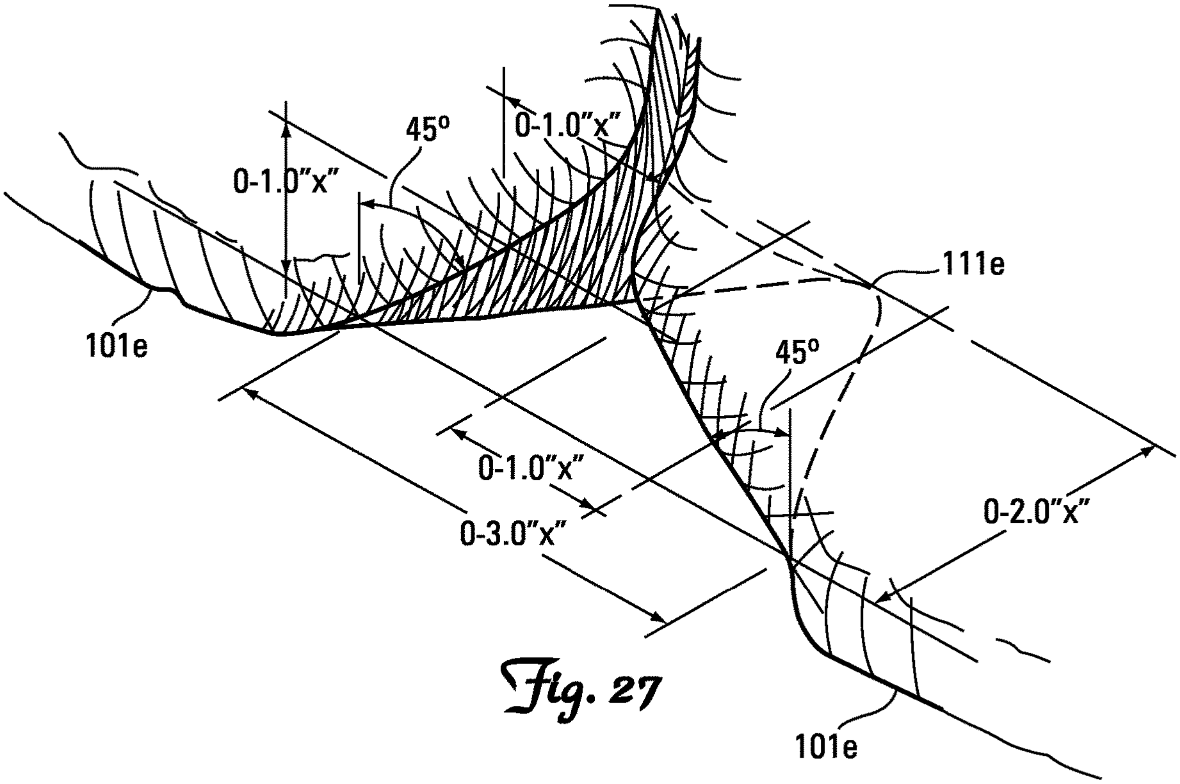

FIGS. 26 and 27 are views of a block 100*e* and illustrate how a front face having deep undercuts similar to those of block 100*d* are properly supported. FIG. 26 is a front view of block 100*e* which includes a deep undercut 111*e* between support regions 101*e*. As shown in FIG. 26 undercut 111*e* has a width of about 3 inches. FIG. 27 is a partial perspective view of block 100*e* showing the shape and configuration of undercut 111*e* in more detail. As seen in FIG. 27 undercut 111*e* is formed at the bottom of a false joint in the front face of block 100*e*. Undercut 111*e* extends into the block a distance of about 2 inches. Deep undercuts such as undercut 111*e* of block 100*e* and undercuts 111*d* of block 100*d* receive bridging support from the arching principle in the concrete material provided by the shape and proximity of the adjacent support regions, if those support regions are shaped and sized appropriately. For example, for a block 12 inches wide, the width of the undercut (or bridge length between support regions) should be 3 inches or less, the bridge should rise at least about 1 inch above the pallet, the angle at which the side walls of the support regions forming the bridge and defining the undercut rise from the pallet should be 45° or less from vertical, and the undercut should extend into the block no more than about 2 inches. If these conditions are met the deep undercut will be adequately supported and prevent the front face of the block, and in particular the shaped areas, from sagging, dislodging or deforming.

Figure 28:
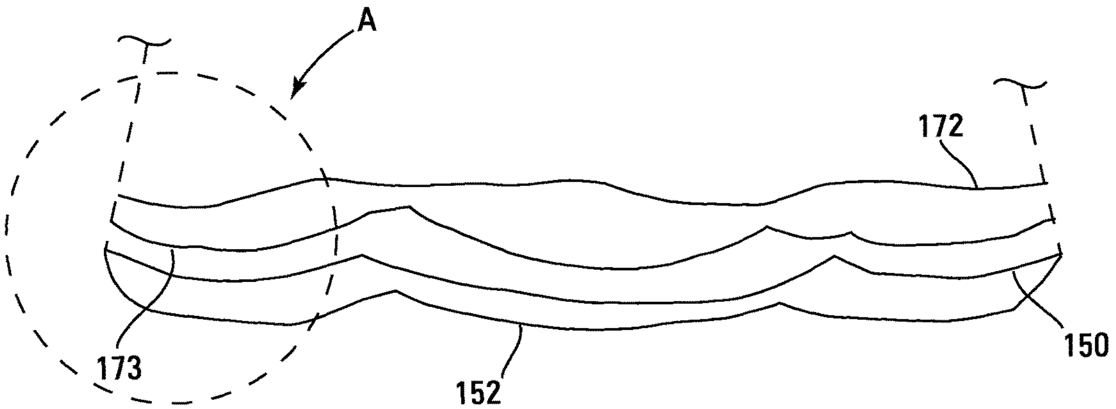
FIG. 28 is a vertical projection on the plane of the bottom surface showing the relative horizontal positions of irregular top edge 172, irregular bottom edge 173, parting line 150 and an outermost extending surface of the front face 104.
Figure 29:
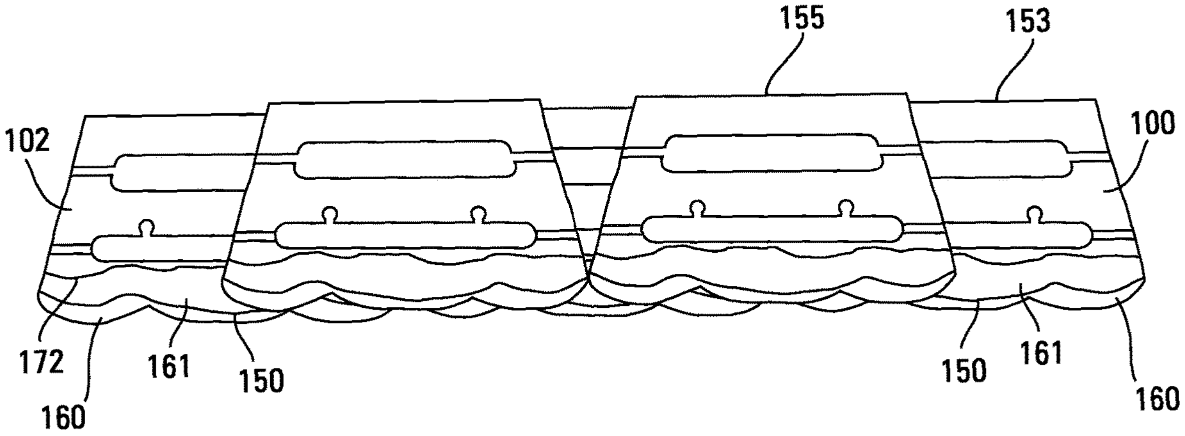
FIG. 29 is a top plan view of a partial wall constructed of blocks 100.

FIGS. 28 and 29 illustrate useful features of the unique blocks disclosed herein. FIG. 28 shows the relative horizontal positions of irregular top edge 172, irregular bottom edge 173, parting line 150 and an outermost extending surface of the front face 104. More specifically, FIG. 28 is a vertical projection of top edge 172 and parting line 150 onto the plane of bottom surface 103 which contains bottom edge 173. Line 152 is the vertical projection of the outermost extending surface of the front face onto the plane. FIG. 28 shows that top edge 172 is positioned to the rear of bottom edge 173. In some embodiments edge 172 is positioned to the rear of edge 173 along its entire length. In other embodiments edge 172 is positioned to the rear of edge 173 along at least 75% of its length. In some embodiments edge 172 is positioned to the rear of edge 173 along its entire length by at least 0.375 inches. In other embodiments edge 172 is positioned to the rear of edge 173 by at least 0.375 inches along at least 75% of its length. FIG. 28 also shows that edge 173 is positioned to the rear of parting line 150. In some embodiments edge 173 is positioned to the rear of parting line 150 along its entire length. In other embodiments edge 173 is positioned to the rear of parting line 150 along at least 75% of its length. FIG. 28 also shows that parting line 150 is positioned to the rear of line 152. In some embodiments parting line 150 is positioned to the rear of line 152 along its entire length. In other embodiments parting line 150 may coincide with line 152 at one or more locations. This particular configuration of the front face 104 gives block 100 some very useful properties as described below in connection with FIG. 29

FIG. 29 is a top plan view of a partial wall constructed of blocks 100. The wall comprises a first lower course 153 of three blocks and a second upper course 155 of two blocks placed in a running bond configuration over the first course. The second course 155 is setback from the first course 153 by a distance of 0.375 inches. The front face configuration described with respect to FIG. 28 is beneficial in the construction of a wall for several reasons. First, in some embodiments where the top edge 172 is set back from the vertical projection 152 of the front face by at least the set back distance between courses of blocks in a wall constructed from blocks 100, then the top planar surface of the blocks in lower courses of the wall will not be visible in a top view of the wall. Thus, as shown in FIG. 29 the only visible parts of blocks in the first course which underlie blocks in the second course are portions 160 and 161 of the front face. Top surface 102 of those blocks is not visible. Second, since the top edge 172 is positioned to the rear of bottom edge 173 the bottom surface of blocks of upper wall courses will create shadows or shade on blocks in adjacent lower courses which will hide or at least soften the transition between the courses. The shadows or shade also accentuate the projections or shaped areas adding to the three dimensional appearance of the wall.

Figure 30:
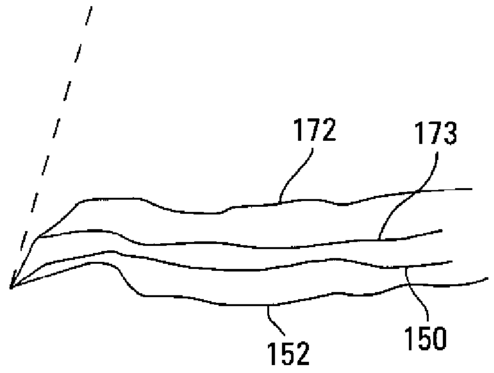
FIGS. 30 to 33 show alternate configurations of the vertical projections in dashed area A of FIG. 28.
Figure 31:
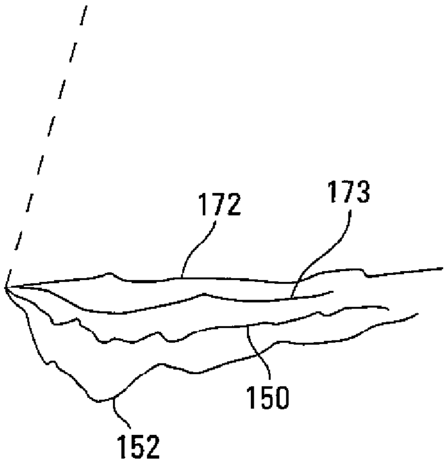
Figure 32:
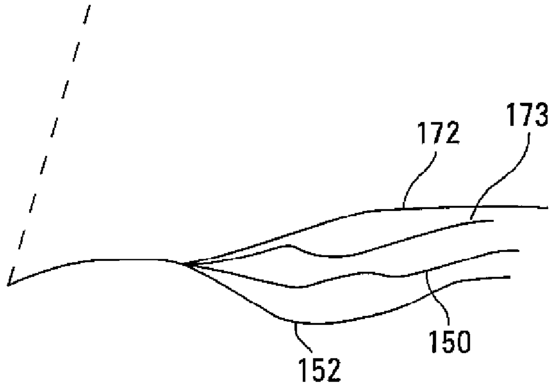
Figure 33:
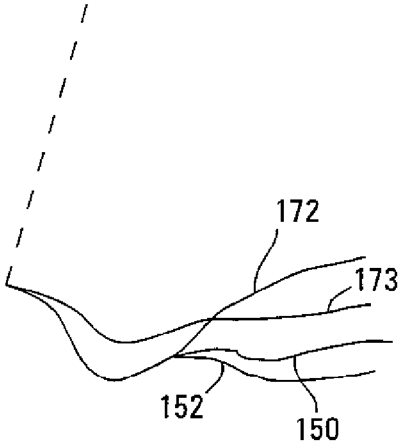
Figure 34:
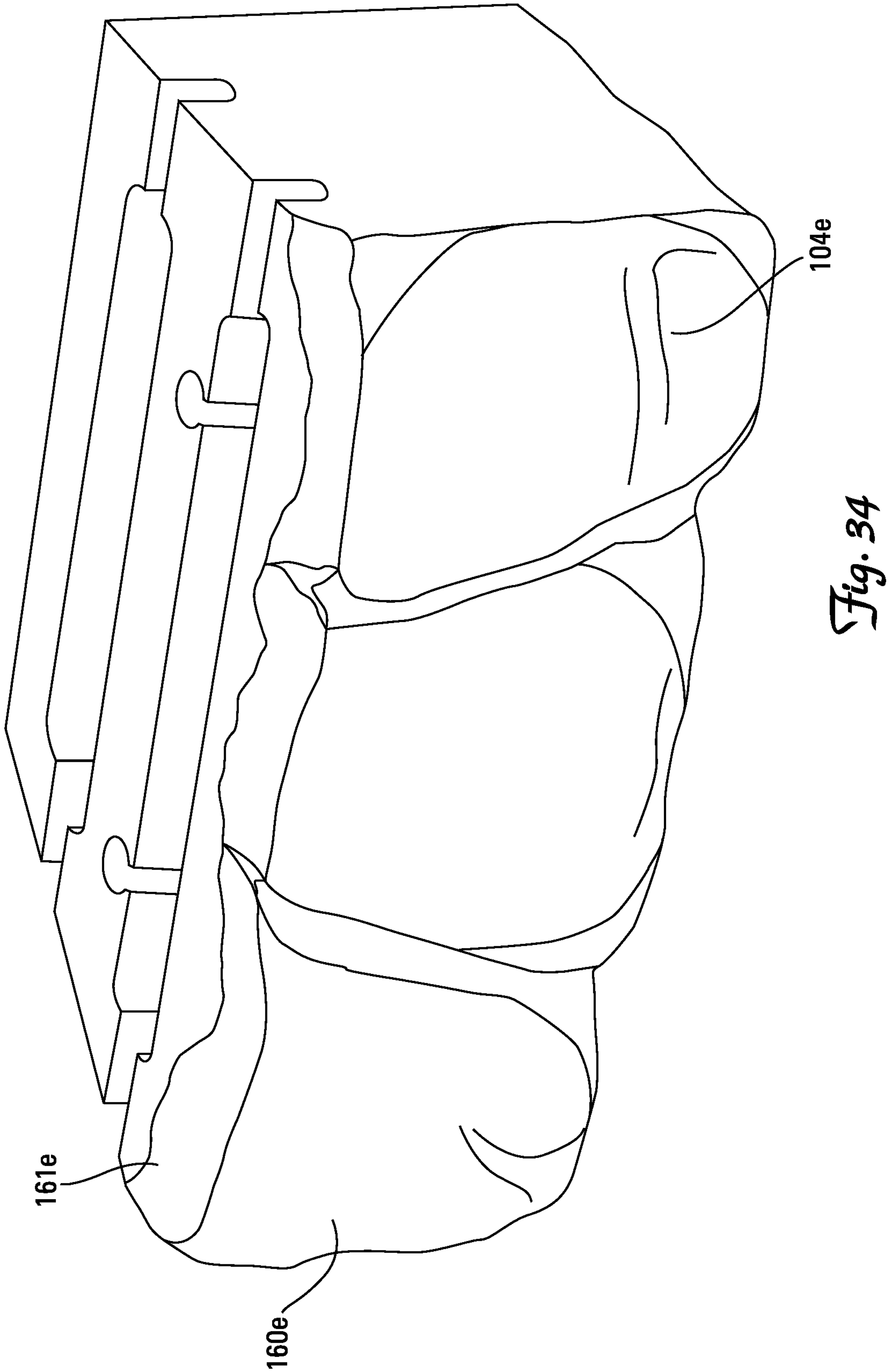
FIGS. 34 to 37 are top perspective views showing additional front face configurations for the block of FIGS. 1 to 7.
Figure 35:
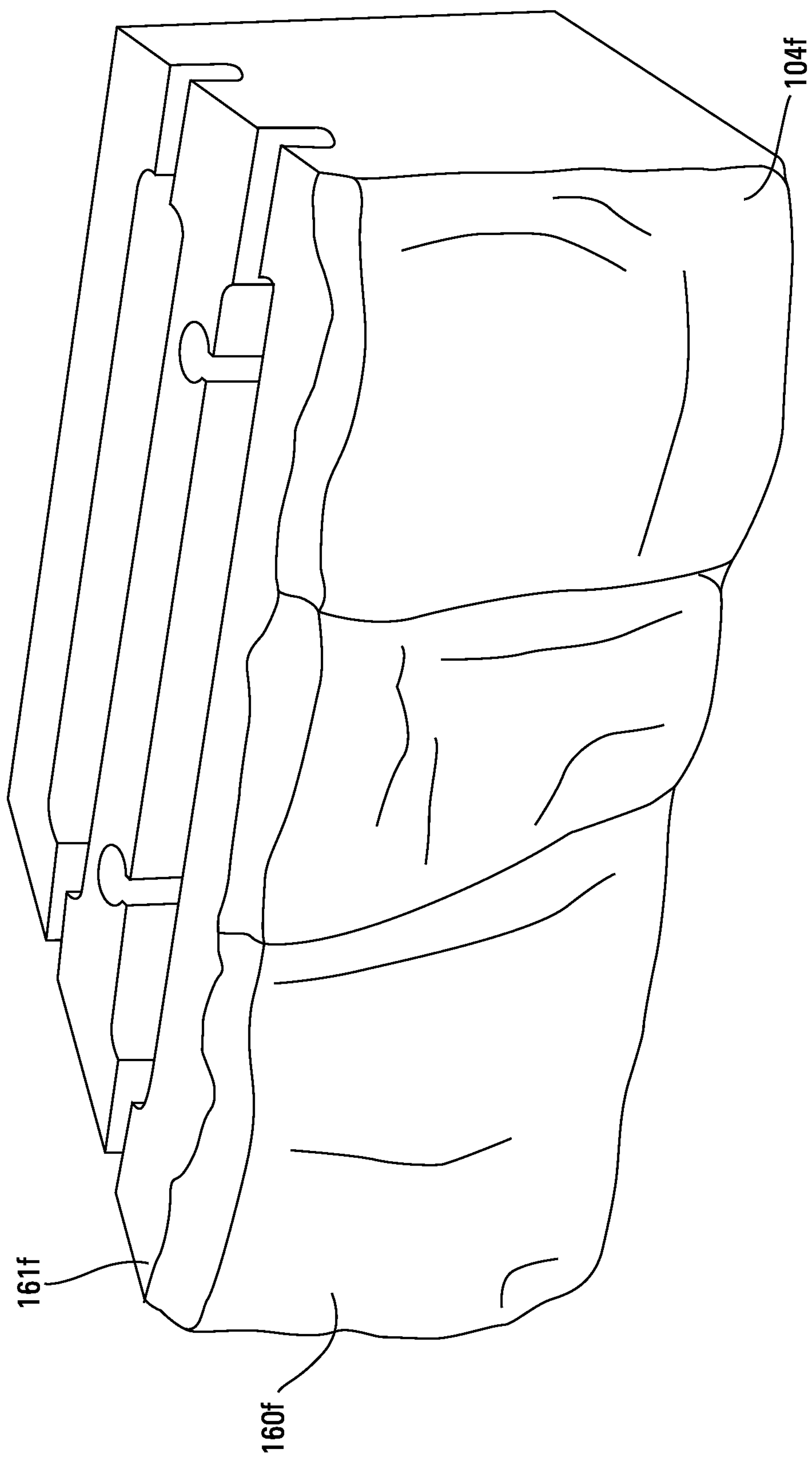
Figure 36:
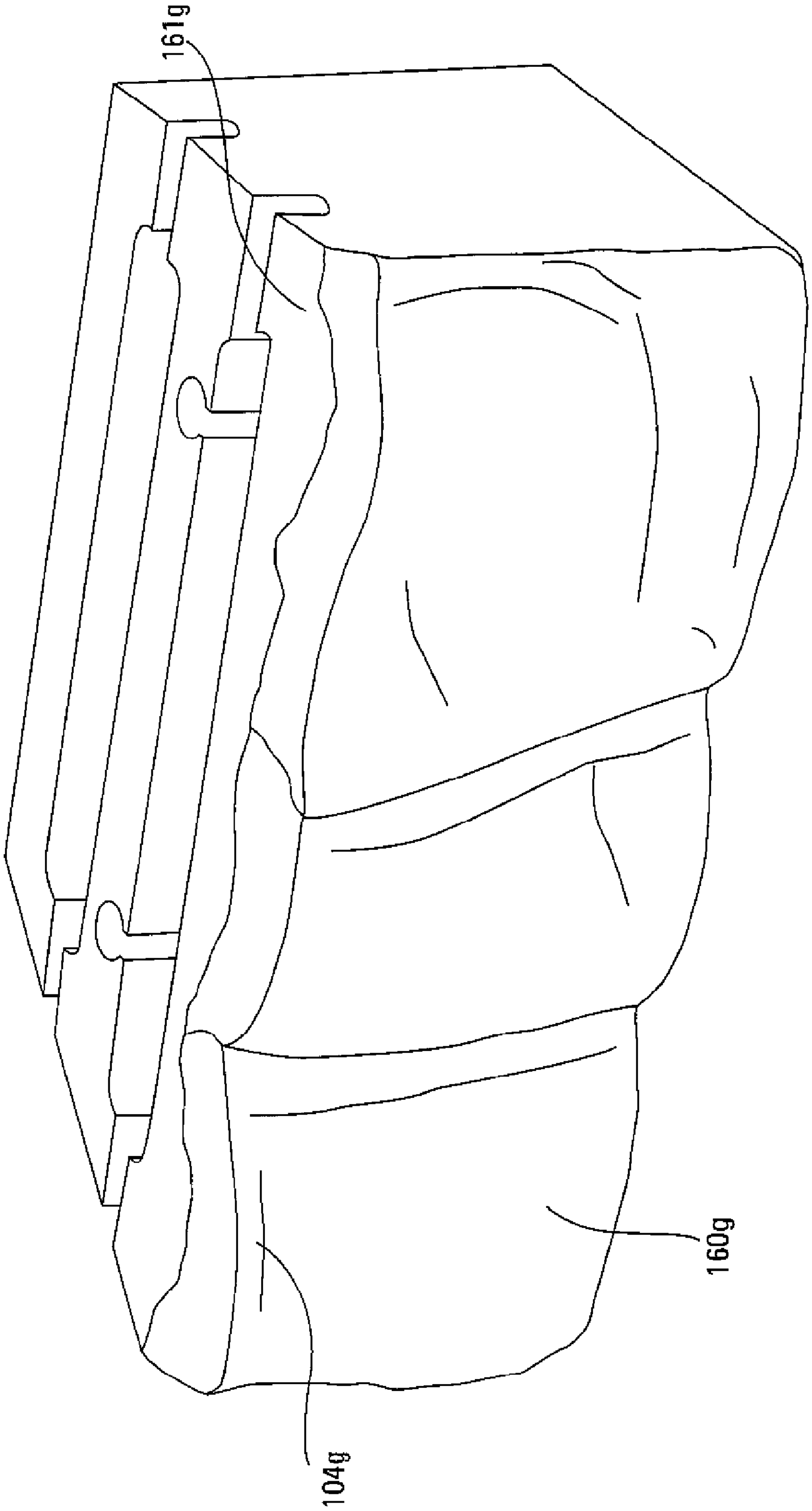
Figure 37:
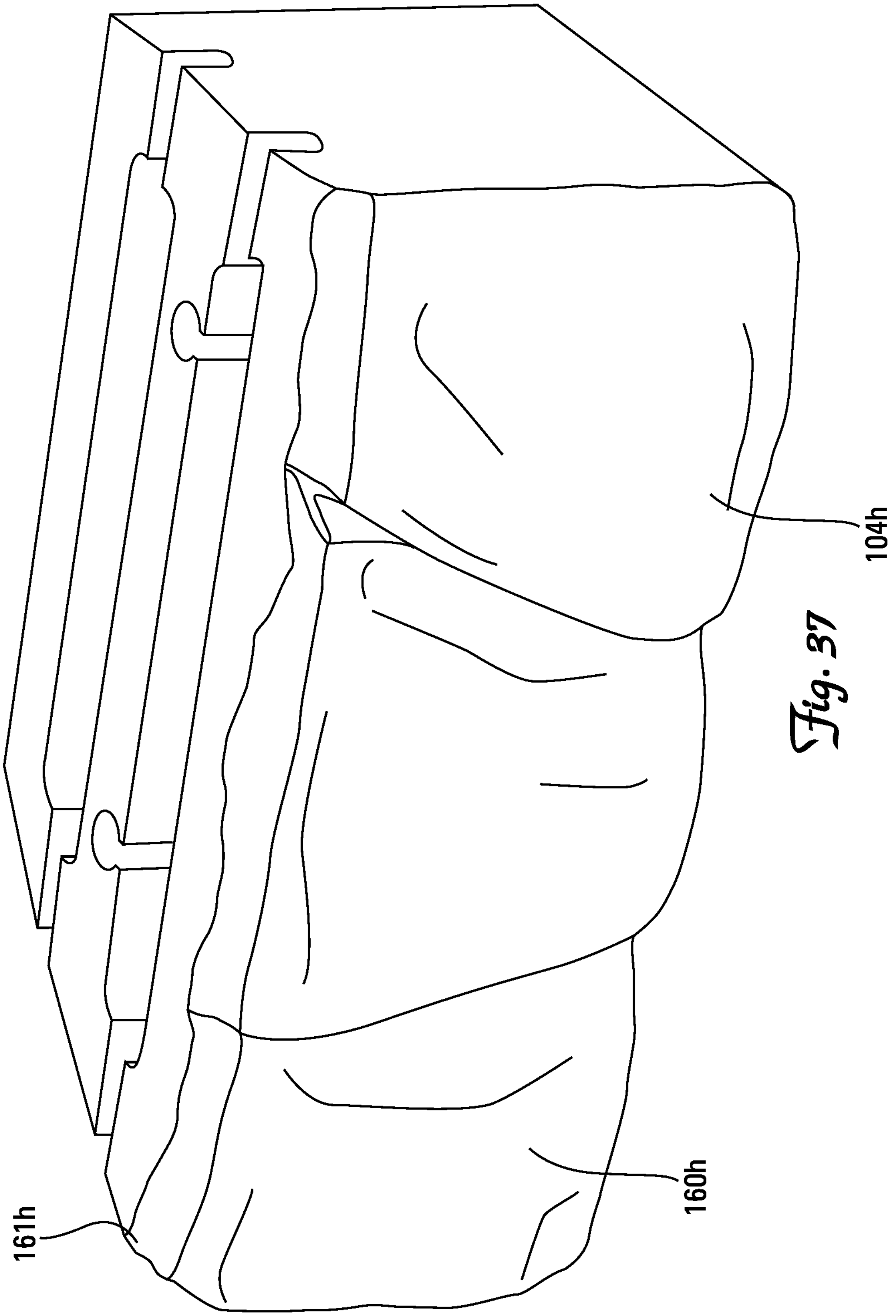
Figure 38:
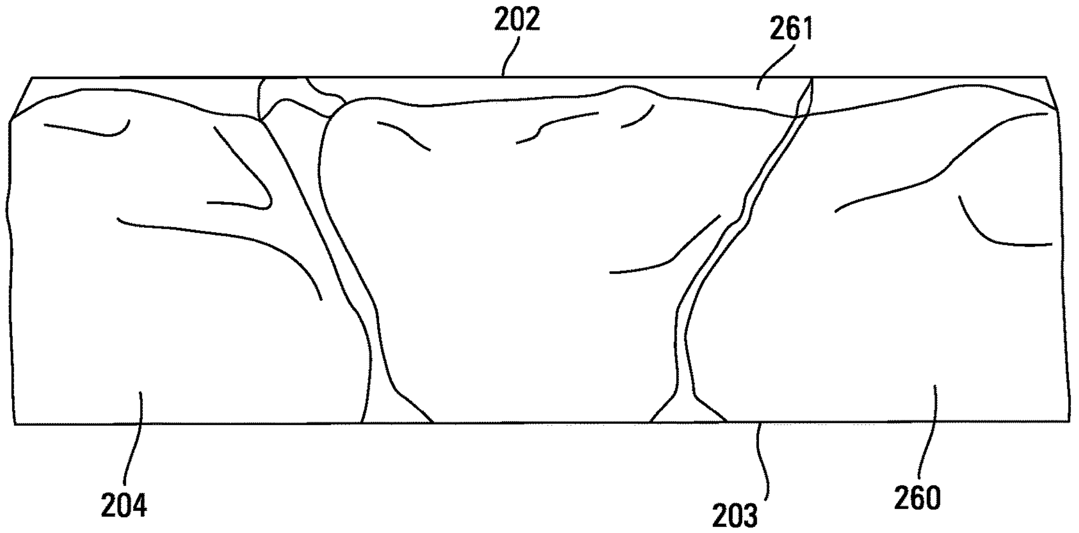
FIGS. 38 to 42 are front, top, rear, front top perspective and bottom views of a second block embodiment.

FIGS. 30 to 33 show alternate configurations of the vertical projections in dashed area A of FIG. 28. FIGS. 30 to 33 illustrate that each of the lines or projections can be varied or moved as desired independently of the vertical front edge of the side walls of the block. In FIGS. 30 and 32 the vertical front edge of the block extends outward of the front face. In FIG. 30 each of the projections are spaced apart and join at the vertical front edge. In FIG. 32 each of the projections and the bottom edge join at a location spaced inwardly from the vertical edge of the block. FIGS. 31 and 33 show configurations where the front face of the block extends outwardly of the vertical edge of the block but the spacing between lines is varied. FIGS. 30 to 33 are not limiting and are included only to illustrate that various front face configurations are included within the scope of this disclosure and that the lines and projections shown and described can be varied completely independently of one another to produce a front face having any desired shape or configuration.

It should be understood that front face 104 of block 100 could be molded onto any type of block and that the size, shape, and features of the block are not limiting. Thus, front face 104, or any of the various embodiments of front faces of blocks shown hereafter, may be molded onto any type and size of block as desired. Additionally, front face 104, and any of the various embodiments of front faces of blocks shown hereafter could be molded on blocks with or without cores, with or without pin holes, with or without receiving channels, with or without pin receiving cavities, or with other block features not discussed herein.

The blocks illustrated in the FIGS. 1 to 6 may have various dimensions. In one embodiment block 100 has a height (i.e., the distance between surfaces 102 and 103) of about 4 inches (102 mm), a body length (i.e., the distance from side wall 106 to side wall 107) of about 12 inches (304 mm) and a width (i.e., the distance from front face 104 to rear face 105) of about 7 inches (178 mm). It should be understood, however, that regular or commercial building blocks may be much larger (or smaller) and are included within the scope of this invention.

Alternate embodiments of the front face of block 100 are shown in FIGS. 34 to 37. Blocks 100 have front faces 104*e* to 104*h* that are substantially similar to front face 104 except that the locations, shapes and dimensions of the shaped areas, undercut regions, support regions and valleys of front portions 160*e* to 160*h* and front portions 161*e* to 161*h* of front faces 104*e* to 104*h* have been given alternate locations, shapes and dimensions. However, the function of those features is the same as described above with respect to front face 104.

An alternate embodiment of block 100 is shown in FIGS. 38 to 42 which are front, top, rear, top perspective and bottom views, respectively, of block 200. Block 200 is similar to block 100 except that the rear or back face 205 has been given shaped areas, undercut regions and valleys or joints similar to that of front face 104 of block 100. In other words, block 200 has both front and rear patterned faces and can be used to construct freestanding walls where each side of the wall has a visually pleasing pattern or texture. Block 200 has a block body having parallel top surface 202 and bottom surface 203, front face 204, rear face 205 and first and second side walls 206 and 207. In should be understood that all of the features described above with respect to the configuration of front face 104 of block 100 are equally applicable to both front face 204 and rear face 205, even if not expressly stated in the following description of block 200. Top surface 202, bottom surface 203, front face 204, rear face 205 and side walls 206 and 207 form block body 220. Front face 104 and rear face 205 have compound shapes and may protrude outward from top and bottom surfaces 202 and 203, respectively and/or extend into the block body 220 towards the center of the block. Front face 204 and rear face 205 extend from top surface 202 to bottom surface 203 and from side wall 206 to side wall 207. It should be understood that block 200 is not limiting and that block 200 could have any desired shape and could be any desired dimension. It should be further understood that front face 204 and rear face 205 could have any shape, pattern or texture as desired. For example, blocks having faces or surfaces with regular or irregular geometric patterns are within the scope of this invention.

As shown in FIGS. 39 and 41, top surface 202 has angled channels 230 extending from side wall 206 to a first core side wall of cores 214 and 215. Angled channels 230 also extend from side wall 207 to a second core side wall of cores 214 and 215. Angled channels 230 are located on the top surface 202 and are formed from a bridge styled core support or forming member that is mounted to a side wall or liner of a mold cavity. It should be noted that the shape, width and length of the angled channel can vary depending upon the application and could for example only extend a portion of the length from the core side wall to the block side wall or may open onto only one of the side walls or may open onto neither side wall. It should further be understood that the channels may be both angled the same way from the side wall to the core or may have any combination of angled receiving channel and non-angled receiving channels (as shown in connection with block 100) as desired.

Figure 42:
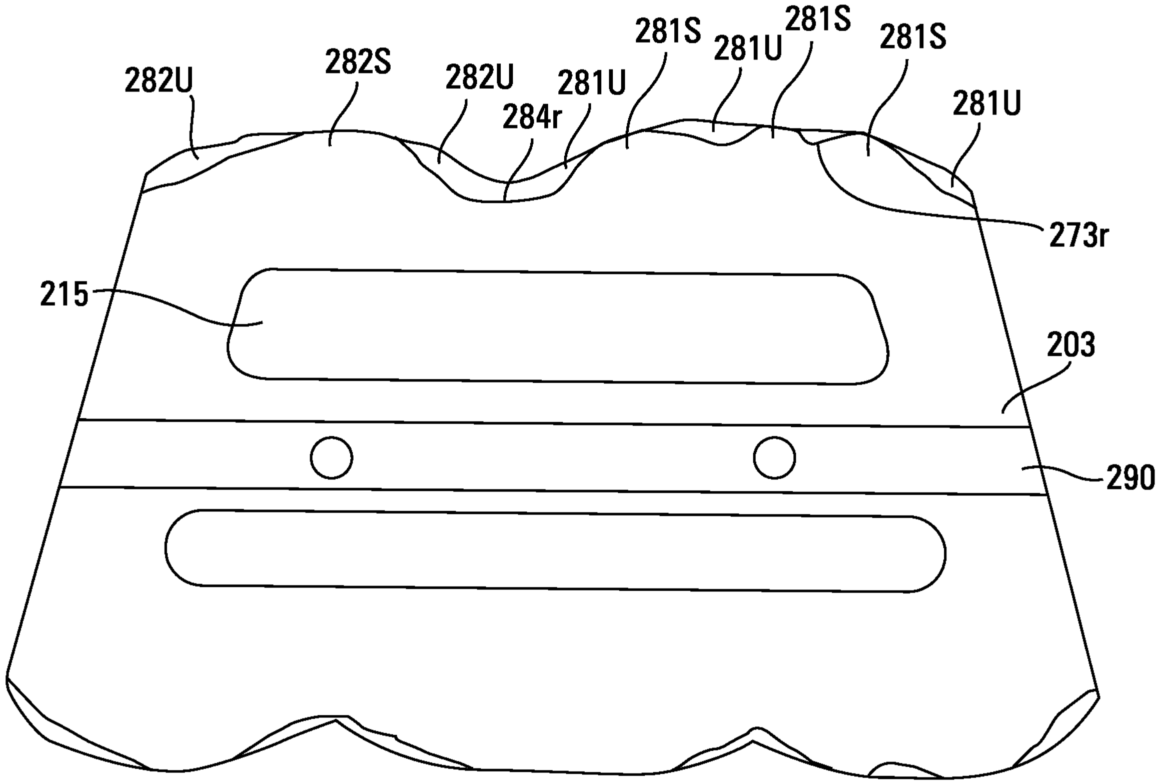

As seen in FIG. 42, block 200 is provided with pin holes 218 positioned centrally between the front and rear faces 204 and 205, respectively. Bottom surface 203 is provided with a channel 290 sized to receive the head of a pin. During construction of a wall with blocks 200 pins are placed into the pin holes in blocks in a first course of the wall. A second course of blocks is then positioned over the first course. The heads of the pins placed in the first course of blocks are received in the channels in the bottom surface of blocks in the second course to stabilize the wall.

Front face 204 and rear face 205 have multiple shaped areas that are three dimensional and are molded to have the appearance of natural stone. Front face 204 has an irregular compound shape having surfaces that may extend outwardly from top and bottom surfaces 202 and 203, respectively, and surfaces that may extend inwardly into block body 220 toward rear face 205. Rear face 205 has an irregular compound shape having surfaces that may extend outwardly from top and bottom surfaces 202 and 203, respectively, and surfaces that may extend inwardly into block body 220 toward front face 204. The multiple shaped areas with natural stone-like appearance are molded onto the front face 204 and rear face 205 by front and back movable face liners and a stripper shoe having front and back forming surfaces during the molding process. The front and back moveable face liners mold front portion 260 of front face 204 and rear portion 260*r* of rear face 205, respectively. The front and back forming surfaces of the stripper shoe mold front portion 261 of front face 204 and rear portion 261*r* of rear face 205, respectively. The area where the front moveable face liner and front forming stripper shoe align or abut along the front face of the block during the molding process imprints a parting line 250 into the front face 204 of block 200. The area where the rear moveable face liner and rear forming stripper shoe align or abut along the rear face of the block during the molding process imprints a parting line 250*r* into the rear face 205 of block 200. It should be understood that parting lines 250 and 250*r* have the configuration, features and orientation with respect to faces 204 and 205, respectively, of block 200 described above that parting line 150 has with respect to face 104 of block 100 even though those details are not repeated in describing block 200.

Front face 204 is substantially similar to front face 104 of block 100 and thus additional features of front face 204 can be referenced above in connection with front face 104 and will not be repeated here. Rear face 205 is similar to front face 104 except for size and arrangement of its surface features. Therefore, although the features of rear face 205 including top edge, bottom edge, parting line, front portions, side edges, support area, undercuts and joints are identified below, it should be understood that the description of those features in connection with front face 104 of block 100 is equally applicable to the same features of rear face 205 of block 200. Rear face 205 has parting line 250*r* forming the separation boundary of front portion 260*r* and front portion 261*r*.

Rear portion 261*r* has an irregularly contoured surface along rear face 205 of block 200 and extends from top surface 202 to parting line 250*r* and from side wall 206 to side wall 207. The irregular contoured surface of rear portion 261*r* generally has a downward slope from top surface 202 to parting line 250*r*. The back forming stripper shoe that molds rear portion 261*r* of rear face 205 may also create an irregular contoured edge 272*r* along top surface 202. Edge 272*r* separates top surface 202 from rear portion 261*r* and thus top surface 202 from rear face 205. Edge 272*r* is located on rear portion 209 of block 200. Edge 272*r* may be positioned as close in proximity to core 215 as desired. Rear portion 261*r* has depth D which is the distance from edge 272*r* to parting line 250*r*. Depth D has a dimension similar to that described with respect to parting line 150 of block 100.

Rear portion 260*r* extends from parting line 250*r* to bottom surface 203. Rear portion 260*r* of block 200 has shaped areas 281*r* and 282*r* that each have a three dimensional irregular stone-like shape and may be positioned lower than/beneath upward facing top surface 202 of block 200. Shaped areas 281*r* and 282*r* may extend outwardly from top surface 202 and bottom surface 203. It should be understood that rear face 205 could have any desired number of shaped areas and that the shaped areas could be any desired size or shape. Additionally, the shaped areas may extend outward (or project inward) from the top and bottom surfaces at any desired dimension. The moveable rear face liner that molds rear portion 260*r* of rear face 205 may also create an irregular contoured edge 273*r* along bottom surface 203. Edge 273*r* is the boundary separating bottom surface 203 from rear portion 260*r* and thus bottom surface 203 from rear face 205.

The rear movable face liner also creates irregularly contoured ends or edges 276*r* and 277*r* of side walls 206 and 207, respectively. Edges 276*r* and 277*r* extend from top surface 202 to bottom surface 203. It should be understood that edges 276 and 277 are not limiting and could have any desired contour such as described above with respect to edges 176 and 177 or block 100.

Shaped area 281*r* is located adjacent to side wall 206 and shaped area 282*r* is located adjacent to side wall 207. Rear portion 261*r* forms the upper surface of shaped areas 281*r* and 282*r*. Shaped areas 281*r* and 282*r* are separated by valley or joint 284*r* and are located on rear portion 260*r*. Valley or joint 286*r* located on rear portion 261*r* follows the contour of valley or joint 284*r* and separates the top surface of shaped area 281*r* from the shaped area of 282*r*. The shape, configuration and features of the valleys and joints formed in rear face 205 are the same as described previously in connection with the valleys and joints of front face 104 of block 100 and will not be repeated here.

Shaped areas 281*r* and 282*r* have support regions 281S and 282S, respectively, and are the most outwardly extending portions of each shaped area located along edge 273*r* of bottom surface 203. Shaped areas 281 and 282 also have undercut regions 281U and 282U, respectively, and are the most inwardly extending portions of each shaped area. The features, dimensions, and requirements of the support regions 281S and 282S and undercut regions 281U and 282U are the same as described in connection with the support and undercut regions of front face 104 of block 100 and need not be repeated here.

It should be understood that side walls 206 and 207 (or any side walls of blocks contained herein) could also be molded with a texture or pattern in the same manner as front face 204 and rear face 205. It should further be understood that on blocks without cores, pin holes, receiving channels or pin receiving cavities the top surface could be molded with a texture or pattern in the same manner as front face 204 or rear face 205 or any other embodiment of molded surface disclosed herein. It should be noted that any or all of the surfaces of the block other than the surface which rests on the production pallet during manufacture could be molded with a texture or pattern having the features and configuration of front face 104 of block 100. An example of a block having all surfaces textured is described hereafter in connection with FIGS. 74 and 75.

Figure 43:
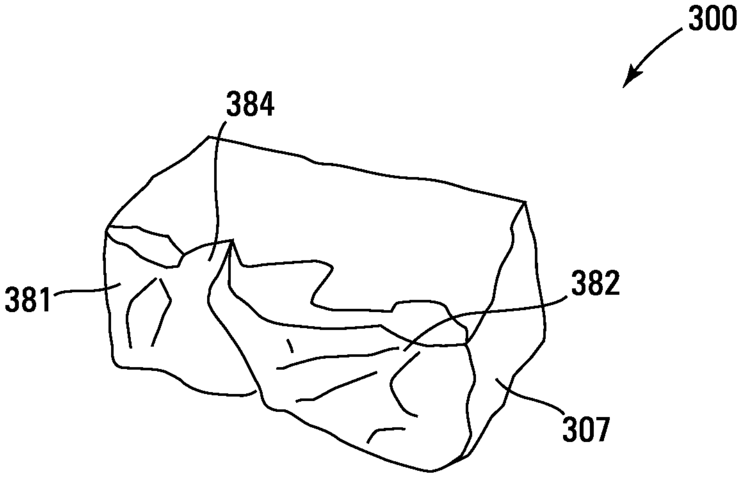
FIG. 43 is a front perspective view of an alternate embodiment of a block.

A front perspective view of an alternate embodiment of the block is shown in FIG. 43. Block 300 has front face 304 with shaped areas 381 and 382. Valley 384 separates shaped area 381 and 382 and extends a distance into the block body towards the rear face. Side surface 307 has been given a natural stone-like texture. Front face 304 has the same features as face 104 of block 100.

Figure 44:
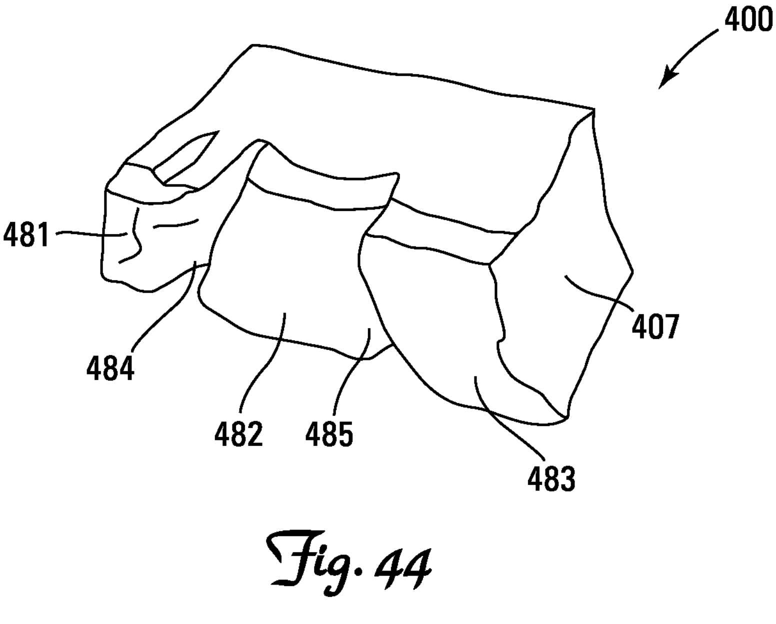
FIG. 44 is a front perspective view of an alternate embodiment of a block.

A front perspective view of an alternate embodiment of the block is shown in FIG. 44. Block 400 has front face 404 with shaped areas 481, 482 and 483. Valleys 484 and 485 separate shaped areas 481, 482 and 483 and extend a distance into the block body towards the rear face. Side surface 407 has been given a natural stone-like texture. Front face 404 has the same features of front face 104 of block 100.

In some embodiments of the invention the blocks are provided with side walls that are shaped to cooperate with adjacent blocks in a wall to hide the joints or seams between adjacent blocks in a course. Examples of such embodiments are shown in FIGS. 45 to 51.

Figure 45:
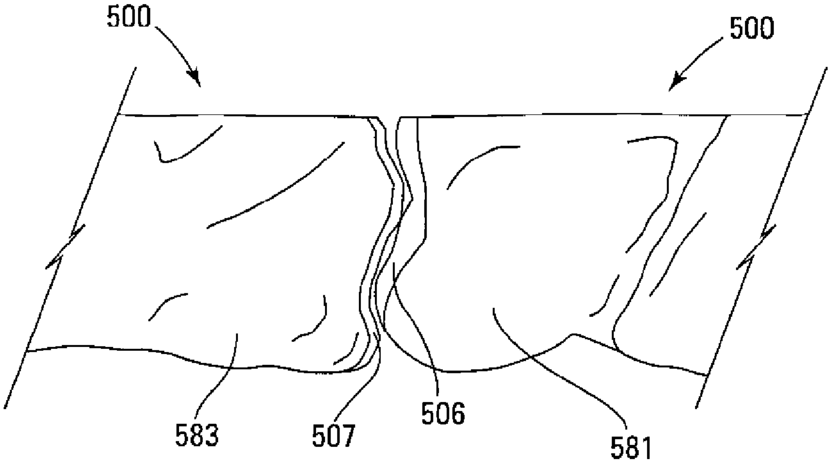
FIG. 45 is a partial front view of two blocks 500 positioned side-by-side as they would be placed in a course of a wall constructed with the blocks showing an alternate side configuration.

FIG. 45 is a partial front view of two blocks 500 positioned side-by-side as they would be placed in a course of a wall constructed with the blocks. Block 500 is similar to block 100 except that side surface 506 and side surface 507 are non-planar and follow a meandering path from the top surface of the block to the bottom surface of the block which may, for example, be S-shaped. The meandering path followed by side wall 506 is complementary to the path followed by side wall 507 so that when the blocks are placed next to each other in a course they generally mate and present a non-vertical joint between the blocks which gives the wall a more natural appearance. Side walls 506 and 507 can also be imparted with any desired texture in the mold cavity. As such, the surface of shaped area 581 adjacent side wall 506 can form a contoured side edge along the front edge of the front face of a first block that can mate or be paired with the surface of shaped area 583 adjacent side wall 507 of a second block when the blocks are placed adjacently in a course of blocks.

Figure 46:
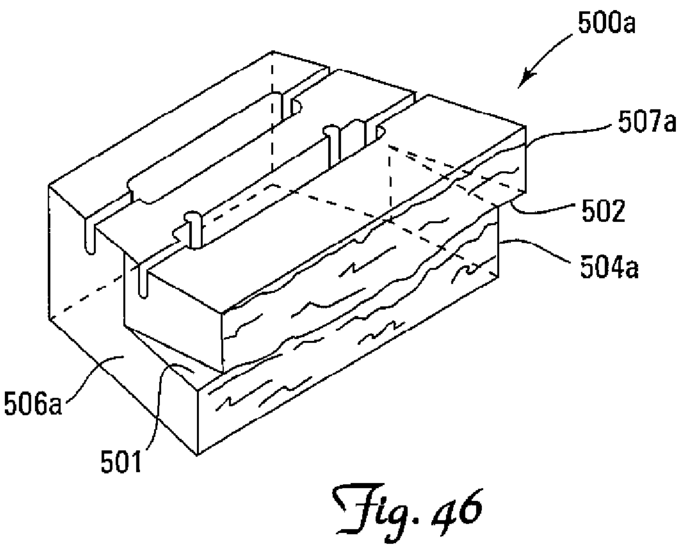
FIG. 46 is a top perspective view of an alternate block embodiment.
Figure 47:
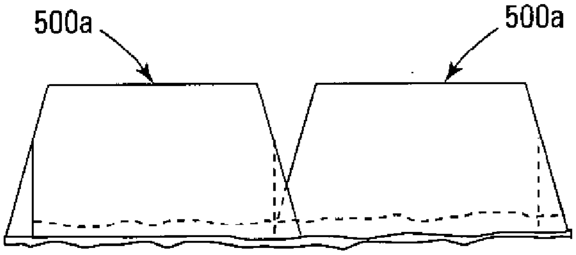
FIG. 47 is a top plan view of two adjacent blocks of FIG. 46.
Figure 48:
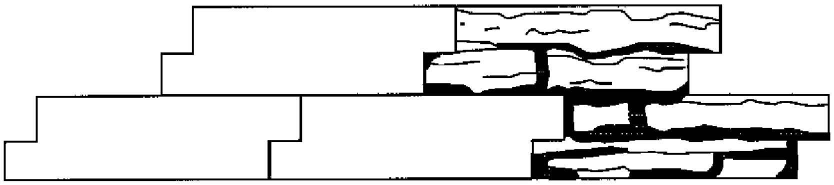
FIG. 48 is a front view of a portion of a wall constructed with the blocks of FIG. 46.

FIG. 46 is a front top perspective view of a block 500*a*. Block 500*a* has front face 504*a* which could have the features of front face 104 of block 100. Side walls 506*a* and 507*a* are similar to side walls 506 and 507 of block 500 except that they follow a geometrical stepped path from the top surface of the block to the bottom surface of the block. Specifically, side wall 506*a* has shelf 501 and side wall 507*a* has undercut 502. This construction provides the blocks with a horizontal ship lap construction which allows them to mate when placed adjacent to each other in a course of blocks when constructing a wall with the blocks. FIG. 47 is a top view of two blocks 500*a* in mating side-by-side relationship. FIG. 48 is a front view of a portion of a wall constructed with blocks 500*a* and shows that the ship lap connection gives the wall a random appearance and eliminates vertical seams or joints between adjacent blocks.

Figure 49:
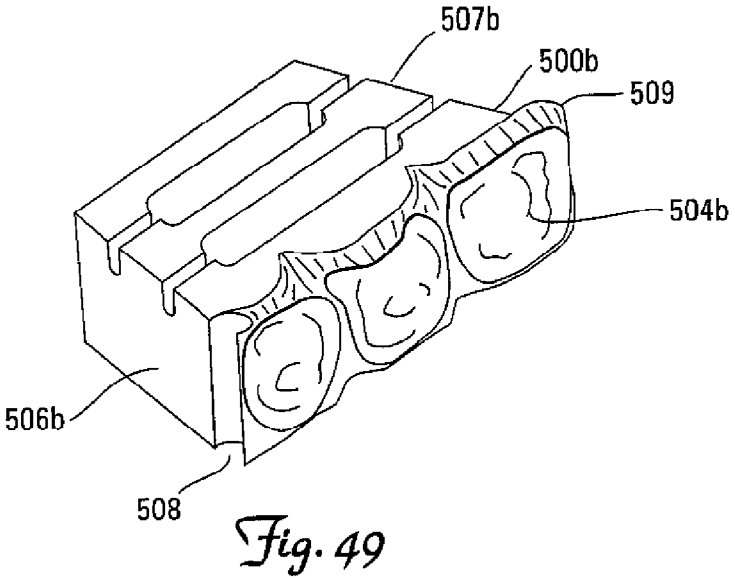
FIG. 49 is a top perspective view of an alternate block embodiment.
Figure 50:
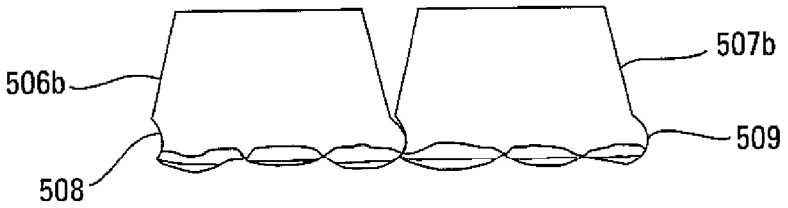
FIG. 50 is a top plan view of two adjacent blocks of FIG. 49.

FIG. 49 is a top perspective view of a block 500*b*. Block 500*b* has front face 504*b* which could have the features of front face 104 of block 100. Side walls 506*b* and 507*b* are provided with a vertical channel 508 and a vertical projection 509, respectively. This construction provides the blocks with a vertical ship lap construction which allows them to mate when placed adjacent to each other in a course of blocks when constructing a wall with the blocks. FIG. 50 is a top view of two blocks 500*b* in mating side-by-side relationship showing how channel 508 receives projection

Figure 51:
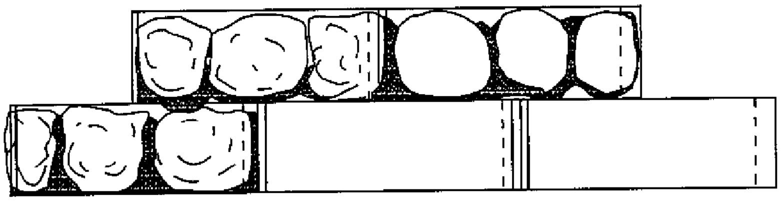
FIG. 51 is a front view of a portion of a wall constructed with the blocks of FIG. 49.

509 when blocks 500*b* are placed next to each other in a course. FIG. 51 is a front view of a portion of a wall constructed with blocks 500*b* and shows that the ship lap hides any space between adjacent blocks in a course, prevents exposure of drainage rock and/or backfill soil from behind the wall and gives the wall a more unitary appearance.

An alternate embodiment of the block is shown in FIGS. 52 to 55 which are perspective, bottom, top and side views, respectively, of a block 600 having a front face with a ledge stone-like appearance. Block 600 has a block body having parallel top surface 602 and bottom surface 603, front face 604, rear face 605 and first and second side walls 606 and 607. Rear face 605 extends from top face 602 to bottom face 603 and side walls 606 and 607 extend from top surface 602 to bottom surface 603, converging from front face 604 toward rear face 605. Top surface 602, bottom surface 603, front face 604, rear face 605 and side walls 606 and 607 form block body 620. Front face 604 has a compound shape and may protrude outward from top and bottom surfaces 602 and 603, respectively and/or extend into the block body 620 towards the rear surface 605 of the block. Front face 604 extends from top surface 602 to bottom surface 603 and from side wall 606 to side wall 607. It should be understood that block 600 is not limiting and that block 600 could have any desired shape and could be any desired dimension. It should be further understood that front face 604 could have any shape, pattern or texture as desired.

Figure 52:
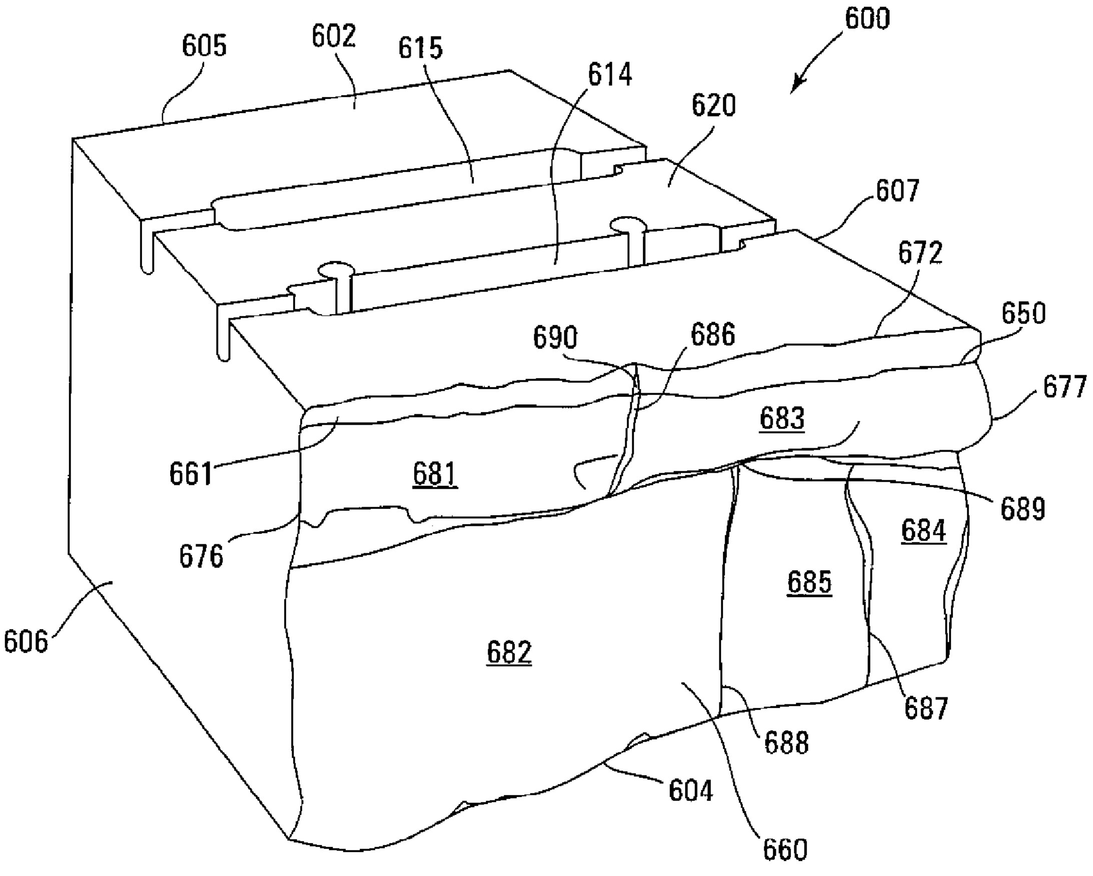
FIGS. 52 to 55 are front perspective, bottom, top and side views, respectively, of an alternate embodiment of a block.

As best seen in FIG. 52, front face 604 has multiple shaped areas 681, 682, 683, 684 and 685 that are three dimensional and are molded to have the appearance of ledge stone. Front face 604 has an irregular compound shape having surfaces that may extend outwardly from top and bottom surfaces 602 and 603, respectively, and surfaces that may extend inwardly into block body 620 toward rear face 605. The multiple shaped areas with a ledge stone-like appearance are molded onto the block by a movable face liner as known in the art and a forming stripper shoe during the molding process and are discussed further below. The moveable face liner molds front portion 660 of front face 604 and the forming stripper shoe molds front portion 661 of front face 604. The area where the moveable face liner and stripper shoe align or abut along the front face of the block during the molding process imprints a parting line 650 into the front face of block 600.

Parting line 650 is the separation boundary of front portion 660 and front portion 661. Parting line 650 extends across front face 604 from side wall 606 to side wall 607 and is irregularly contoured along both a horizontal plane and along a vertical plane. The irregular horizontal and vertical contour of parting line 650 creates a more random ledge stone-like appearance to the front face 604 of the block. Parting line 650 is generally located below top surface 602 of the block when top surface 602 is facing upward. In this embodiment parting line 650 extends generally horizontally to enhance the ledge stone-like appearance of the block. However, the features of parting line 650 are similar to those of parting line 150 of block 100 as described previously and will not be repeated here. More specifically, the shape, dimensions and contour of parting line 650 fall within the ranges set forth for parting line 150 and will not be repeated here.

Figure 54:
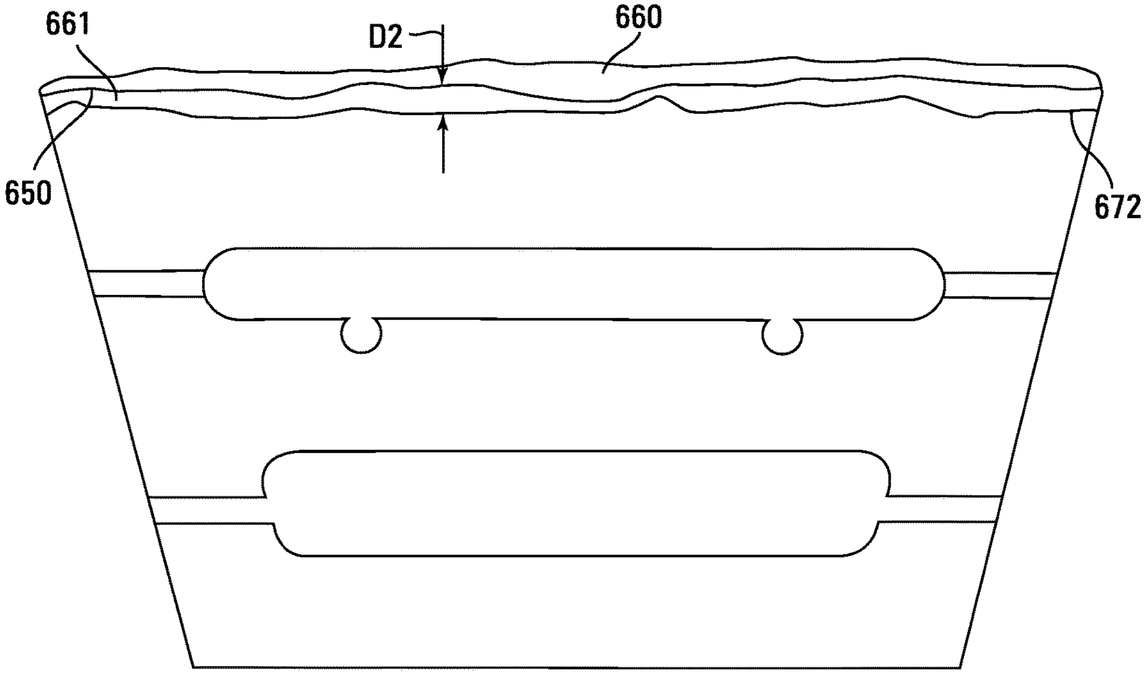
Figure 55:
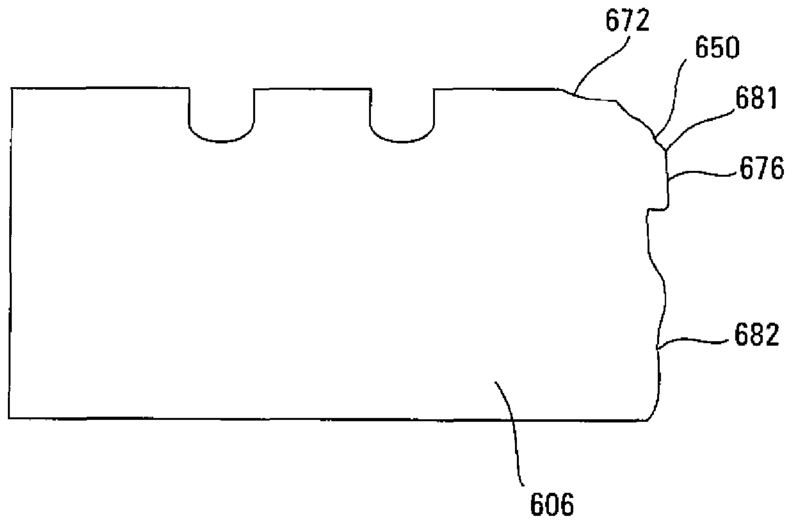
Figure 56:
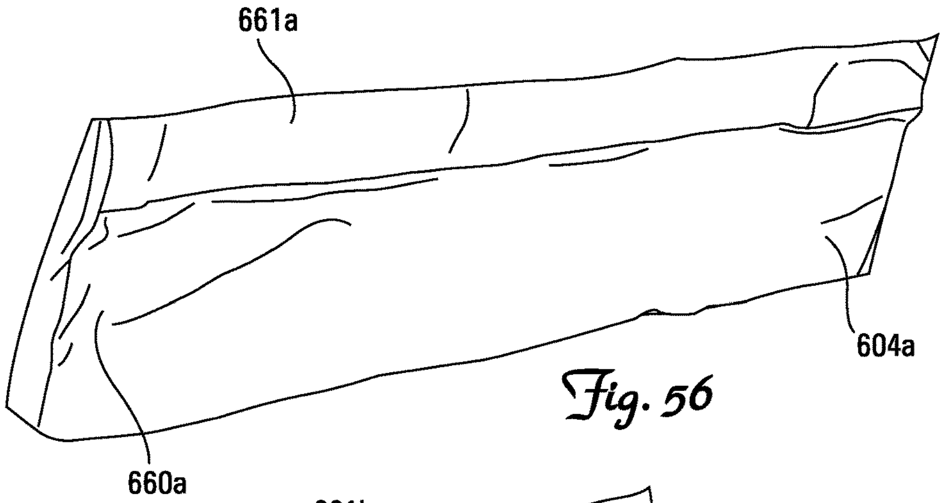
FIGS. 56 to 59 are perspective views of optional embodiments of front faces of the block of FIGS. 52 to 55.
Figure 57:
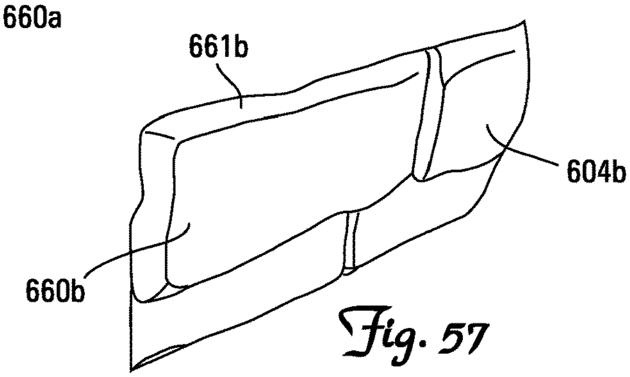
Figure 58:
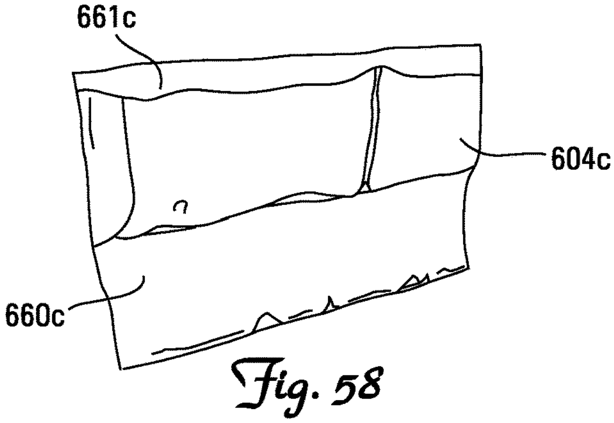
Figure 59:
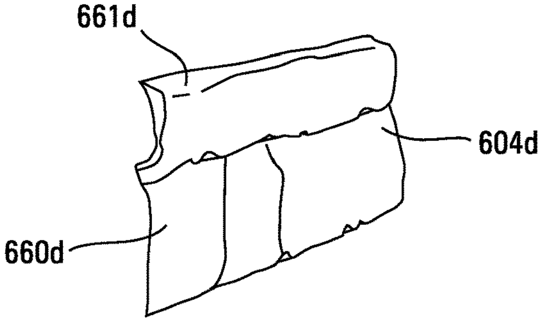

As best seen in FIGS. 52 and 54 front portion 661 has an irregularly contoured surface along front face 604 of block 600 and extends from top surface 602 to parting line 650 and from side wall 606 to side wall 607. The irregular contoured surface of front portion 661 generally has a downward slope from top surface 602 to parting line 650. Degrees of downward slope from top surface 602 to parting line 650 at locations along front face 604 are within the range described previously with respect to the downward slope from top surface 102 to parting line 150 of block 100. The sloping of front portion 661 creates a visually pleasing aesthetic and when blocks 600 are stacked in a wall with the top surface facing upward, the upper course of block creates a shadowing effect over the front portion 661 of the lower course of block enhancing the three dimensional effect of the shaped areas of the front faces of the blocks in the wall. The forming stripper shoe that molds front portion 661 of front face 604 may also create an irregular contoured edge 672 along top surface 602. Edge 672 separates top surface 602 from front portion 661 and thus top surface 602 from front face 604. Edge 672 has features similar to edge 172 of block 100. Edge 672 is located on front portion 608 of block 600. Edge 672 may be positioned as close in proximity to core 614 as desired. Front portion 661 has depth D2 which is the distance from edge 672 to parting line 650. Depth D2 may be any desired dimension and may be in the range of the dimensions set forth above with respect to dimension D of block 100.

Figure 53:
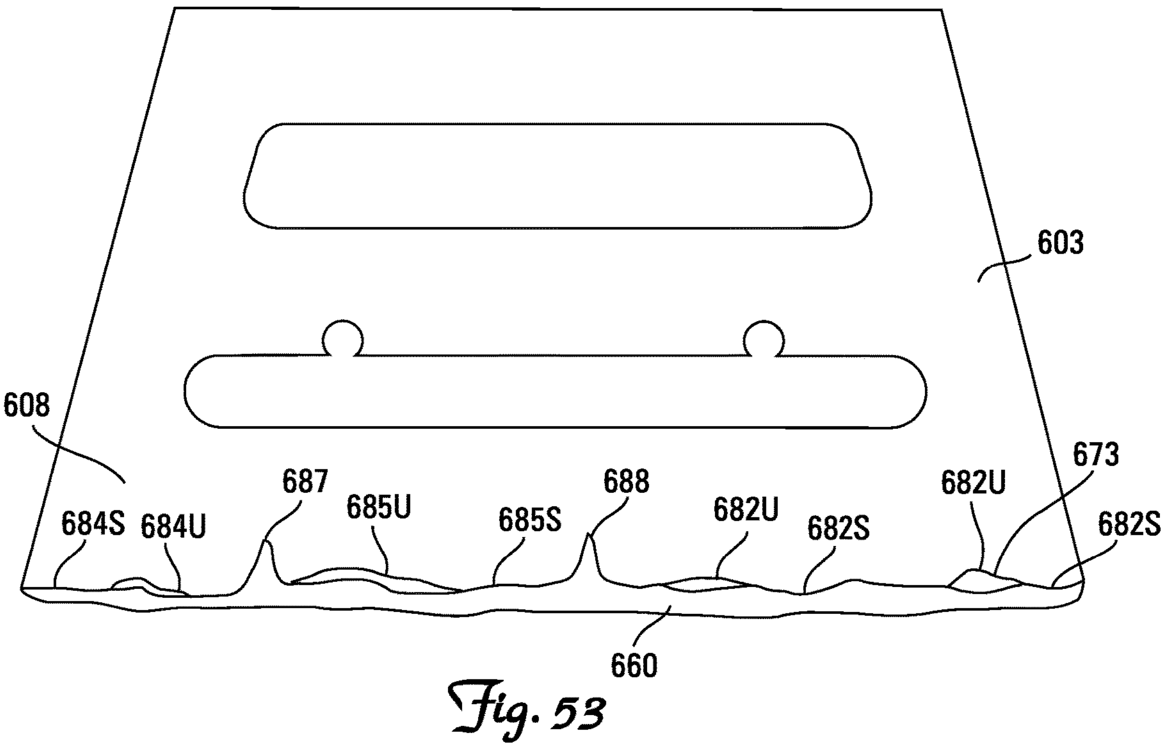

As shown in FIGS. 52 and 53, front portion 660 extends from parting line 650 to bottom surface 603. Front portion 660 of block 600 has shaped areas 681, 682, 683, 684 and 685 that each have a three dimensional irregular ledge stone-like shape and may be positioned lower than/beneath upward facing top surface 602 of block 600. Shaped areas 681, 682, 683, 684 and 685 may extend outwardly from top surface 602 and bottom surface 603. Each shaped area may have an irregularly contoured surface that gives a more pleasing visual aesthetic as well as more accurately imitates the irregular contoured surfaces of a ledge stone. It should be understood that front face 604 could have any desired number of shaped areas and that the shaped areas could be any desired size or shape. Additionally, the shaped areas may extend outward (or project inward) from the top and bottom surfaces at any desired dimension. The moveable face liner that molds front portion 660 of front face 604 may also create an irregular contoured edge 673 along bottom surface 603. Edge 673 is the boundary separating bottom surface 603 from front portion 660 and thus bottom surface 603 from front face 604. Edge 673 may be in the same horizontal plane as bottom surface 603 but may intersect the front face along different vertical planes parallel to the front face. It should be understood that edge 673 is not limiting and could have any desired contour and could, for example, be in the same horizontal plane and same vertical plane. Edge 673 is located on front portion 608 of block 600. Edge 673 may be positioned as close in proximity to core 614 as desired and may be located further from core 614 than edge 672 of top surface 602. Areas of front portion 660 may slope outwardly from edge 673 and thus bottom surface 603 and other areas may be vertical or slope inwardly toward rear face 605 further adding to the three dimensionality of front face 604 and creating the randomness and irregularity associated with that of natural stone.

The movable face liner also creates irregularly contoured edges 676 and 677 of side walls 606 and 607, respectively. Edges 676 and 677 extend from top surface 602 to bottom surface 603. Edges 676 and 677 may be in the same vertical plane as side walls 606 and 607, but may intersect different vertical planes parallel to the front of the block. It should be understood that edges 676 and 677 are not limiting and could have any desired contour.

As shown in FIG. 52, shaped areas 681 and 682 are located adjacent to side wall 606 and shaped areas 683 and 684 are located adjacent to side wall 607. Shaped area 685 is located between shaped areas 681 and 684 and beneath shaped area 683. Front portion 661 forms the upper surface of shaped areas 681 and 683. Shaped areas 681 and 683 are separated by vertical joint 686 and are located on front portion 660. Shaped areas 682 and 685 are separated by vertical joint 688 and shaped area 685 is separated from shaped area 684 by vertical joint 687. Shaped areas 683 and 681 have a false horizontal joint 689 between themselves and shaped areas 682, 685 and 684. Shaped areas 681, 682, 683 and 684 may extend outwardly from top and/or bottom surface 602 and 603 at any desired dimension. Valley or joint 690 located on front portion 661 follows the contour of valley or joint 686 and separates the upper surface of shaped area 681 from the upper surface of shaped area of 683. The shape, configuration and features of the valleys and joints formed in front face 604 are the same as described previously in connection with the valleys and joints of front face 104 of block 100 and need not be repeated here.

As shown in FIG. 53 shaped areas 682, 684 and 685 have support regions 682S, 684S, and 685S, respectively, and are the most outwardly extending portions of each shaped area located along edge 673 of bottom surface 603. Support areas 682S, 684S, and 685S may have gradual degrees of sloping, if any, from the outermost point of each respective shaped area extending towards the bottom surface. Support areas 682S, 684S and 685S may be continuous or segmented for each respective shaped area 682, 684 and 685. Shaped areas 682, 684, and 685 also have undercut regions 682U, 684U and 685U, respectively, and are the most inwardly extending portions of each shaped area. The undercut regions, along with joints 687 and 688, are the most inwardly extending portions located along edge 673. Undercut regions 682U, 684U, and 685U may have more pronounced degrees of sloping than the support regions, from various points of each respective ledge stone-like shaped area extending towards the bottom surface. Undercut regions 682U, 684U and 685U may be continuous or segmented for each respective stone shaped area 682, 684 and 685. Undercut regions 682U, 684U, 685U enhance the three dimensionality of each respective shaped area to produce a more ledge stone-like appearance.

Support regions 682S, 684S, and 685S provide contact points along the bottom surface of the block that provide sufficient stabilization during the molding process so that when block 600 is stripped from the mold, the support regions stabilize the front face as the mold material sets and hardens, preventing the front portion 660 (and front portion 661) from slipping, dislodging, collapsing or deforming. Without proper support regions the undercut regions and the valleys of front face 604 would cause the mold material of front portion 660 (and front portion 661) to deform, slide or dislodge from the block after the molded material is stripped from the mold cavity. Although the configuration of the shaped areas of face 604 of block 600 differ from the configuration of the shaped areas of face 104 of block 100 the discussion regarding the requirements and relationship of the support regions and undercut regions of block 100 are also applicable to the support and undercut regions of block 600 and need not be repeated here. Further, the discussion concerning supporting undercut regions at the bottom of the face also apply to the support of substantially horizontal ledges or joints in face 604.

It should be understood that front face 604 of block 600 could be molded onto any type of block and that the size, shape features of the block are not limiting. Thus, front face 604, or any of the various embodiments of front faces of blocks shown hereafter, may be molded onto any type and size of block as desired. Additionally, front face 604, and any of the various embodiments of front faces of blocks shown hereafter could be molded on blocks with or without cores, with or without pin holes, with or without receiving channels, with or without pin receiving cavities, or with other block features not discussed herein.

Alternate embodiments of the front face of block 600 are shown in FIGS. 56 to 59. Front faces 604*a* to 604*d* are substantially similar to front face 604 except that the locations, shapes and dimensions of the shaped areas, undercut regions, support regions and joints of front portions 660*a* to 660*d* and front portions 661*a* to 661*d* have been given alternate locations, shapes and dimensions.

Figure 60:
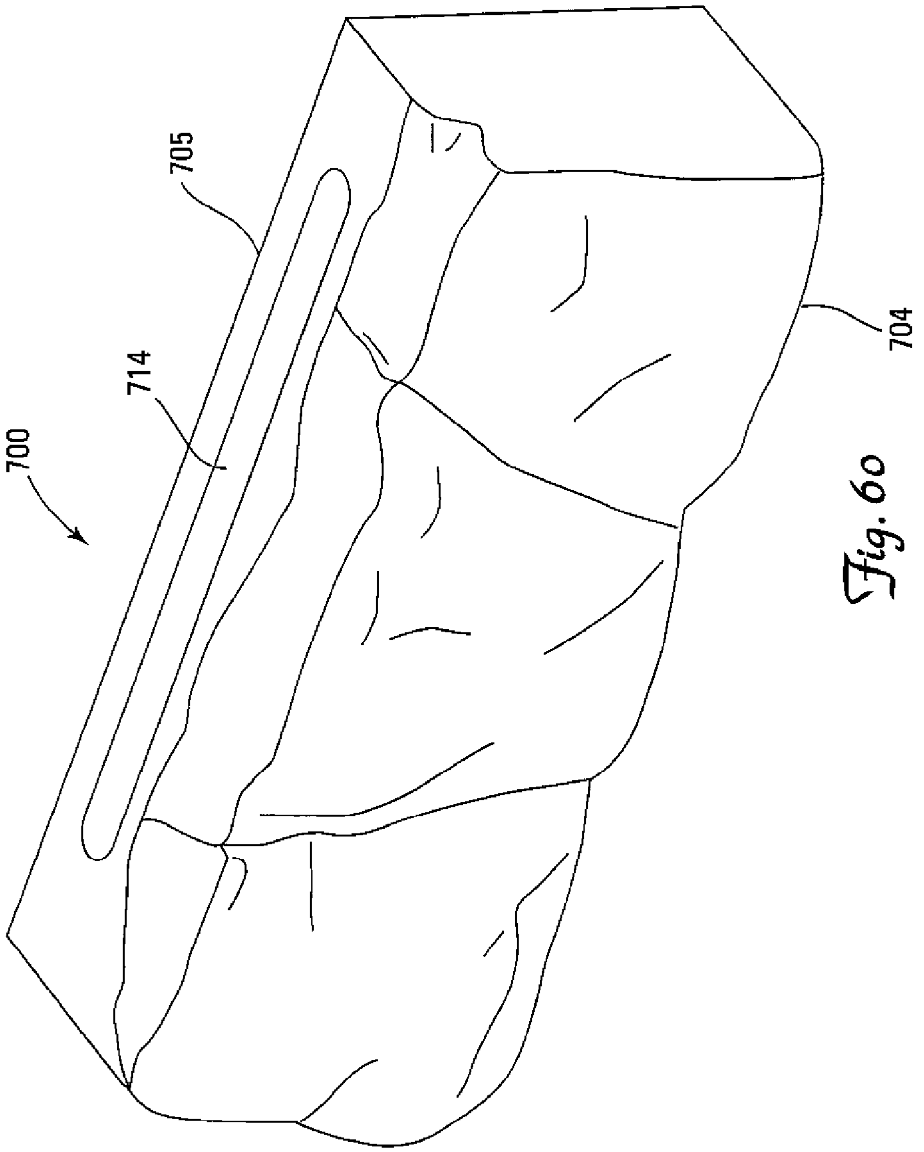
FIGS. 60 and 61 are perspective and side views of an alternate embodiment of a block.
Figure 61:
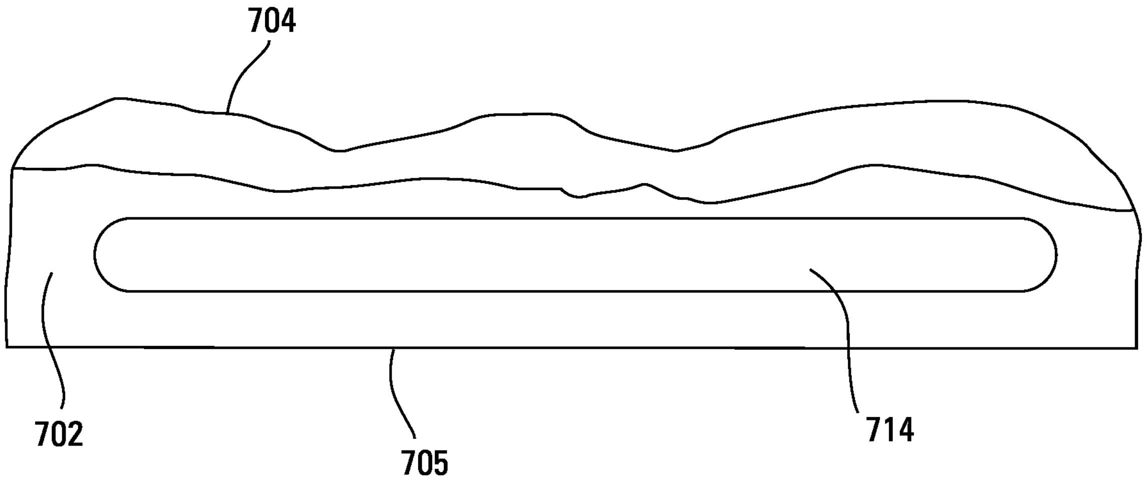

An alternate embodiment of the block is shown in FIGS. 60 and 61 which are top perspective and side views, respectively, of a block 700. As best seen in FIG. 60 the exposed face 704 of block 700 is substantially similar to the front surface 104 of block 100. Block 700 may be used as an edger block or as a paver in the construction of a patio, walkway or courtyard with exposed surface 704 facing upward. Further, the cores 714 of block 700 may be used as a cistern in the constructions of patios, courtyards and the like as a water reservoir or to allow water to flow underneath exposed surface 704. Block 700 may have core 714 or may be molded without a core. Block 700 is formed in the mold with side surface 702 facing upward and exposed surface 704 facing the front of the mold cavity. Bottom surface 705 is placed facing downward in the structures constructed with block 700. It should be understood that block 700 is not limiting and any embodiments of front or exposed faces may be molded onto exposed surface 704. Additionally, block 700 may be molded with a core of any desired shape or size.

Figure 62:
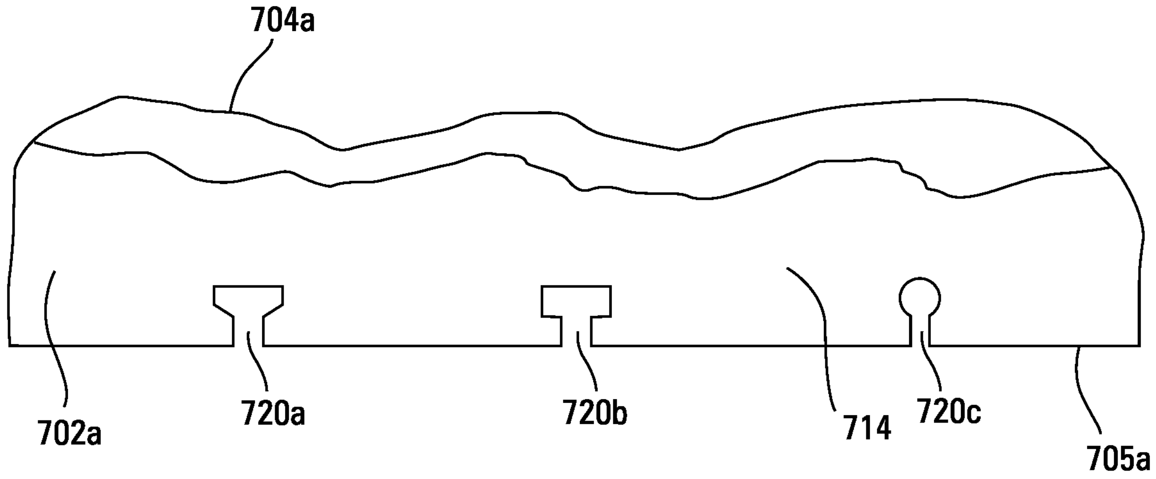
FIGS. 62 and 63 are side and perspective views of an alternate embodiment of the block of FIGS. 60 and 61.
Figure 63:
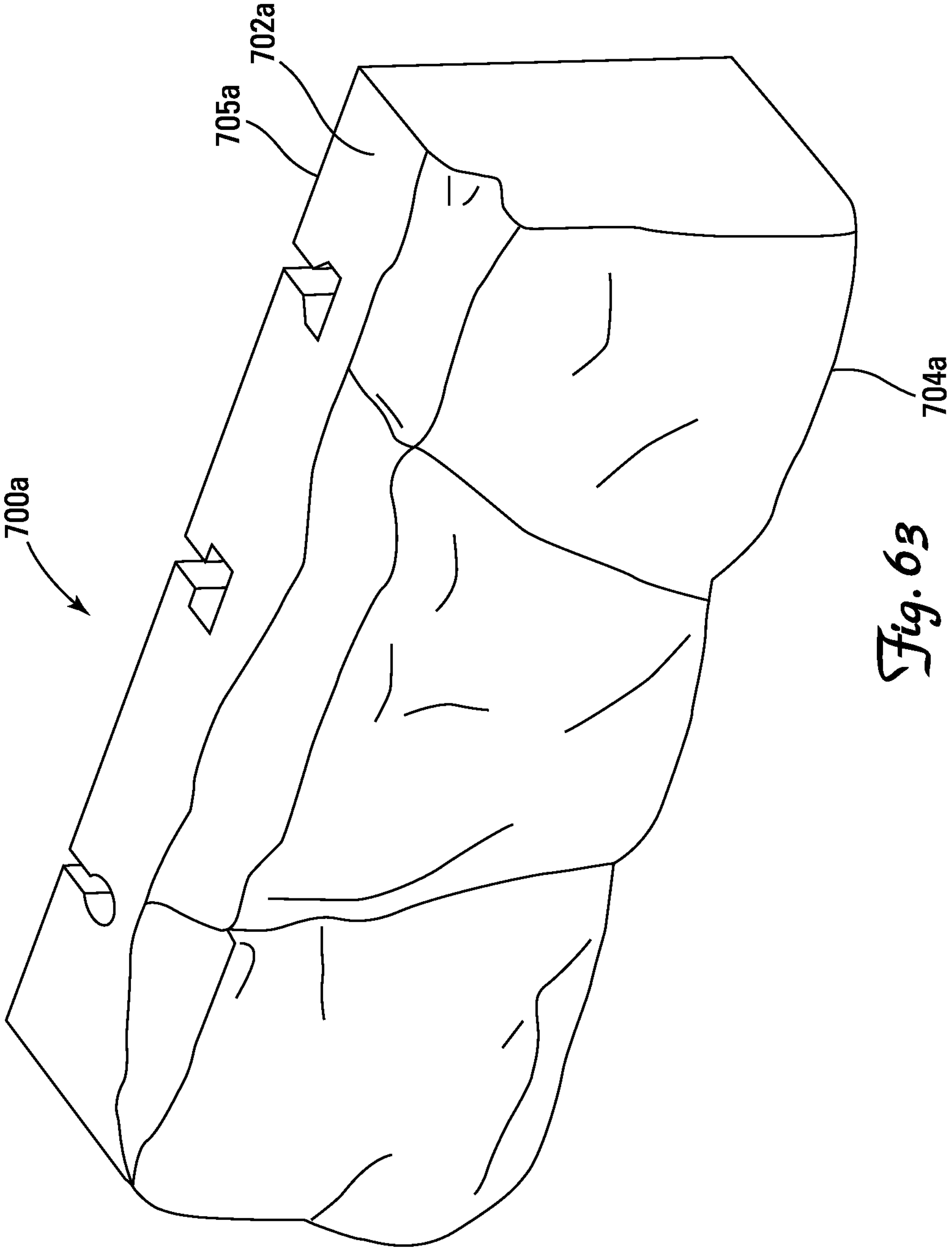

An alternate embodiment of block 700 is shown in FIGS. 62 and 63 which are top and front perspective views, respectively, of block 700*a*. Block 700*a* is configured to be used as a veneer finish when attached to an existing wall or a support structure. Block 700*a* is substantially similar to block 700 except that instead of a core it is formed with one or more connector slots 720*a*, 720*b* and 720*c*. The connector slots are shaped to accept a mating connector (not shown) which is used to connect block 700*a* to a horizontal support structure or existing wall surface which has been appropriately modified to accept the connector. After attachment to the support structure or modified wall surface blocks 700*a* form a veneer face of a wall. Connector slots 720*a*, 720*b* and 720*c* are shown having different shapes to illustrate that the slots may have a variety of configurations depending on the shape of the connector being used. The exposed face 704*a* of block 700*a* is substantially similar to the front surface 104 of block 100. Block 700*a* is formed in the mold with side surface 702*a* facing upward and exposed surface 704*a* facing the front of the mold cavity, and rear legs 705*a* facing the back of the mold cavity.

Figure 64:
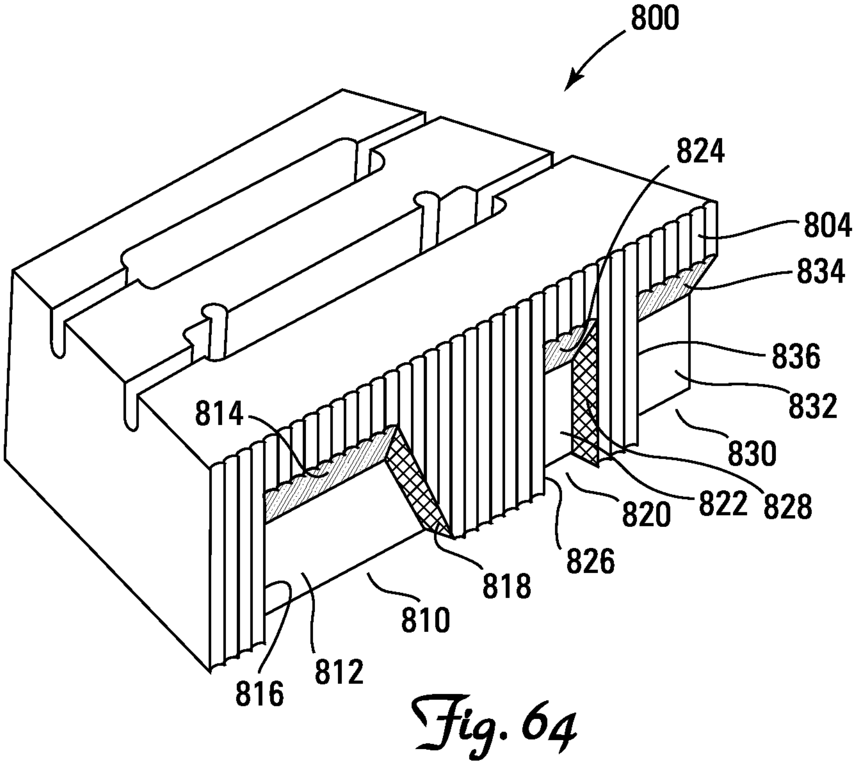
FIGS. 64 and 65 are top perspective views of additional block embodiments.
Figure 65:
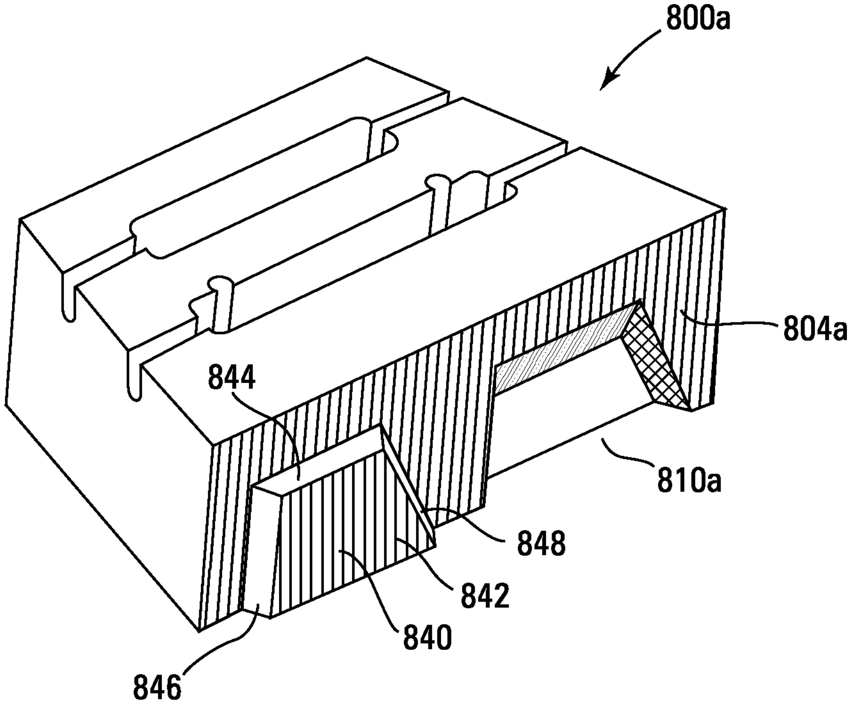

FIGS. 64 and 65 show additional alternate block embodiments. Block 800 is shown in FIG. 64. Block 800 has front face 804 which comprises a shaped area provided with geometric undercut areas 810, 820 and 830. Undercut 810 has a substantially vertical back wall 812, a horizontally oriented upper surface 814 which is angled inwardly from a top edge to a bottom edge, a substantially vertical side wall 816 and an angled side wall 818. Side walls 816 and 818 are angled inwardly towards one another from a front edge to a back edge. Undercut 820 has a substantially vertical back wall 822, a horizontally oriented upper surface 824 which is angled inwardly from a top edge to a bottom edge, and two substantially vertical side walls 826 and 828. Side walls 826 and 828 are angled inwardly towards one another from a front edge to a back edge. Undercut 830 has a substantially vertical back wall 832, a horizontally oriented upper surface 834 which is angled inwardly from a top edge to a bottom edge, and a substantially vertical side wall 836.

Block 800*a* is shown in FIG. 65. Block 800*a* has front face 804*a* which comprises a shaped area provided with a geometric undercut 810*a* having features similar to undercut 810 of block 800. Unlike block 800, block 800*a* has an additional protruding geometric shaped area 840. Shaped area 840 has a substantially vertical front wall 842, a horizontally oriented upper surface 844 which is angled upwardly from front wall 842 to a top edge, a substantially vertical side wall 846 and an angled side wall 848. Side walls 846 and 848 are angled outwardly from one another from the front wall 842 towards the rear face of the block.

Figure 66:
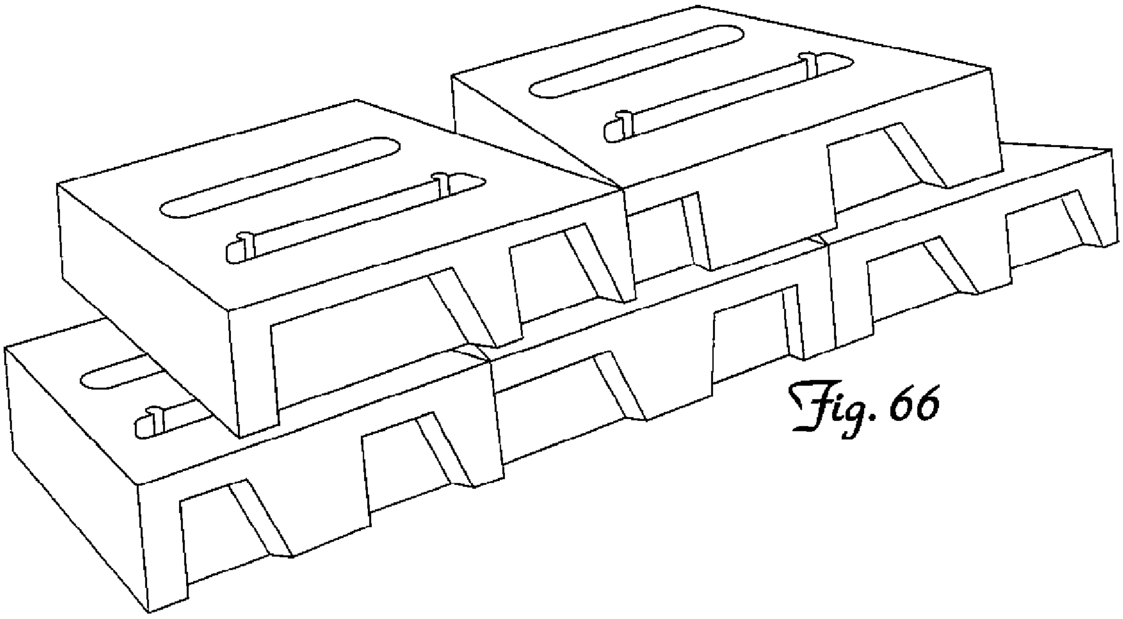
FIG. 66 is a perspective view of a partial wall built with blocks similar to the blocks of FIG. 64.
Figure 67:
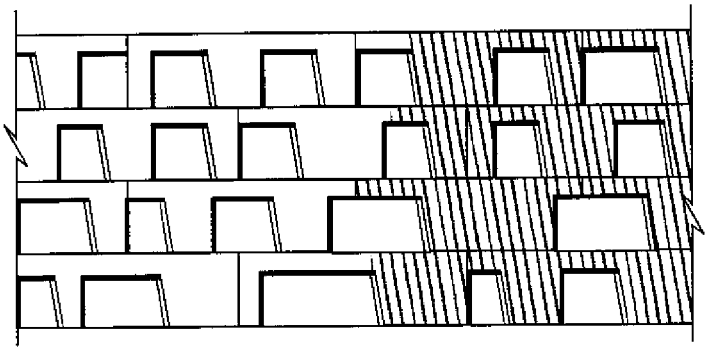
FIGS. 67 and 68 are front views of walls built with the blocks of FIGS. 64 and 65.
Figure 68:
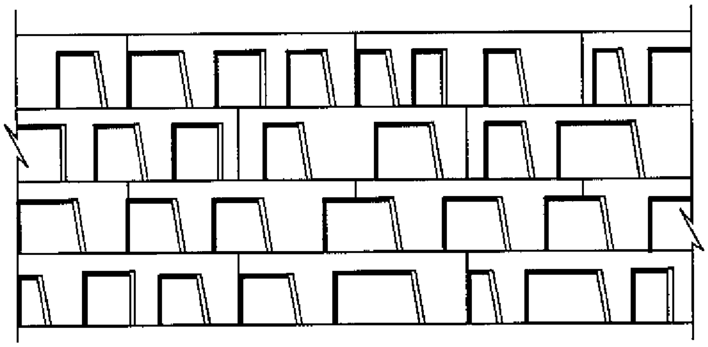

FIG. 66 is a perspective view of a partial wall constructed from blocks having a geometric face pattern similar to block 800 of FIG. 64. FIGS. 67 and 68 are front views of partial walls constructed from blocks having face patterns similar to blocks 800 and 800*a* and illustrate the variety of geometric front wall designs which can be achieved using blocks constructed in accordance with this embodiment. The geometric patterns which may be formed into the faces of the blocks are not limited to those shown and may include any regular or irregular geometric pattern including arches and triangles.

Figure 69:
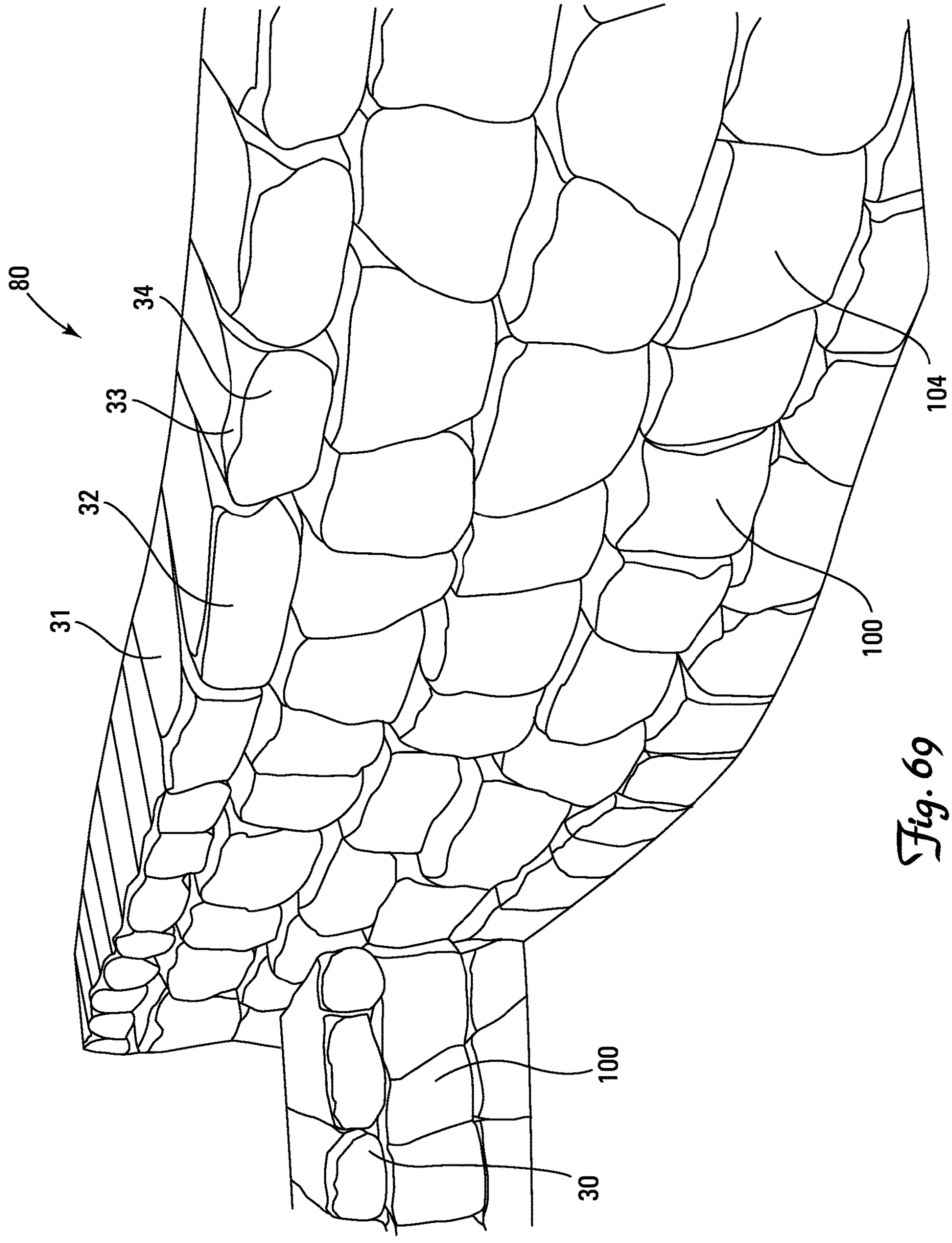
FIGS. 69 and 70 are perspective views of a wall constructed with the blocks of FIGS. 1 to 6 and FIGS. 34 to 37, respectively.
Figure 70:
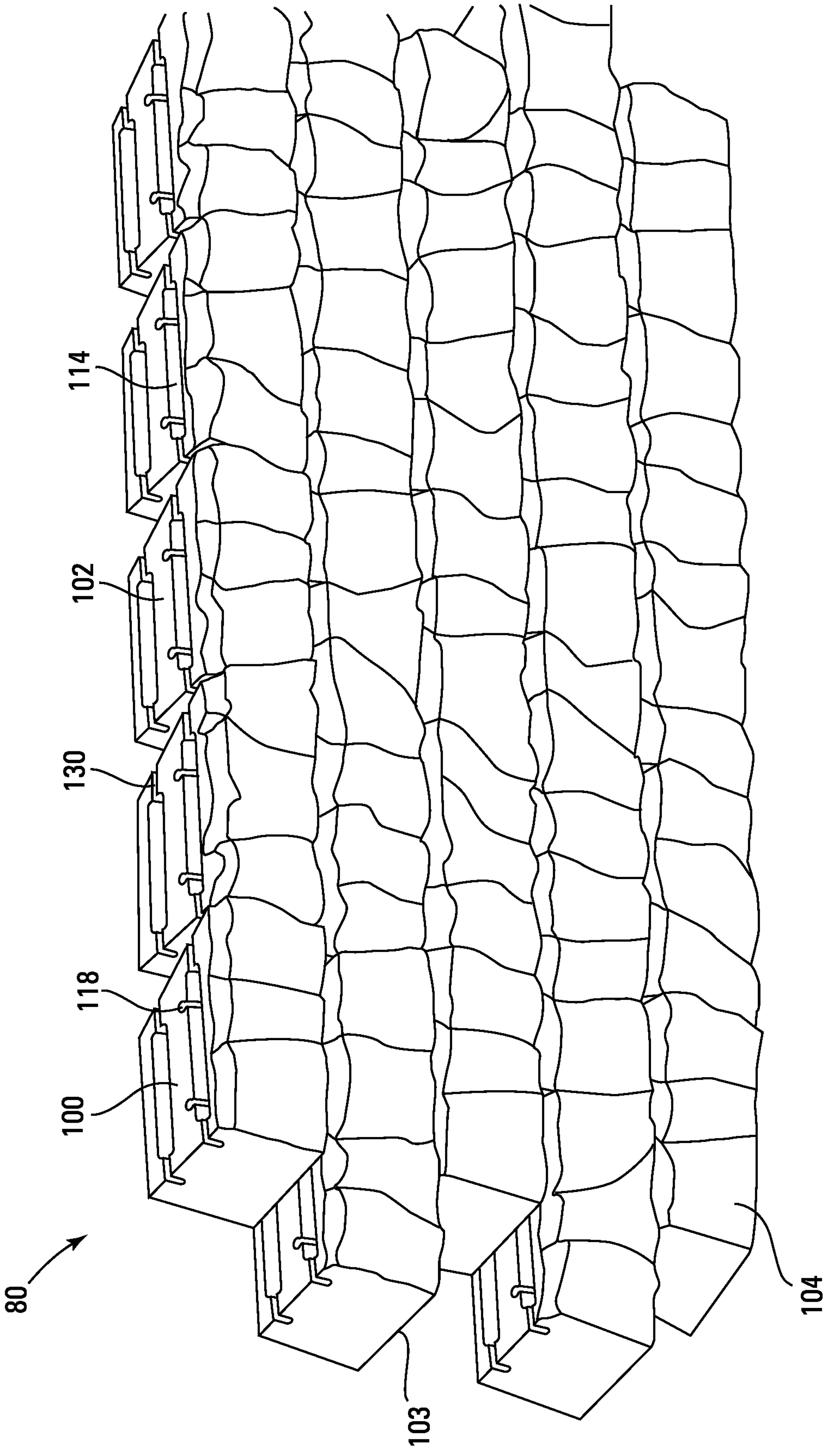

FIGS. 69 and 70 illustrate views of a fully constructed wall and partially constructed wall 80, respectively, made from block 100. Wall 80 has been constructed with block 100 with multiple different embodiments of front face 104. Block 100 is used to form a wall having a front surface. Generally, when constructing a wall, a trench is excavated to a pre-selected depth and partially filled with a level base of granular material such as crushed stone. A base layer of blocks are then placed and leveled onto the crushed stone. The blocks are placed side to side with front face 104 facing outward and the bottom surface 103 facing downward. When the pinning system is utilized, pins are placed into pin hole 118 of the top surface of the blocks. The heads of the pins are then received in cores 114 in the bottom surface of the upper adjacent course of blocks. Subsequent layers of blocks can then be placed one on top of the next with the pin connection system until the desired height is reached. Once the base layer is laid, the second layer is laid with the bottom surface 103 of the blocks of the second layer placed upon the top surface 102 of the blocks of the base layer. It should be noted that when the block is used in constructing a gravity wall, the weight of the blocks may be sufficient for connection without the use of the pinning system. When the desired height of the wall is achieved a capping block 30 may be used to form a capping or finishing layer 31.

Capping block 30 may be formed in a mold the same was as block 100 without cores, pinholes or receiving channel. Capping block 30 may have a front face 32 with front portion 33 similar to front portion 161 of block 100 and front portion 34 similar to front portion 160 of block 100. Front portion 34 may have shaped areas and valleys. The shaped areas may have support regions and undercut regions along the bottom surface of the capping block.

When constructing a wall with geogrid reinforcement material for walls which need geogrid to add a tensile soil reinforcing element to the mechanically stabilized earth, a base layer of blocks is laid and the pins are placed into pin holes 118 of top surface 102 of the blocks 100. The geogrid (not shown) may be made from a polyester knitted and/or woven synthetic material with a PVC or substantially similar compound coating, or they can be made with HDPE polyethylene materials. The layering of the geogrid may be determined by engineering analysis as known in the art. When the type of geogrid has been accurately determined for its specific location in a wall the geogrid is cut to length and placed over the block. It can be placed either over the connecting pins or the geogrid can be placed on the blocks first, and then the pins are put into the open pin holes on the top surface of the block to connect the geogrid to the blocks. The geogrid soil reinforcement material is thus connected to the pins and pulled taut (towards the backfill embankment). The heads of the pins are then received in cores 114 in the bottom surfaces of the upper adjacent course of blocks. The cores of the blocks and 6 inches behind the wall may be filled in with crushed stone for drainage to permit hydrostatic load reduction from behind the wall. The crushed stone interlock between courses of wall blocks improves pull out resistance and increases connection strength of the geogrid. When the desired height of the wall is achieved a cap or finish layer 30 may be added.

Additionally or optionally, it should be understood that the geogrid reinforcement material may be laid over the desired course of blocks and a channel bar or other geogrid securing means may be inserted into one of the receiving channels 130 of block 100. The geogrid soil reinforcement material may then be pulled towards the backfill embankment securing the channel bar or other geogrid securing means within the receiving channel and an upper adjacent course of blocks may then be laid.

Figure 71:
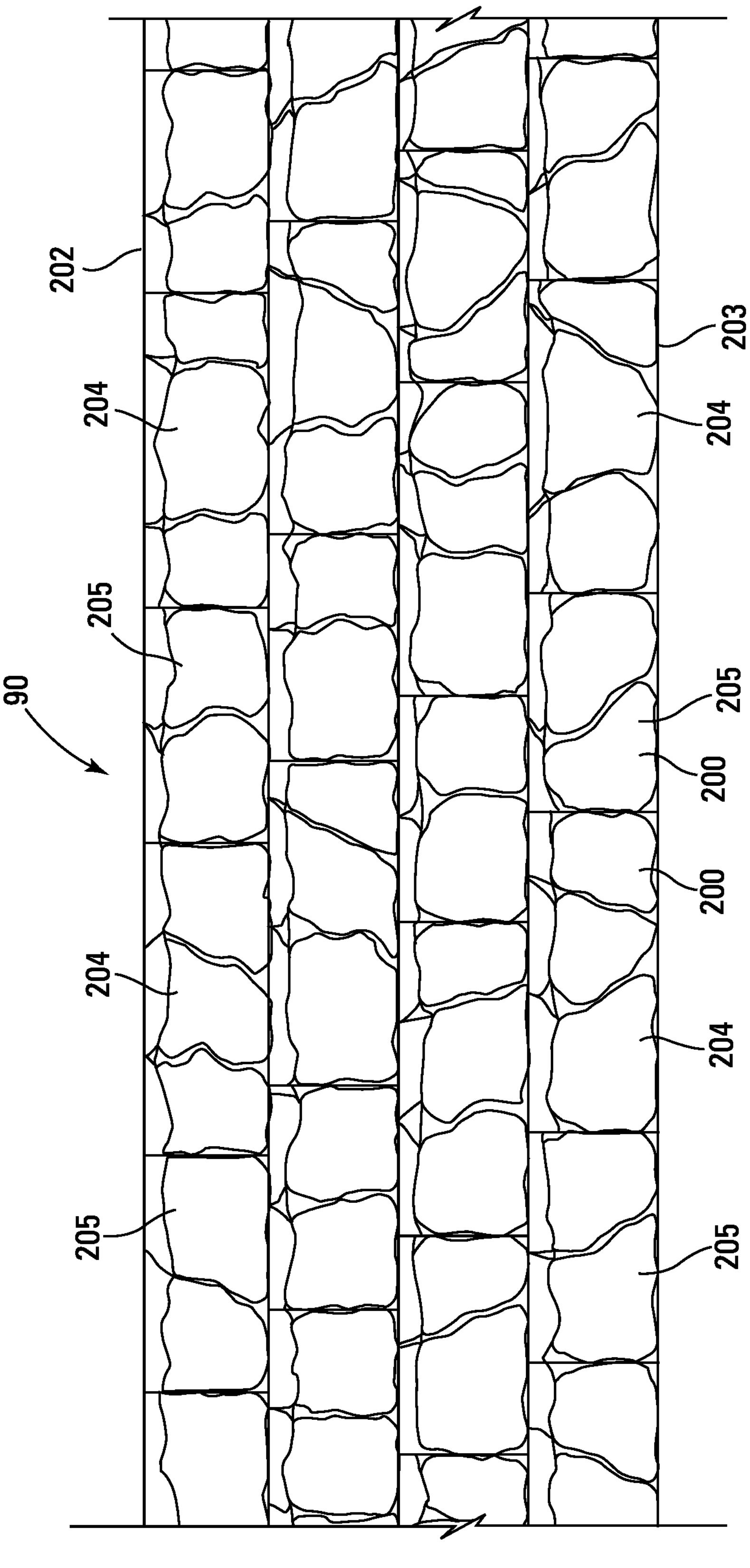
FIG. 71 is a front view of a wall constructed with the blocks of FIGS. 38 to 42.

It should further be noted that in some applications having limited or no set back and substantially vertical alignment and the height of the wall is such that the structure need further stabilization, vertical reinforcing members such as rebar, may be threaded through vertical open cores (columnar cavities) created by the cores of blocks as they are stacked one upon the other. It should further be noted that the wall may be constructed with two or more sizes of block as desired for a more random appearance of the wall aesthetic depending upon the application. FIG. 71 is a front view of retaining wall 90 made from blocks 200. Block 200 may be used to form a wall having exposed front and rear surfaces. During construction of the wall a trench is excavated to a pre-selected depth and is partially filled to approximately 4 inches thick with a level base of granular material such as crushed stone. A base layer is then placed with a first block positioned such that front face 204 faces outwardly at the front of the wall and rear surface faces outwardly at the rear of the wall. A second block 200 is then positioned adjacent the first block with front face 204 facing outwardly at the rear of the wall and rear surface 205 facing outwardly at the front of the wall. In this embodiment rear face 205 is shown as having two shaped areas and front face 204 as having three shaped areas but it should be understood that the number and shape of the shaped areas of the front and rear faces could be varied as desired. Blocks 200 are alternated in this pattern until completion of the base layer. Once the base layer is laid, a first block 200 is positioned with the bottom surface 203 of the second layer placed upon the top surface 202 of the blocks of the base layer. The first block is positioned such that front face 204 faces outwardly at the front of the wall and rear surface faces outwardly at the rear of the wall. A second block 200 is then positioned adjacent the first block with rear face 205 facing outwardly at the front of the wall and front surface 204 facing outwardly at the rear of the wall. Blocks 200 are alternated as such until completion of the second layer. Subsequent layers of blocks can then be placed in such a manner until the desired height of the wall is reached. It should be noted that when the block is used in constructing a gravity wall, the weight of the blocks may be sufficient for connection without the use of the pinning system. When the pinning system is utilized, pins are placed into pin hole 218 of the top surface of the blocks. The heads of the pins are then received in cores 214 or 215 in the bottom surface of the upper adjacent course of blocks. Subsequent layers of blocks can then be placed one on top of the next with the pin connection system until the desired height is reached. It should be understood that a vertical partition of separating wall with textured or patterned faces on both sides can also be built using blocks as described herein.

Figure 72:
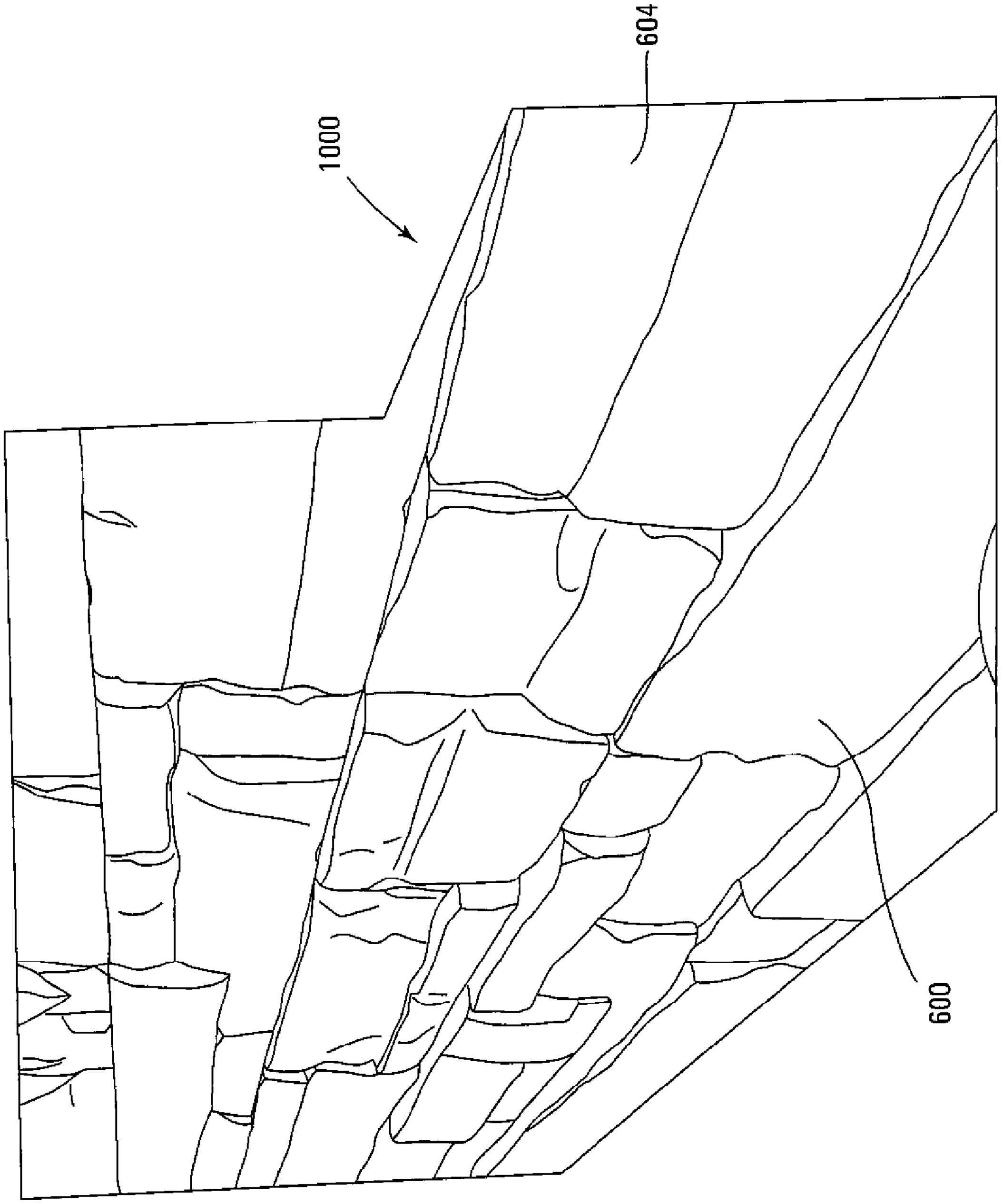
FIG. 72 is a perspective view of a wall constructed with the blocks of FIGS. 52 to 55.

FIG. 72 is a partial perspective view of the front of a wall 1000 made from blocks 600 with multiple embodiments of front face 604. FIG. 72 illustrates the varying face pattern that can be achieved with blocks 600.

Figure 73:
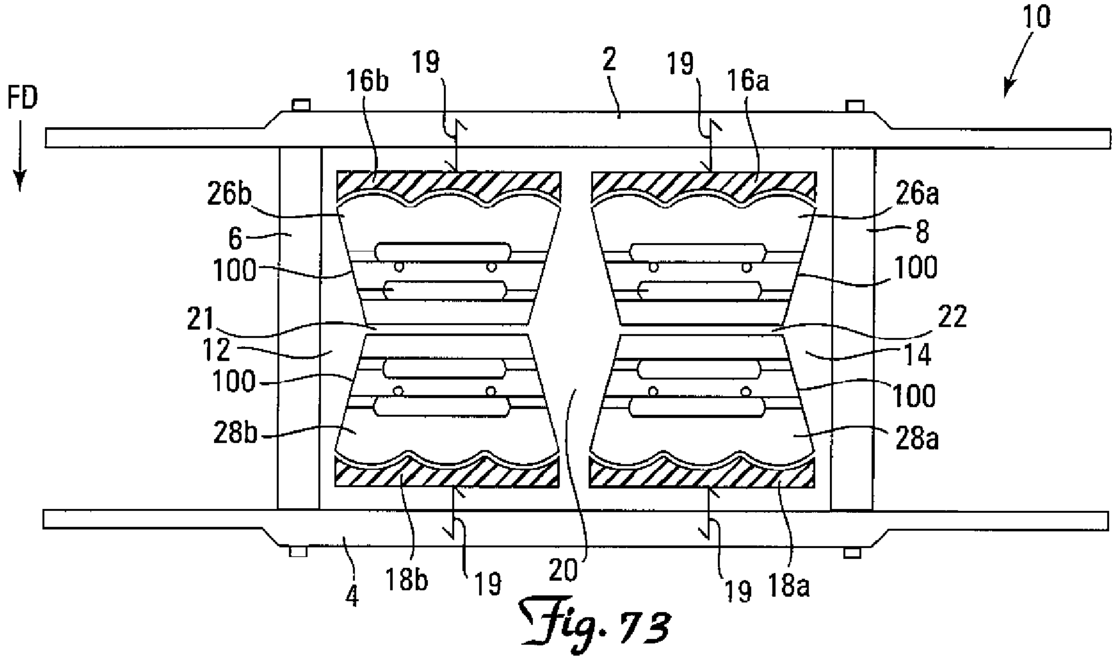
FIG. 73 is a top view of a mold box for molding blocks of the present invention.

FIG. 73 is a top plan view of a multi-block mold box 10 for making the blocks described herein. Mold box 10 generally includes opposing first and second side frame walls 2 and 4 and opposing first and second end frame walls 6 and 8. End liners 12 and 14 have a compound shape that may be formed, machined or flame cut during the manufacture of the mold box. Alternatively, the compound shape can be formed by the use of replaceable side liners as is known in the art. Moveable face liners 16*a*, 16*b*, 18*a* and 18*b* form front portion 160 of front face 104 of wall block 100 and can have a contoured molding surface having a compound shape that may be formed, or machine cut during the manufacture of the mold box. Alternatively, contoured molding surface of the moveable face liners can be formed by the use of replaceable liners as known in the art. Moveable means, not shown but indicated by directional arrows 19, allow the moveable liners to move from an engaged position when the mold is ready to be filled with material to a disengaged position when the material is being stripped from the mold box and then back to the engaged position. Such moveable means are known in the art and are not described in detail herein. One example of such moveable means is disclosed and described in U.S. Pat. No. 7,175,414 assigned to Ness Inventions, Inc., St. Paul, Minnesota. When in the engaged position, the moveable face liners are aligned with the side walls and/or center frame wall of the mold cavity, enclosing the molding area to be filled and forming the mold cavity. After the mold cavity has been filled with material, the moveable face liner moves to the disengaged position where the moveable face liner retracts or moves away in some motion from the enclosed mold cavity, allowing the protruding contoured front face of the mold to be stripped away from the moveable liner and mold cavity without damaging the molded material. Mold box 10 may have various dimensions, typical dimensions of this mold box are about 18.5 inches (47.0 cm) wide (i.e., the width of both the first and second end walls), 26.0 inches (66.0 cm) long (i.e., the length of both the first and second side walls), and 4⅜ inches (10.2 cm) thick.

Center frame wall 20 spans side frame walls 2 and 4 of mold box 10 and has a compound shape. Division liner 21 spans from end liner 12 to center frame wall 20, and division liner 22 spans from end liner 14 to center frame wall 20. Center frame walls 20 and division liners 21 and 22 may be formed, machined or flame cut during the manufacture of the mold box to form a single, continuous and seamless mold. Alternatively, the ends of center frame wall 20 may be securely or removably fixed to side walls 2 and 4 in a conventional manner and the compound shape may be formed from removable side liners as is known in the art. Center frame wall 20, division liners 21 and 22, along with first and second end liners 12 and 14 and moveable face liners 16*a*, 16*b*, 18*a* and 18*b* form mold cavities 26*a*, 26*b*, 28*a* and 28*b*. Mold cavities 26*a*, 26*b*, 28*a* and 28*b* may form blocks or block shapes with identical lengths, heights and widths. It should be understood that the mold cavities could be formed without the division liner thus producing two mold cavities with paired blocks instead of four mold cavities with separate blocks. The paired blocks could then be split along their back faces after removal from the mold to produce four blocks.

The blocks are oriented in the mold box such that the front faces of the blocks are generally parallel to side frame walls 2 and 4 and perpendicular to the direction of travel of the feed drawer and cut-off bar represented in FIG. 73 by arrow FD. The feed drawer and cut-off bar are well known to those of skill in the art and are not shown in the drawing figures. Traditionally, cores and/or pin holes are formed in blocks using core bars having core (or pin) forming portions suspended from core bars. The core bars are positioned to be parallel to the direction of travel of the feed drawer to ensure that block forming material is evenly distributed in the mold box and that excess material can be removed by the cut-off bar, which is shaped or notched to accommodate the shape of the core bar, as it travels over the mold box. Core bars placed in the traditional orientation parallel to the direction of travel of the feed drawer do not work well with mold box 10. This is because blocks formed in the mold box 10 are oriented with their front faces perpendicular to the direction of travel of the feed drawer and cut-off bar. If core bars parallel to the direction of travel of the feed drawer were used they would cover portions of the front faces of the blocks and disrupt the compression of material along the front face. Further, they would prevent the stripper shoe, and in particular forming stripper shoe 91, from forming the front portion 161. Thus, forming members as described in U.S. Patent Publication 2013/0276401 A which is incorporated herein by reference in its entirety are used with mold box 10 instead of traditionally oriented core bars.

Figure 74:
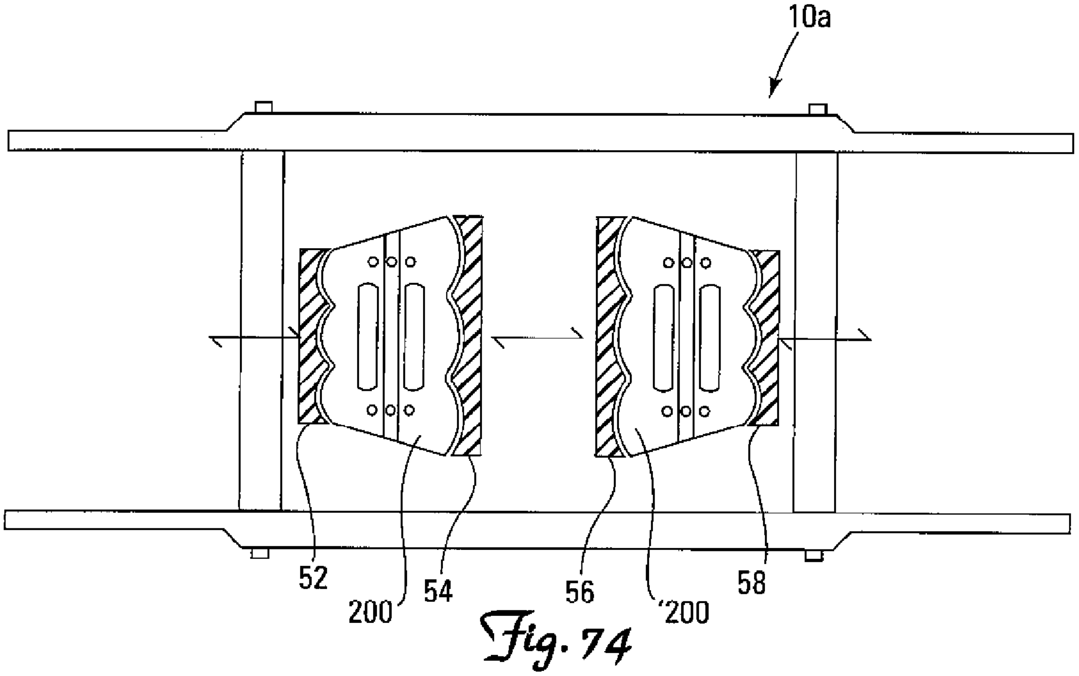
FIG. 74 shows a mold box for making the blocks of FIGS. 38 to 42.

FIG. 74 shows a mold box 10*a* which has moveable liners 52, 54, 56 and 58 for making block 200 described previously in connection with FIGS. 33 to 37. Liners 54 and 56 form front face portions 260 and liners 52 and 58 form rear face portions 260*r* of blocks 200.

Figure 75:
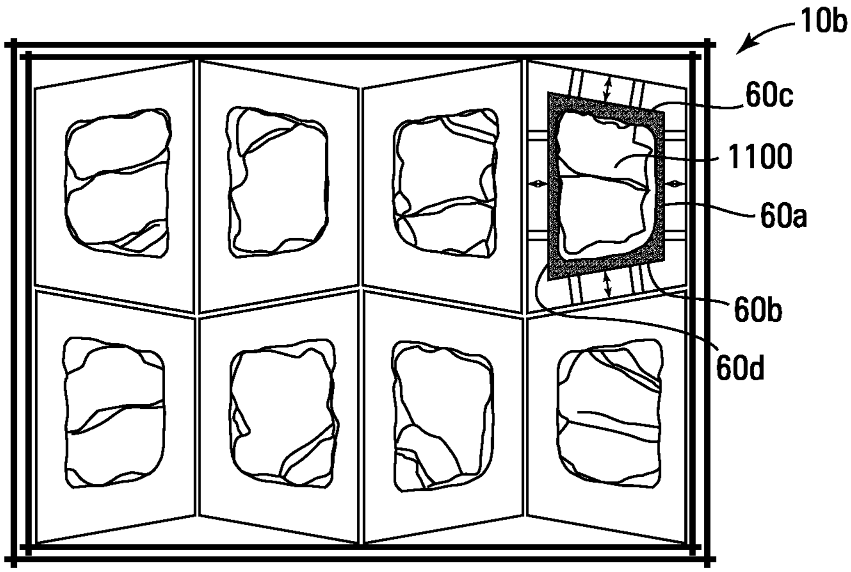
FIG. 75 shows a multi-cavity mold box.
Figure 76:
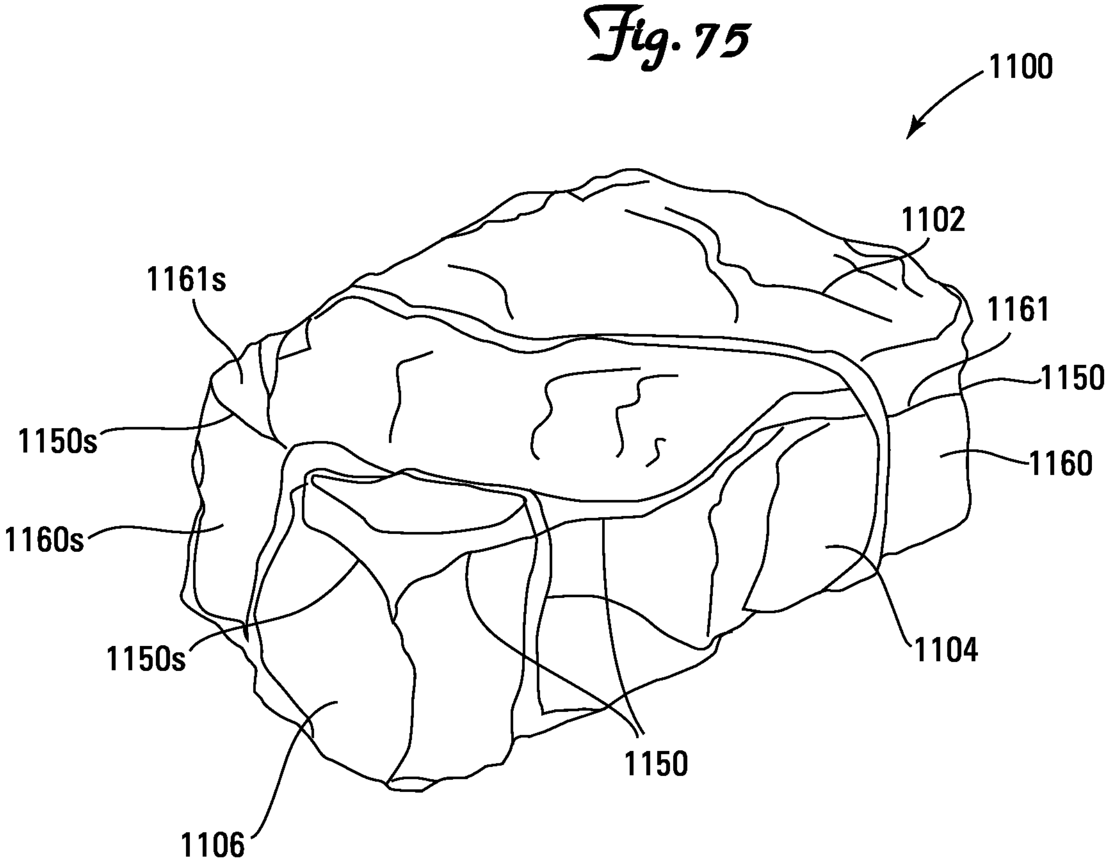
FIG. 76 shows an alternative block embodiment made in the mold of FIG. 75.

FIG. 75 shows a multi-cavity mold box 10*b* having eight block forming cavities. Each of the cavities includes four moveable liners 60*a*, 60*b*, 60*c*, and 60*d* for forming portions of the front, rear and side faces of a block 1100 shown in FIG. 76. In this embodiment each of the faces of block 1100 has a configuration and features similar to front face 104 of block 100 including portions meeting at a parting line and irregular top and bottom edges. Specifically, liner 60*d* forms portion 1160 of front face 1104 and liner 60*c* forms portion 1160*s* of side face 1106. Portion 1161 of front face 1104 and portion 1161*s* of side face 1106 are formed by a molding surface of a stripper shoe (not shown) during the block forming process. Portions 1161 and 1160 of front face 1104 meet at a parting line 1150 having the features and configuration of parting line 150 of block 100. Portions 1161*s* and 1160*s* of side face 1106 meet at a parting line 1150*s* having the features and configuration of parting line 150 of block 100. Liners 60*a* and 60*d* form a rear face and second side face, respectively, of block 1100 which, although not shown in detail in FIG. 76 should be understood to have a configuration and features similar to front face 1104 and side face 1106. A top surface 1102 of block 1100 may be substantially planar or, optionally, as shown in FIG. 76 may have a texture or pattern imparted by a molding surface of a stripper shoe. It should be understood that although mold 10*b* is shown having eight mold cavities it could be configured to have any number of mold cavities limited only by the size of the mold and the block making machine.

Figure 77:
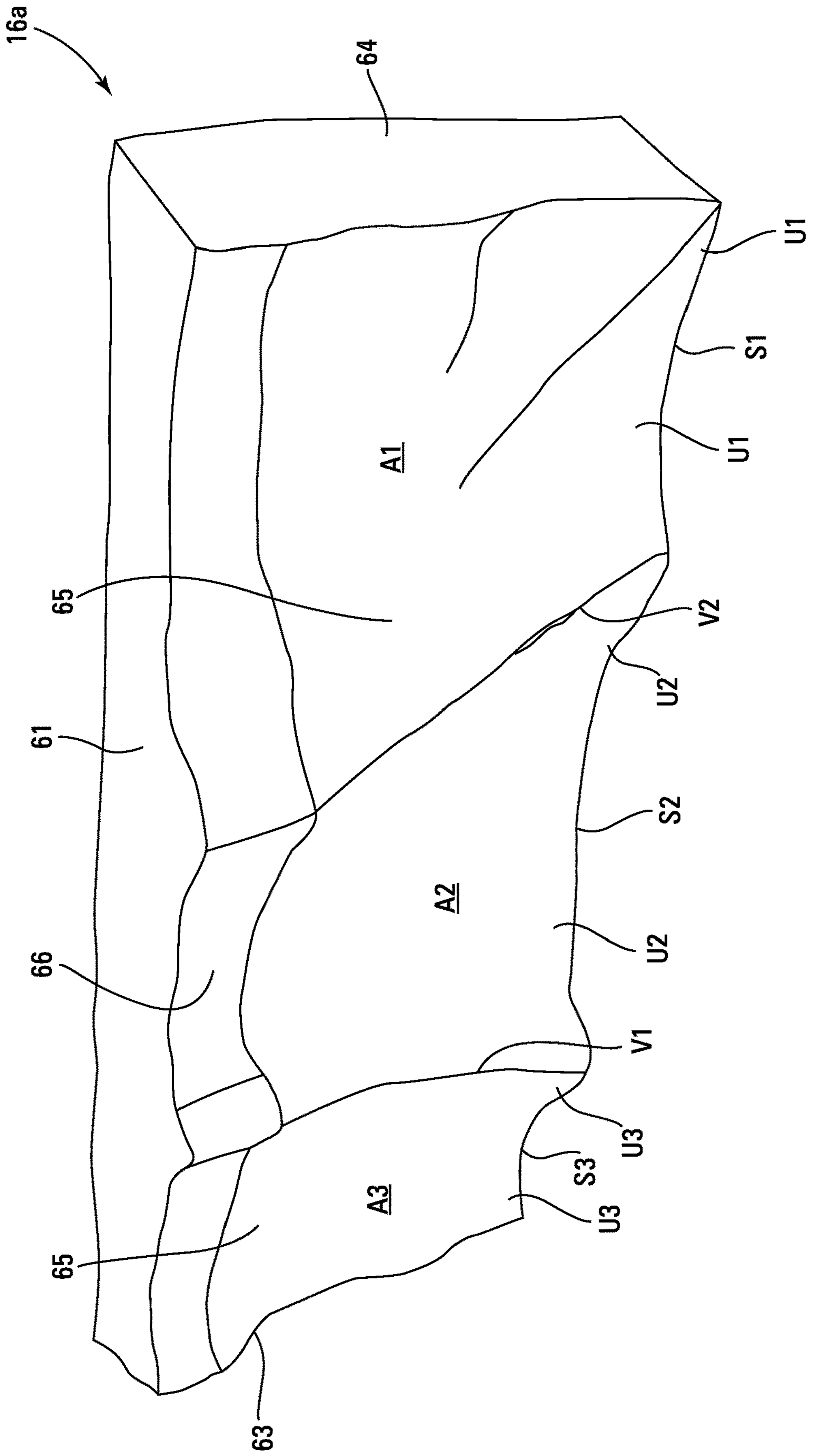
FIGS. 77 to 79 are perspective bottom and side views, respectively, of a face liner for a mold box.
Figure 78:
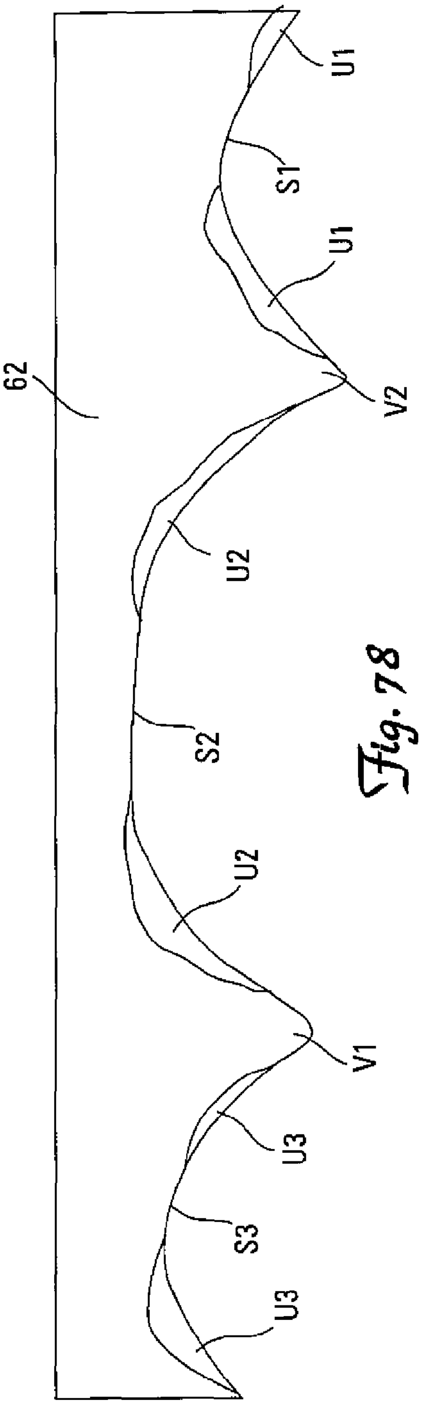
Figure 79:
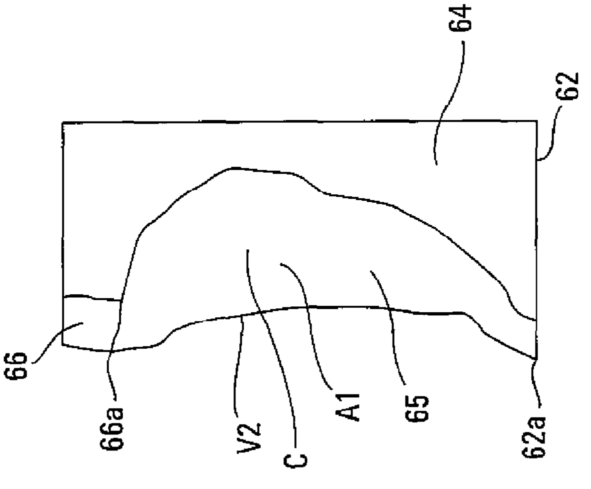

FIGS. 77 to 79 are top perspective, bottom, and side views of moveable face liner 16*a* of the present invention. Moveable face liners 16*b*, 18*a* and 18*b* may be substantially similar or may be different but all liners may have similar features. As such, the following description of features of moveable face liner 16*a* applies to similar features of face liners 16*b*, 18*a* and 18*b* even though locations, dimensions and quantities may differ from one face liner to the next. Moveable face liner 16*a* has upper surface 61, bottom surface 62, and side surfaces 63 and 64. Additionally, moveable face liner has a molding surface 65 and an overfill surface 66. Overfill surface 66 is the surface that abuts or lies adjacent to forming stripper shoe 91, discussed further below. As best seen in FIG. 77 molding surface 65 has protruding joint or valley forming surfaces V1 and V2 as well as shaped area forming surfaces A1, A2, and A3. Shaped area forming surfaces A1, A2 and A3 have undercut region forming surfaces U1, U2 and U3, respectively. Shaped are forming surfaces A1, A2 and A3 also have support region forming surface S1, S2 and S3, respectively.

Support region forming surfaces S1, S2 and S3 mold areas along the bottom surface of the front face 104 that stabilize the molded front face. Support region forming surfaces S1, S2 and S3 may have gradual degrees of sloping, if any, from the outermost point of each respective shaped area forming surface extending into the mold cavity. Support region forming surfaces S1, S2 and S3 may be continuous or segmented for each respective shaped area forming surface A1, A2 and A3. Support region forming surfaces S1, S2 and S3 mold contact points along the bottom surface of the molded front face that provide sufficient stabilization during the molding process so that when block 100 is stripped from the mold, the support regions stabilize the front face as the mold material sets and hardens, preventing the front portion 160 (and front portion 161) from sagging, dislodging, collapsing or deforming. Without proper support region forming surfaces S1, S2 and S3, the undercut region forming surfaces and the valley forming surfaces of face liner 16*a* would cause the molded material of front portion 160 (and front portion 161) to deform, slide or dislodge from the block after the molded material is stripped from the mold cavity. The proportion of all support region forming surfaces S1, S2 and S3 in relation to all surfaces (valley forming surfaces, undercut region forming surfaces and support region forming surfaces) along the bottom surface of face liner 16*a* may be any desired proportion that will support the molded front face, thus the proportion of support region forming surfaces S1, S2 and S3 may be 30 to 70 percent of all surfaces along bottom surface of face liner 16*a*. Further, the total length of all support region forming surfaces S1, S2 and S3 in relation to the total contoured length of the bottom edge of molding surface 65 of face liner 16*a* may be any desired ratio that will support the molded front face, thus the total length of support region forming surfaces S1, S2 and S3 may be 30 to 70 percent of the total length of the bottom edge of face liner 16*a*.

Undercut region forming surfaces U1, U2 and U3 mold sloping surfaces from the bottom surface of the block outward away from the block body and may extend into the mold cavity farther than support region forming surfaces. The sloping of the undercut region forming surfaces U1, U2 and U3 allows for a more enhanced natural stone appearance to be imparted onto the molded block. Undercut region forming surfaces U1, U2 and U3 may have more pronounced degrees of sloping than the support region forming surfaces, from various points of each respective shaped area forming surface extending towards the bottom surface of the face liner and into the mold cavity. Undercut region forming surfaces U1, U2 and U3 may be continuous or segmented for each respective shaped area forming surface A1, A2 and A3. Valley forming surfaces mold the valleys or joints of front face 104 and can extend into the mold cavity at any desired dimension. Depending upon how far the valley forming surfaces extend into the mold cavity, the core forming members may be adjusted to sit back farther from the moveable face liner towards the back of the mold cavity in order to accommodate the molding of much deeper inward extending valleys. The proportion of all undercut region forming surfaces U1, U2 and U3 and valley forming surfaces V1 and V2 in relation to all surfaces (valley forming surfaces, undercut region forming surfaces and support region forming surfaces) along the bottom surface of face liner 16*a* may be any desired proportion that will allow the molded front face to be supported, thus the proportion of undercut region forming surfaces U1, U2 and U3 and valley forming surfaces V1 and V2 may be 30 to 70 percent of all surfaces along the bottom surface of the face liner. Further, the total length of all undercut region forming surfaces U1, U2 and U3 and valley forming surfaces V1 and V2 in relation to the total contoured length of the bottom edge of molding surface 65 of face liner 16*a* may be any desired ratio that will allow the molded front face to be supported, thus the total length of undercut region forming surfaces U1, U2 and U3 and valley forming surfaces V1 and V2 may be 30 to 70 percent of the total length of the contoured length of the bottom edge of molding surface 65.

As best seen in FIG. 79 face liner 16*a* forms an outwardly extending cavity C in locations where the shaped areas are formed. The cavity C is closed on the top by a portion of the liner extending inwardly to point 66*a* and on the bottom by a portion of the liner extending inwardly to a point 62*a*. As will be discussed hereafter, in order to properly fill cavity C with block forming material the stripper shoe is provided with a downwardly extending forming surface to provide extra compaction and to the block forming material to help force the material into cavity C during a block forming process.

It should be understood that the dimensions, quantities and locations of the features of face liner 16*a* are not limiting and that face liners of the present invention could have features described above of varying dimensions, quantities and locations.

Figure 80:
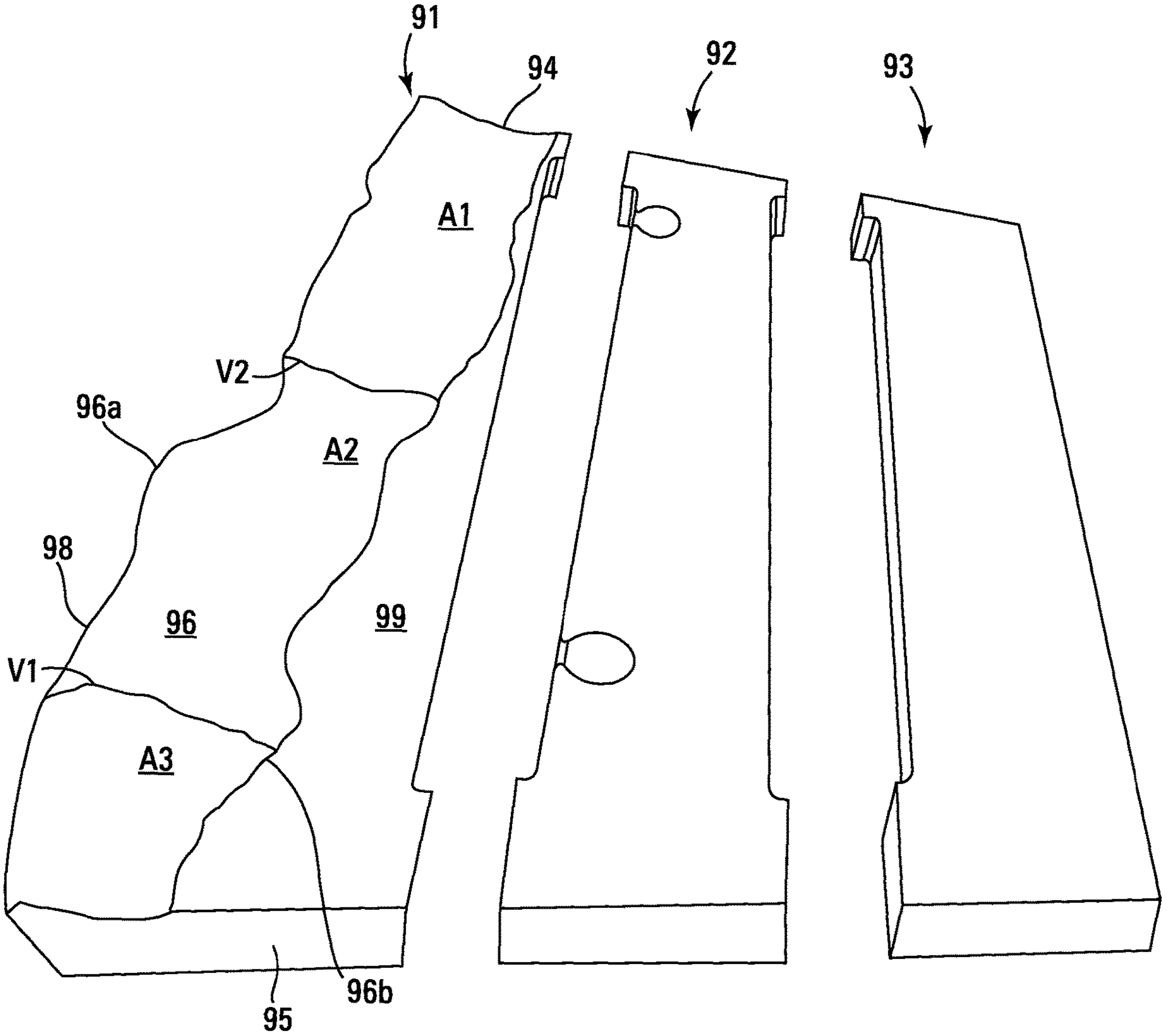
FIGS. 80 and 81 are bottom and side views of stripper shoe plates that compact, compress and push masonry material through a mold box.
Figure 81:
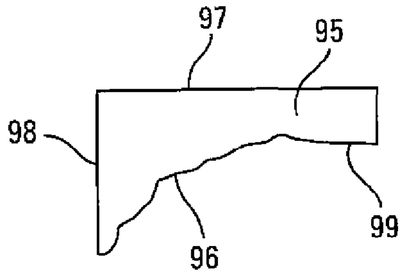

FIG. 80 is a bottom perspective view of portions 91, 92 and 93 of a stripper shoe that contact, compress and push the masonry material through the mold cavity. FIG. 81 is a side view of portion 91 of the stripper shoe. The stripper shoe may be manufactured to contact the masonry material only and may have voids or open spaces where any forming members are located in the mold box. Forming stripper shoe 91 has an upper surface 97, side surfaces 94 and 95 and end surface 98. End surface 98 is the surface that aligns or abuts with overfill surface 66 of face liner 16*a* during the molding process. Forming stripper shoe 91 has forming surface 96 that contacts and compresses the masonry material in the mold box and forms front portion 161 of front face 104 of block 100 and compression surface 99 that contacts and compresses the top surface 102 of front portion 108 of block 100. Forming surface 96 is bounded by edges 96a and 96b which extend between side surfaces 94 and 95. During the making of a block 100 the parting line 150 is formed along or adjacent edge 96a and the irregular top edge 172 is formed along or adjacent to edge 96b.

The irregular contoured surface of forming surface 96 generally has a downward slope from compression surface 99 to the bottom edge of forming surface 96. Degrees of downward slope from compression surface 99 to the bottom edge of forming surface 96 at locations along the length of forming stripper shoe 91 may be in the range of 0° to 90°. Forming surface 96 may have an averaged downward sloping value or arithmetic downward sloping mean along the length of forming stripper shoe 91 from compression surface 99 to the bottom edge of forming surface 96 which in some embodiments is in the range of 1° to 75°, and in other embodiments is in the range of 15° to 25°. In one embodiment the downward sloping value may be 20°. The downward slope or contour of forming surface 96 pushes block forming material downward to compact the material and ensure that cavity C of face liner 16a shown in FIG. 79 is sufficiently filled with block forming material. The sloping of forming surface 96 also functions to mold a visually pleasing aesthetic appearance onto front portion 161 of block 100 so that when blocks 100 are stacked in a wall with the top surface facing upward, the upper course of block creates a shadowing effect over the front portion 161 of the lower course of block enhancing the three dimensional effect of the shaped areas of the front faces of the blocks in the wall.

Forming surface 96 of forming stripper shoe 91 has protruding joint or valley forming surfaces V1 and V2 and shaped area forming surfaces A1, A2 and A3 that correspond and align with the joint or valley forming surfaces V1 and V2 and shaped area forming surfaces A1, A2 and A3, respectively, of molding surface 65 of face liner 16a.

Figure 82:
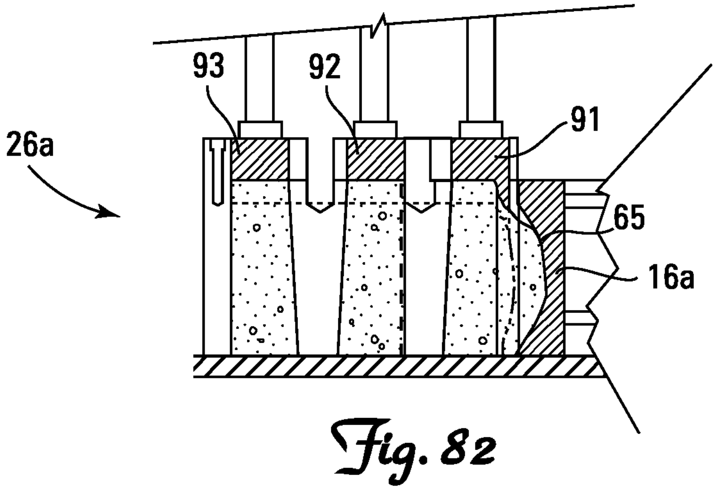
FIGS. 82 to 84 are cross-sectional side views of a mold assembly and mold cavity.
Figure 83:
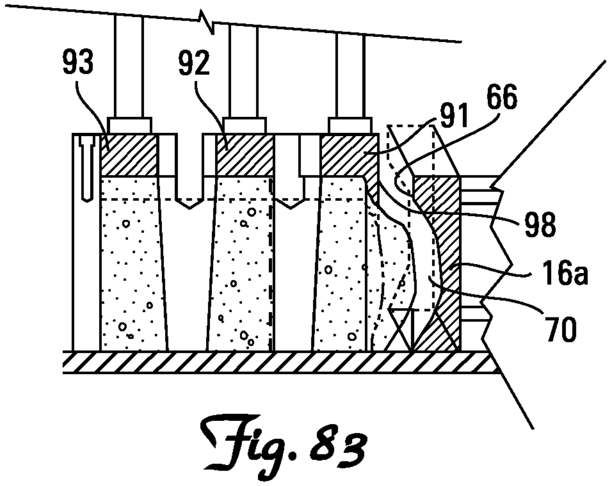
Figure 84:
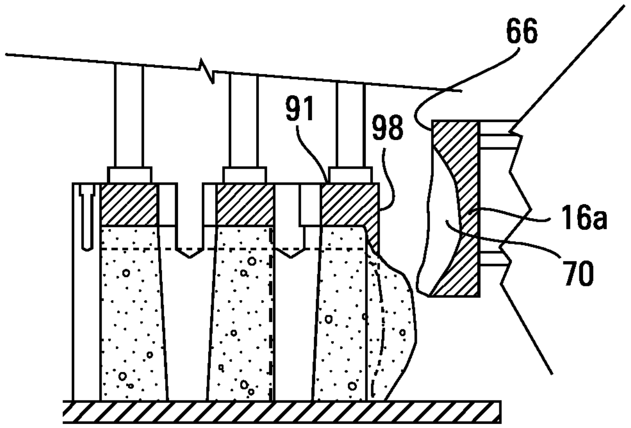

During a block making process mold box 10 is configured to rest upon a pallet to form mold cavities 26a, 26b, 28a and 28b. Moveable means 19 moves face liners 16a, 16b, 18a and 18b between discharge and engaged positions. FIGS. 82 to 84 illustrate the molding process of mold cavity 26a. The other mold cavities function in a similar manner. Masonry material is deposited into the mold cavities by a feed drawer (not shown) as it passes over the mold box. Excess material is removed by a cut-off bar as the feed drawer moves away from the mold box so that the masonry material is level with the top of the mold box and the top surfaces of the forming members. As the material settles into the mold cavities around the forming members and into the contoured surfaces of molding surface 65 of the face liners, a vibratory action may be employed to aid in the compaction of material in each mold cavity around the forming members and into the contour surfaces of molding surface 65. Overfill surface 66 of face liner 16a is a non-forming surface that aligns with or abuts with end 98 of forming stripper shoe 91 and is located above molding surface 65 of face liner 16a. Since overfill surface 66 is located below the cut-off bar travel path and above the molding surface of the face liner it, therefore, allows for the deposit of extra material at the top of the mold cavity adjacent the face liner 16a. This helps to ensure that a cavity 70 formed within the molding surface 65 of the face liner receives a sufficient amount of material to fill the cavity after the material is compacted by the stripper shoe.

Next, stripper shoe portions 91, 92 and 93 from the head assembly contact the masonry material from above and compress and compact the material in the mold cavity as shown in FIG. 82. Forming surface 96 of forming stripper shoe 91 compresses the material deposited adjacent overfill surface 66 of face liner 16a, forming front portion 161 of front face 104 of block 100. The extra material deposited adjacent overfill surface 66 of face liner 16a is dispersed and compressed into and around the molding surface 65 of face liner 16a to ensure sufficient material is available to completely and adequately fill cavity 70 and mold the material into all molding surfaces. Excess material deposited adjacent overfill surface 66 of face liner 16a ensures that adequate material is compacted by forming stripper shoe 91 to form both front portion 160 and front portion 161 of front face 104. As the material is being compacted and compressed into the contoured surfaces of molding surface 65 of face liner 16, the slope of valley forming surface V1 aids in material distribution into the contours of molding surface 65 by the force of the compaction caused by the forming stripper shoe 91 pushing material against the angled or sloped surface of the valley forming surface V1 or other inwardly extending surfaces.

Most surfaces of shaped area forming surfaces S1, S2 and S3 of molding surface 65 of face liner 16a extend outwardly from mold cavity 26a toward end wall 6. Valley forming surfaces V1 and V2 extend inwardly into mold cavity 26a toward division liner 21. The positioning and location of the shaped area forming surfaces and valley forming surfaces are designed to allow forming stripper shoe 91 a sufficient amount of downward overtravel during the block forming process as it descends and compresses the material without contacting and causing possible damage to either portion 91 of the stripper shoe of face liner 16a. The amount of overtravel available is dependent upon the location and sloping of any inward extending surfaces of molding surface 65 of face liner 16a. Thus the forming stripper shoe may be allowed to overtravel by any designed amount and for example could over travel 1/16 of an inch or more depending upon the application. Further, forming stripper shoe 91 may be engineered such that inward extending valley forming surfaces of molding surface 65 of the face liner 16a may be received in contours of the forming surface 96 of the forming stripper shoe 91 to permit greater overtravel of the stripper shoe. Further, the head assembly may be fitted with an overtravel stop that will not allow the head assembly to lower past a certain depth inside the mold. As the movable face liner retracts from the engaged position to the disengaged position, as shown in FIG. 83, stripper shoe portions 91, 92 and 93 then push the molded material through the mold cavity and strip the molded material from the mold while being held in a stationary position, as shown in FIG. 84, in accordance with procedures well known to those of skill in the art.

Although the block making process has been described with respect to block 100 it should be understood that the process is similar for all of the block embodiments described herein. The only difference would be in the configuration of the liners and stripper shoes and that more than one or even all of the liners may be moveable from an engaged to a disengaged or discharge position.

Figure 85:
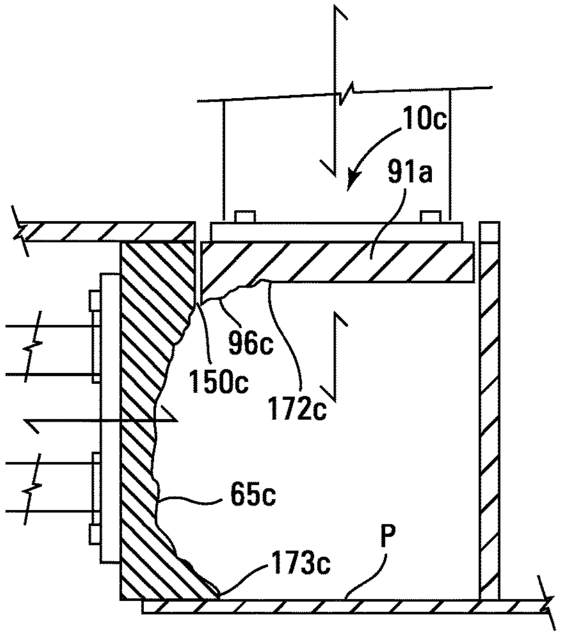
FIGS. 85 to 89 are cross-sectional views of various mold assemblies used to make blocks according to the present invention.

FIGS. 85 to 89 are cross-sectional views of various molds which can be used to make blocks having elements of the unique surface features and configurations described herein. FIG. 85 shows mold box 10c for forming a block in accordance with the present invention. A stripper shoe 91a has a textured portion 96c for forming a first portion of a front face of a block and a moveable liner has a molding surface 65c for forming a second portion of the front face of a block made in mold box 10*c*. The relative positions of top edge 172*c*, bottom edge 173*c* and parting line 150*c* are shown.

Figure 86:
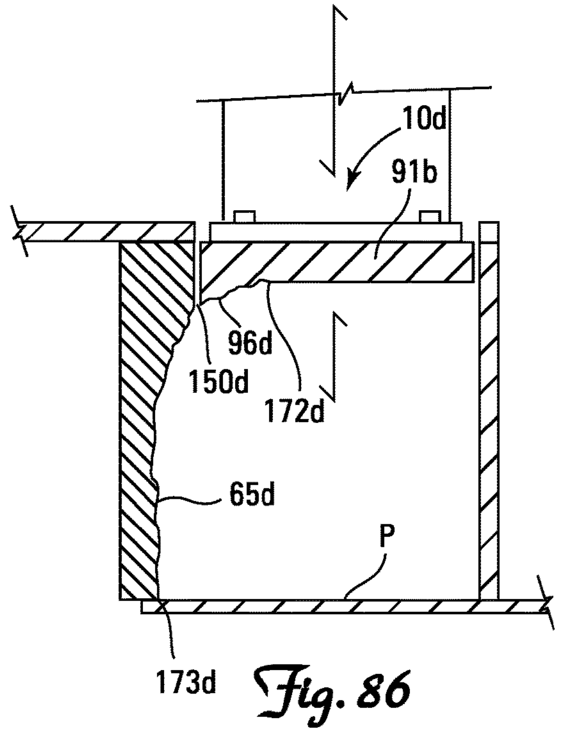

FIG. 86 shows mold box 10*d* for forming a block in accordance with the present invention. A stripper shoe 91*b* has a textured portion 96*d* for forming a first portion of a front face of a block and a stationary liner has a molding surface 65*d* for forming a second portion of the front face of a block made in mold box 10*d*. The relative positions of top edge 172*d*, bottom edge 173*d* and parting line 150*d* are shown. Since the liner is stationary the front face cannot be provided with undercuts as described in connection with block 100 and mold box 10. Further, molding surface 65*d* of the liner must be carefully drafted outwardly from top to bottom so that it does not interfere as the block material is discharged from the mold. Mold box 10*d* is used to make blocks in a manner similar to the process described above in connection with mold box 10 except that the liner is stationary and does not move between engaged and discharge positions.

Figure 87:
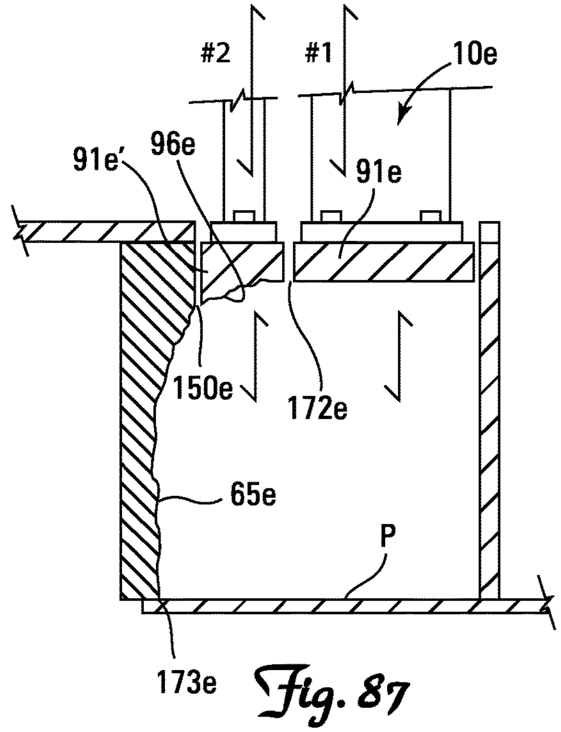

FIG. 87 shows mold box 10*e* for forming a block in accordance with the present invention. In this embodiment the stripper shoe comprises a first stage 91*e* and a second stage 91*e*'. The first stage 91*e* has a substantially planar molding surface to form a top planar surface of the block. The second stage 91*e*' has a molding surface 96*e* for forming a first portion of a front face of a block. A stationary liner has a molding surface 65*e* for forming a second portion of the front face of a block made in mold box 10*e*. The relative positions of top edge 172*e*, bottom edge 173*e* and parting line 150*e* are shown. Since the liner is stationary the front face cannot be provided with undercuts as described in connection with block 100 and mold box 10. Further, molding surface 65*e* of the liner must be carefully drafted outwardly from top to bottom so that it does not interfere as the block material is discharged from the mold. Mold box 10*e* is used to make blocks in a manner similar to the process described above in connection with mold box 10 except that the liner is stationary and does not move between engaged and discharge positions. Additionally, the two stages of the stripper shoe can move relatively independently of one another. For example, both stages may move downwardly to engage and compress the block material within the mold cavity. The second stage portion of the stripper shoe then continues to move downwardly to discharge the material from the cavity onto the pallet. This is beneficial since in single stage stripper shoes the angle at which molding surface 96*e* contacts the block material should be kept at 20° or less to ensure that the stripper shoe will properly release the block material after it is discharged from the mold cavity. Therefore, in a two stage stripper shoe the angle of molding surface 96*e* of the second stage can be greater than 20°.

Figure 88:
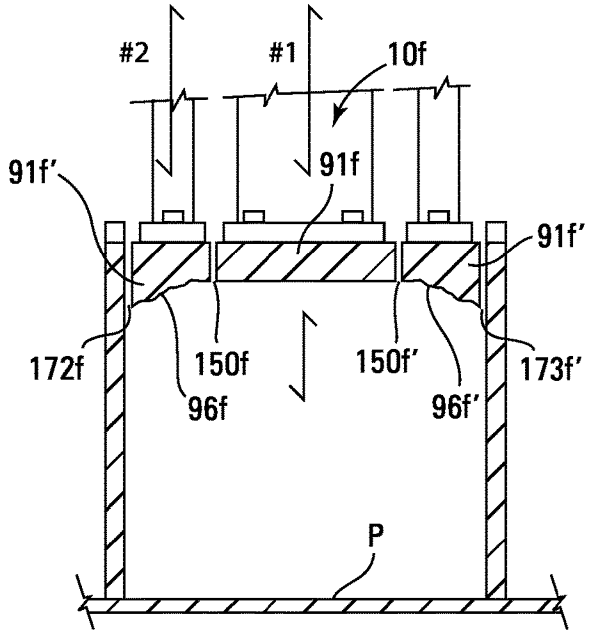
Figure 89:
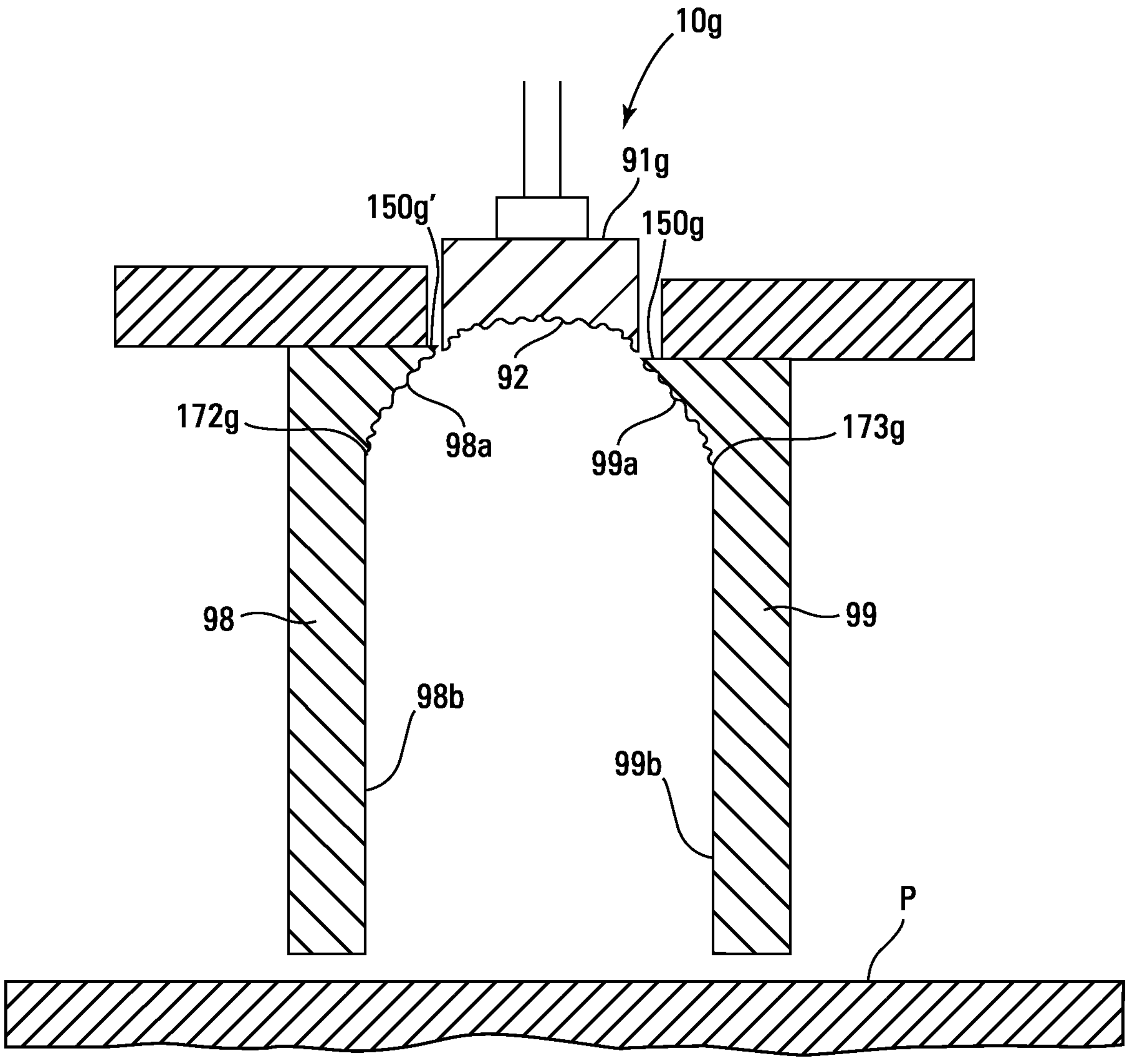

The beneficial features of the present invention can also be incorporated into molds where the rear surface of the block rests on the production pallet and the front face of the block is at the top of the mold cavity. FIGS. 88 and 89 show mold boxes where the rear surface of the block rests on the production pallet and the front face of the block faces upward and is formed at the top of the mold box. FIG. 88 shows mold box 10*f*. In this embodiment the stripper shoe comprises a first stage 91*f* and a second stage 91*f*. The first stage 91*f* has a textured or patterned molding surface to form a first textured or patterned portion of the front face of the block. The second stage 91*f* has a portion on each side of the first stage which have molding surfaces 96*f* and 96*f* for forming a second portion of a front face of the block. The mold includes stationary side liners which form the top and bottom surfaces of the block. Moveable or stationary face liners, either textured or smooth, (not shown) can be used to form the sides of the block. The relative positions of top edge 172*f* and bottom edge 173*f* are shown, although it should be appreciated that in this embodiment the block could be made so that the top and bottom surfaces are interchangeable during construction of a wall with the blocks. The two portions of the second stage of the stripper shoe may also create parting lines 150*f* and 150*f* depending on the shape, angle and configuration of the molding surfaces of the stripper shoe stages. It should also be appreciated that the second stage of the stripper shoe may include portions which form the second portion of the front face of the block at each end of the block. In that case the second portion would surround a perimeter of the first portion and allow the block to be provided with a surface slope or angle exceeding 20° around the entire perimeter of the block. Additionally, since the second portion of the second stage of the stripper shoe forms the second portion of the block along both the top and bottom edges of the block, both the top and bottom of the block can be provided with relatively steep undercuts. Since the front face of the block is oriented at the top of the mold and faces upwardly support of the undercuts is not required. The method of using mold box 10*f* is similar to that of mold box 10*e*, the only difference being that the second stage may comprise one or more portions.

FIG. 89 shows another mold box embodiment where the top face of a block is formed at the top of the mold cavity and the rear face rests on the production pallet P. FIG. 89 shows mold box 10*g*. A stripper shoe 91*g* has a textured or patterned molding surface to form a first textured or patterned portion of the front face of the block. The mold includes stationary side liners 98 and 99 having planar molding surfaces 98*b* and 99*b* to form substantially planar top and bottom surfaces of the block and textured or patterned molding surfaces to form a second textured or patterned portion of the front face of the block. Moveable or stationary face liners, either textured or smooth, (not shown) can be used to form the sides of the block. The relative positions of top edge 172*g*, bottom edge 173*g* are shown, although it should be appreciated that in this embodiment the block could be made so that the top and bottom surfaces are interchangeable during construction of a wall with the blocks. Molding surfaces 98*a* and 99*a* may also create parting lines 150*g* and 150*g*' where they meet molding surface 92 of the stripper shoe, depending on the shape, angle and configuration of the molding surfaces of the stationary side liners and the stripper shoe. Additionally, since molding surfaces 98*a* and 99*a* form the second portion of the block along both the top and bottom edges of the block, both the top and bottom of the block can be provided with relatively steep undercuts. Since the front face of the block is oriented at the top of the mold and faces upwardly support of the undercuts is not required. The method of using mold box 10*f* is similar to that of mold box 10*e*, the only difference being that the second stage may comprise one or more portions.

Figure 90:
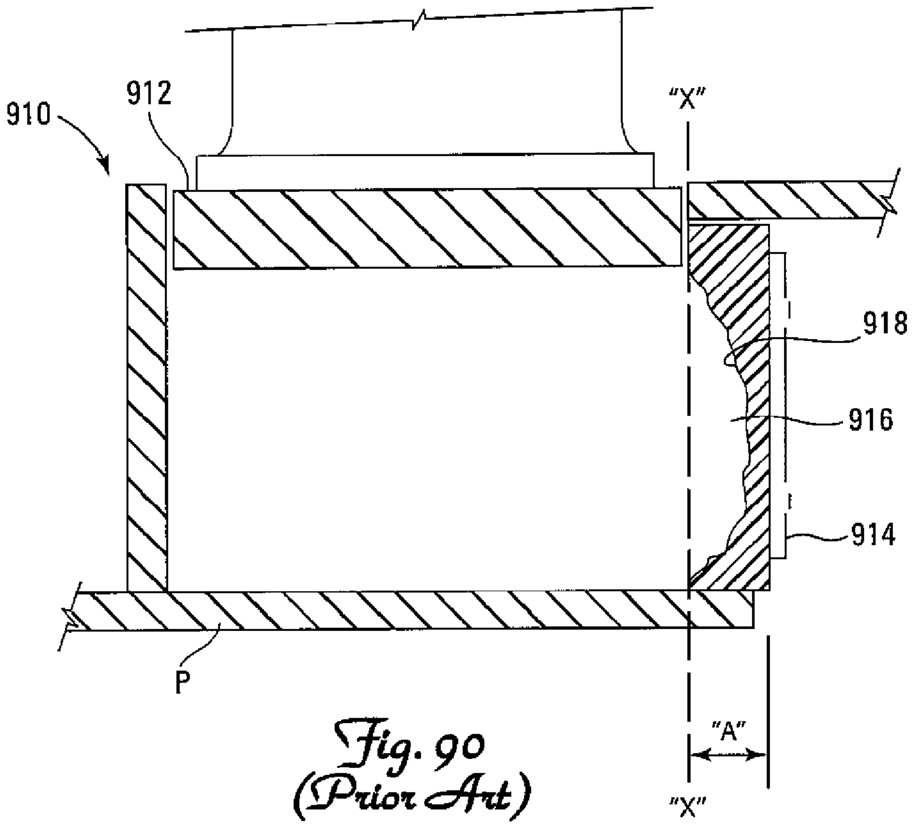
Fig. 90 (Prior Art)
FIG. 90 is a cross-sectional view of a prior art mold assembly.
Figure 91:
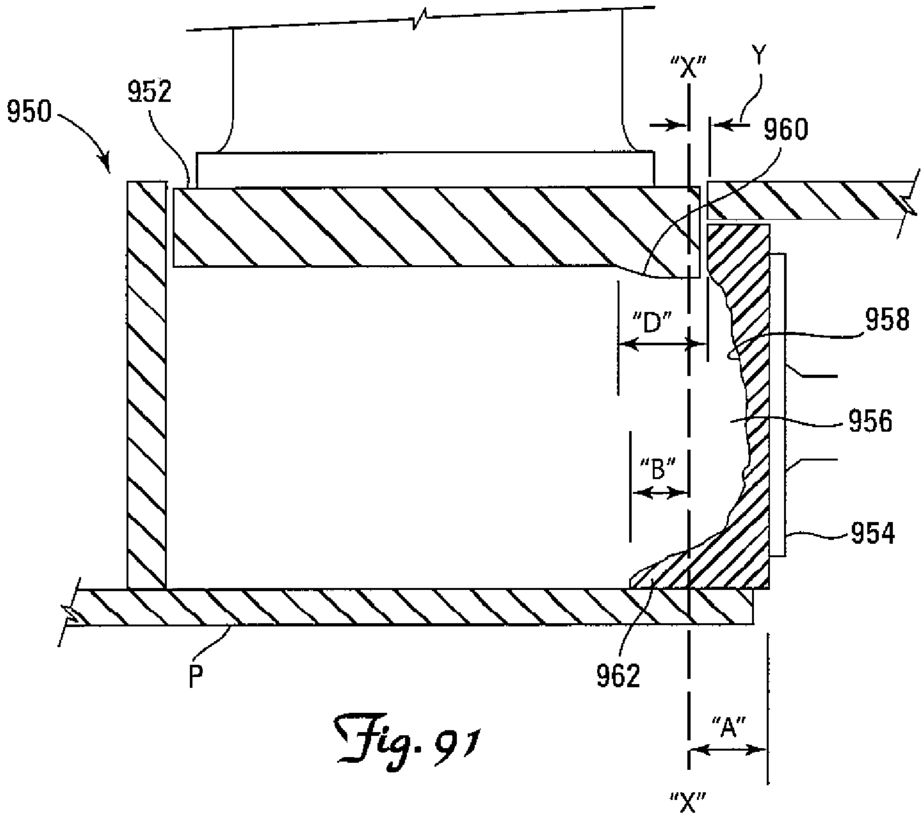
FIG. 91 is a cross-sectional view of a mold assembly according to the present invention.

A distinction of some embodiments of the present invention over the prior art is illustrated in FIGS. 90 and 91. FIG. 90 is a cross-sectional view of a prior art mold assembly including mold box 910, stripper shoe 912, moveable liner 914 and production pallet P. Liner 914 includes a molding surface 918 for imparting a surface texture or pattern on the surface of a block formed within the mold box. It is apparent that all texture or pattern applied to the front face of a block formed within the liner is imparted within a cavity 916 formed within the liner bounded by vertical plane x-x spaced from a front surface of the liner by a distance "A" and which extends from an inner top edge of the liner to an inner bottom edge of the liner. Unfortunately, it can be difficult to fill the liner cavity with block forming material during the block making process since the top of the cavity is closed by the upper structure of the liner which overhangs the cavity, especially when the overhang is at an angle greater than 20°.

The difficulty in filling the cavity is overcome by the mold assembly of some embodiments of the present invention which is shown in FIG. 91. FIG. 91 is a cross-sectional view of a mold assembly according to some embodiments of the present invention and includes mold box 950, stripper shoe 952, moveable liner 954 and production pallet P. The cross-sectional view of FIG. 91 is along a vertical plane substantially perpendicular to liner 954 which intersects a deep undercut forming portion of the liner 954. Liner 954 includes a molding surface 958 for imparting a surface texture or pattern including shaped areas and joints on the surface of a block formed within the mold box. For example, molding surface 958 could be used to form portion 160 of the front face of block 100. Molding surface 958 has top and bottom portions that extend inwardly toward the mold cavity to define a convex cavity 956. Unlike the prior art mold assembly where all texture or pattern applied to the block surface is formed within the liner and bounded by vertical plane x-x, in this embodiment a portion of the surface pattern is imposed by molding surface 960 of stripper shoe 952. For example, molding surface 960 could be used to form portion 161 of the front face of block 100. Molding surface 960 extends inwardly into the mold cavity beyond liner cavity 956 and beyond the normal vertical liner plane x-x a distance D from an inner top portion of the liner. Further, liner cavity 956 may be more open than prior art surface forming cavities by a distance Y, which is the distance between the normal liner plane x-x and the top portion of molding surface 958. When the mold cavity is filled with block forming material the more open top allows for better filling of the liner cavity. Further, when material is compressed within the mold cavity by the stripper shoe, molding surface 960 extends above the open top of the liner mold cavity 956 and into the mold cavity more deeply to help compress and compact the material within the liner cavity. Additionally, FIG. 91 shows that, in at least one vertical cross-section, a bottom portion 962 of the liner 954, including the bottom portion of molding surface 958, extends into the mold cavity a distance B beyond normal vertical liner plane x-x and beyond the top portion of molding surface 958 allowing a true undercut to be formed in the surface of the block and in turn the creation of false joints and convex shaped features on the face of the block. In other words, the molding surface of the front wall is shaped or configured such that in a cross-sectional view of the front wall along a vertical plane substantially perpendicular to the front wall the intersection of the vertical plane with the molding surface defines a convex path having a first end at a top of the front wall and a second end at a bottom of the front wall, a first vertical line passing through the first end being positioned farther from the rear wall than a second vertical line passing through the second end, a majority of the convex path being positioned farther from the rear wall than the first vertical line.

Additionally, the stripper shoe can include a planar molding surface which meets with molding surface 960 along an irregular top edge. In some embodiments, a third vertical line passing through the intersection of the irregular top edge and the vertical plane is positioned farther from the rear wall than the second vertical line. It should be understood that the mold box could be configured to impart any desired face shape, texture or pattern onto any or all side, front and back surfaces of the blocks. Although the blocks described above are shown with natural stone faces any other natural, geometric, regular or irregular pattern could be formed as desired. Although particular embodiments have been disclosed herein in detail, this has been done for purposes of illustration only, and is not intended to be limiting with respect to the scope of the appended claims, which follow. In particular, it is contemplated by the inventor that various substitutions, alterations, and modifications may be made to the invention without departing from the spirit and scope of the invention as defined by the claims. For instance, the choice of materials or variations in the shape or angles at which some of the surfaces intersect are believed to be a matter of routine for a person of ordinary skill in the art with knowledge of the embodiments disclosed herein.

What is claimed is:

1. A method to produce blocks, the method comprising:

positioning a production pallet beneath a mold box to enclose a bottom of a mold cavity; wherein the mold box includes opposed side walls and opposed front and rear walls which together form a perimeter of the mold cavity shaped to form a block, the mold cavity having an open top and an open bottom;

depositing block forming material into the mold cavity; and compressing the block forming material within the mold cavity to form a block by lowering a stripper shoe to enclose the open top of the mold cavity, wherein, in an installed orientation, the block includes an outward-facing front face that is adjacent to a top irregular surface and to first and second irregular side surfaces, the stripper shoe having an irregular molding surface shaped for forming the top irregular surface of the block and contoured molding surfaces shaped for forming a first portion of the outward-facing front face and a first portion of the first and second irregular side surfaces of the block, wherein a transition between the first portion of the outward-facing front face and the first portion of the first and second irregular side surfaces of the block formed by the stripper shoe and the remaining portions of the outward facing front face is irregular and nonlinear; and removing the block forming material from the at least one mold cavity after moving the front wall to the retracted position.

2. The method of claim 1, wherein the contoured molding surface of the stripper shoe includes an irregular front edge which is non-linear horizontally and vertically.

3. The method of claim 1, wherein the opposed side walls and the front wall include respective contoured molding surfaces shaped to form the remaining portion of the first and second irregular side walls and the outward-facing front face of the block.

4. The method of claim 3, further comprising extending at least a portion of the contoured molding surfaces of the stripper shoe further into the mold cavity than the irregular molding surface of the stripper shoe.

5. The method of claim 3, wherein the contoured molding surfaces of the stripper shoe include a projecting ridge shaped to extend into the mold cavity to impart a first section of a false joint into the first portion of the outward-facing front face and the first portions of the first and second irregular side faces of the block and the contoured molding surfaces of the opposed side walls and the front wall includes respective projecting ridges shaped to extend into the mold cavity to impart a second section of the false joint into the remaining portion of the first and second irregular side faces and the outward-facing front face of the block.

6. The method of claim 1, wherein the outward-facing front wall is adjacent the opposed irregular side walls along first and second non-linear side edges, such that in a front view of a block formed in the at least one mold cavity a front face of the block has a shape that is not rectangular.

7. The method of claim 1, wherein the front wall of the mold box is stationary while forming the block.

8. The method of claim 1, wherein the front wall of the mold box moves to a forming position while forming the block.

9. The method of claim 1, wherein the opposing side walls of the mold box are stationary while forming the block.

10. The method of claim 1, wherein the opposing side walls of the mold box move to a forming position while forming the block.

* * * * *